US008948312B2

(12) United States Patent
Daneshrad et al.

(10) Patent No.: US 8,948,312 B2
(45) Date of Patent: *Feb. 3, 2015

(54) WIDEBAND INTERFERENCE MITIGATION FOR DEVICES WITH MULTIPLE RECEIVERS

(71) Applicant: Silvus Technologies, Inc., Los Angeles, CA (US)

(72) Inventors: Babak Daneshrad, Encino, CA (US); Jean-Francois Frigon, Brossard (CA); Anish Narendra Shah, Los Angeles, CA (US); Weijun Zhu, Los Angeles, CA (US)

(73) Assignee: Silvus Technologies, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/941,292

(22) Filed: Jul. 12, 2013

(65) Prior Publication Data

US 2014/0051378 A1      Feb. 20, 2014

Related U.S. Application Data

(63) Continuation of application No. 12/780,803, filed on May 14, 2010, now Pat. No. 8,488,724.

(60) Provisional application No. 61/178,479, filed on May 14, 2009.

(51) Int. Cl.
*H03K 9/00* (2006.01)
*H04B 1/10* (2006.01)
*H04B 1/71* (2011.01)

(52) U.S. Cl.
CPC .............. *H04B 1/10* (2013.01); *H04B 1/7102* (2013.01)

USPC .......... 375/316; 375/260; 375/295; 375/306; 375/322; 375/342

(58) Field of Classification Search
CPC ..... H04L 1/04; H04L 27/2637; H04L 5/0021; H04L 1/0056; H04L 25/0202; H04L 27/2601; H04L 27/2697; H04B 1/10; H04B 1/707; H04B 1/7102; H04B 1/7174; H04B 7/0697; H04B 7/12; H04J 13/00; H04J 13/01
USPC ......... 375/262, 267, 270, 295, 299, 316, 318, 375/320, 322, 324, 338, 340, 346
See application file for complete search history.

(56) References Cited

U.S. PATENT DOCUMENTS 5,585,850 A     12/1996   Schwaller
7,209,515 B2     4/2007   Kilfoyle et al.

(Continued)

OTHER PUBLICATIONS

Allen, J., "Short Term Spectral Analysis, Synthesis, and Modification by Discrete Fourier Transform," IEEE Transactions on Acoustics, Speech and Signal Processing, Jun. 1977, vol. 25, No. 3, pp. 235-238.

(Continued)

*Primary Examiner* — Hirdepal Singh
(74) *Attorney, Agent, or Firm* — Knobbe Martens Olson & Bear, LLP

(57) ABSTRACT

Certain disclosed embodiments pertain to suppressing interference in a wireless communication system. For example, a method of suppressing interference can include receiving one or more first signals including components from a plurality of sub-channels. Each of the first signals can be converted into a respective plurality of first sub-band frequency components. A respective spatial filter can be determined for each frequency sub-band using one or more corresponding first sub-band components for each respective spatial filter. One or more second signals including components from the plurality of sub-channels can be received. Each of the second signals can be converted into a respective plurality of second sub-band frequency components. A corresponding plurality of filtered sub-band components can be generated by applying the respective spatial filters to the corresponding second sub-band components for each of the second signals.

23 Claims, 60 Drawing Sheets

(56) References Cited

U.S. PATENT DOCUMENTS

| | | | |
|---|---|---|---|
| 7,590,204 B2* | 9/2009 | Monsen | 375/350 |
| 7,602,745 B2 | 10/2009 | Lin et al. | |
| 7,668,268 B2 | 2/2010 | Heiskala | |
| 7,693,231 B2 | 4/2010 | Ling et al. | |
| 8,358,588 B2 | 1/2013 | Goldsmith et al. | |
| 2005/0041746 A1 | 2/2005 | Rosen et al. | |
| 2006/0274691 A1 | 12/2006 | Naguib et al. | |
| 2006/0285531 A1 | 12/2006 | Howard et al. | |
| 2007/0009059 A1* | 1/2007 | Wallace et al. | 375/267 |
| 2007/0072551 A1 | 3/2007 | Pajukoski et al. | |
| 2007/0164902 A1* | 7/2007 | Bang et al. | 342/377 |
| 2007/0280371 A1* | 12/2007 | Bouvet et al. | 375/267 |
| 2008/0292032 A1 | 11/2008 | Belogolovy et al. | |
| 2009/0010367 A1* | 1/2009 | Ojard | 375/346 |
| 2009/0286562 A1 | 11/2009 | Gorokhov | |
| 2009/0291699 A1 | 11/2009 | Heath et al. | |
| 2009/0312043 A1 | 12/2009 | Shah et al. | |
| 2010/0067366 A1* | 3/2010 | Nicoli | 370/210 |
| 2010/0197262 A1 | 8/2010 | Hosokawa et al. | |
| 2010/0208712 A1* | 8/2010 | Wax et al. | 370/338 |
| 2010/0255790 A1 | 10/2010 | Farajidana et al. | |
| 2011/0128917 A1 | 6/2011 | Ko et al. | |

OTHER PUBLICATIONS

Andrews, "Interference Cancellation for Cellular Systems: A Contemporary Overview," IEEE Wireless Communications, Apr. 2005, vol. 12, No. 2, pp. 19-29.

Andria et al., "Windows and Interpolation Algorithms to Improve Electrical Measurement Accuracy," IEEE Transactions on Instrumentation and Measurement, Aug. 1989, vol. 38, No. 4, pp. 856-863.

Bliss et al., "MIMO Wireless Communication Channel Phenomenology," IEEE Transactions on Antennas and Propagation, Aug. 2004, vol. 52, No. 8, pp. 2073-2082.

Bliss et al., "Multichannel Multiuser Detection of Space-Time Turbo Codes: Experimental Performance Results," Thirty-Sixth Asilomar Conference on Nov. 3-6, 2002, Signals, Systems & Computers, May 2003, vol. 2, pp. 1343-1348.

Bliss, D.W. and Forsythe, K.W., "Information Theoretic Comparison of MIMO Wireless Communication Receivers in the Presence of Interference," Conference Record of the Thirty-Eighth Asilomar Conference on Nov. 7-10, 2004, Signals, Systems and Computers, Mar. 2005, vol. 1, pp. 866-870.

Bliss, D.W., "Robust MIMO Wireless Communication in the Presence of Interference Using Ad Hoc Antenna Arrays," Military Communications Conference, Oct. 13-16, 2003, MILCOM IEEE, vol. 2, pp. 1382-1385.

Burg et al., "A 50 MBPS 4X4 Maximum Likelihood Decoder for Multiple-input Multiple-output Systems with QPSK Modulation", Proceedings of the 10th IEEE Intl. Conference on Electronics, Dec. 14-17, 2003, ICECS, 2003, vol. Nos. 1-3, pp. 332-335.

Burg et al., "VLSI Implementation of MIMO Detection Using the Sphere Decoding Algorithm", IEEE Journal of Solid-State Circuits, Jul. 2005, vol. 40, No. 7, pp. 1566-1577.

Carlson, B.D., "Covariance Matrix Estimation Errors and Diagonal Loading in Adaptive Arrays," IEEE Transactions on Aerospace and Electronic Systems, Jul. 1988, vol. 24, No. 4, pp. 397-401.

Chiasserini and Rao, "Coexistence Mechanisms for Interference Mitigation between IEEE 802.11 WLANs and Bluetooth," INFOCOM, Nov. 7, 2002, vol. 2, pp. 590-598.

Coulson, A.J., "Narrowband Interference in Pilot Symbol Assisted OFDM Systems," IEEE Transactions on Wireless Communications, Nov. 2004, vol. 3, No. 6, pp. 2277-2287.

Edman and Owall, "A Scalable Pipelined Complex Valued Matrix Inversion Architecture", IEEE International Symposium, May 23-25, Circuits and Systems, Jul. 2005, vol. 5, pp. 4489-4483.

Erceg et al., "TGn Channel Models," Jan. 9, 2004, IEEE 802.11 Wireless LANs, document 11-03/0940r1.

Gabriel, "Using Spectral Estimation Techniques in Adaptive Processing Antenna Systems," IEEE Transactions on Antennas and Propagation, Mar. 1986, vol. 34, No. 3, pp. 291-300.

Guo and Nilsson, "A low-complexity VLSI Architecture for Square Root MIMO Detection", Proceedings of the IASTED Intl. Conference on Circuits Signals, and Systems, May 19-21, 2003, pp. 304-309.

Guo and Nilsson, "A VLSI Architecture of the Schnorr-Euchner Decoder for MIMO Systems", IEEE 6th Circuits and Systems Symposium, May 31-Jun. 2, 2004, Emerging Technologies: Frontiers of Mobile and Wireless Communication, Aug. 2004, vol. 1, pp. 65-68.

IEEE TGn Working Group, "Joint Proposal: High Throughput Extension to the 802.11 Standard: PHY," http://www.ieee802.org/11/; Jan. 2006.

Karkooti and Cavallaro, "FPGA Implementation of Matrix Inversion Using QRD-RLD Algorithm", Conference record of the Thirty-Ninth Asilomar Conference, Oct. 28-Nov. 1, 2005, Signals, Systems and Computers, Mar. 2006, pp. 1625-1629.

Kim et al., "An efficient FPGA Based MIMO-MMSE Detector," Wireless Integrated Systems Research (WISR) Group, UCLA, 2007, pp. 1131-1135.

La Roche and Roy, "An Efficient Regular Matrix Inversion Circuit Architecture for MIMO Processing", 2006 IEEE International Symposium, ISCAS, Sep. 2006, pp. 4819-4822.

Lan Man Standards Committee, "Wireless LAN Medium Access Control (MAC) and Physical Layer (PHY) Specifications," IEEE Std 802.11-1997, The Institute of Electrical and Electronics Engineers, New York, 1997.

Le Floch et al., "Coded Orthogonal Frequency Division Multiplex," Proceedings of the IEEE, Jun. 1995, vol. 83, No. 6, pp. 982-996.

Mchenry and Chunduri, "Spectrum Occupancy Measurements Location 3 of 6: National Science Foundation Building Roof", Apr. 16, 2004, Shared Spectrum Company Report, Aug. 15, 2005.

Mchenry and Steadman, "Spectrum Occupancy Measurements Location 1 of 6: Riverbend Park, Great Falls, Virginia", Apr. 7, 2004, Shared Spectrum Company Report, Aug. 15, 2005.

Mchenry and Steadman, "Spectrum Occupancy Measurements Location 2 of 6: Tyson's Square Center, Vienna, Virginia", Apr. 9, 2004, Shared Spectrum Company Report, Aug. 15, 2005.

Mchenry and Steadman, "Spectrum Occupancy Measurements Location 5 of 6: National Radio Astronomy Observatory (NRAO), Green Bank, West Virginia", Oct. 10-11, 2004, Shared Spectrum Company Report, Aug. 15, 2005.

Mchenry et al., "Spectrum Occupancy Measurements Location 4 of 6: Republican National Convention, New York City, New York", Aug. 30-Sep. 3, 2004, Shared Spectrum Company Report, Aug. 15, 2005.

Mchenry et al., "Spectrum Occupancy Measurements Location 6 of 6: Shared Spectrum Building Roof, Vienna, Virginia", Dec. 15-16, 2004, Shared Spectrum Company Report, Aug. 15, 2005.

Mohammed et al., "Universal MIMO decoder for next generation wireless communication", Poster at annual research review HSSEAS, Feb. 16, 2007.

Myllyla et al., "Complexity Analysis of MMSE Detector Architectures for MIMO OFDM Systems", Thirty-Ninth Asilomar Conference, Oct. 28- Nov. 1, 2008, Signals, Systems and Computers, Mar. 2006, pp. 75-81.

Peha, "Wireless Communications and Coexistence for Smart Environments," IEEE Personal Communications, Oct. 2000, vol. 7, pp. 66-68.

Rife and Vincent, "Use of the Discrete Fourier Transform in the Measurement of Frequencies and Levels of Tones," the Bell System Technical Journal, Feb. 1970, vol. 49, No. 2, pp. 197-228.

S. Nandula and K Giridhar, "Robust Timing Synchronization for OFDM Based Wireless LAN System", Conference on Convergent Technologies for Asia-Pacific Region on Oct. 15-17, 2003, TENCON, Mar. 2003, vol. 4, pp. 1558-1561.

Schmidl and Cox, "Robust Frequency and Timing Synchronization for OFDM," IEEE Transactions on Communications, Dec. 1997, vol. 45, No. 12, pp. 1613-1621.

Seki et al., "A Cordic-Based Reconfigrable Systolic Array Processor for MIMO-OFDM Wireless Communications, "Signal Processing Systems, 2007 IEEE Workshop, Oct. 17-19, 2007, pp. 639-644.

Shah, A, Zhu, W, and Daneshrad, B., "Narrowband Interference Mitigation with MIMO Enabled Nodes," (submitted to IEEE Transactions on Wireless Communications).

(56) References Cited

OTHER PUBLICATIONS

Steinhardt and Pulsone, "Subband STAP Processing, The Fifth Generation", Sensor Array and Multichannel Signal Processing Workshop held on Mar. 16-17, 2000, Proceedings of the 2000 IEEE, Aug. 2002, pp. 1-6.

Wang et al., "Timing Synchronization for 802.11a WLANs under Multipath Channels," Australian Telecommunications, Networks and Applications Conference, 2003.

Wang, "A Recursive Least-Squares ASIC for Broadband 8 X 8 Multiple-Input Multiple-Output Wireless Communications", Nov. 2005.

Wiegandt and Nassar, "High-Throughput, High-Performance OFDM via Pseudo-Orthogonal Carrier Interferometry Coding", The 12th IEEE International Symposium on Personal Indoor and Mobile Radio Communications held Sep. 30-Oct. 3, 2001, PIMRC Proceedings, Aug. 2002, vol. 2, pp. G-98-G-102.

Wiegandt et al., "High-Throughput, High-Performance OFDM via Pseudo-Orthogonal Carrier Interferometry Spreading Codes", IEEE Transactions on Communications, Jul. 2003, vol. 51, No. 7, pp. 1123-1134.

Zhang and Dai, "Cochannel Interference Mitigation and Cooperative Processing in Downlink Multicell Multiuser MIMO Networks," EURASIP Journal on Wireless Communications and Networking, vol. 2004, No. 2, pp. 222-235.

Zhiqiang et al., "Narrowband interference Rejection in OFDM via Carrier Interferometry Spreading Codes," IEEE Transactions on Wireless Communications, Jul. 2005, vol. 4, No. 4, pp. 1491-1505.

Zhu et al., "A real time MIMO OFDM Testbed for Cognitive Radio & Networking Research," Proceedings of the 1st international Workshop on Wireless Network Testbeds, Experimental Evaluation & Characterization, WiNTECH 2006. ACM, New York, NY, pp. 115-116.

* cited by examiner

WIDEBAND INTERFERENCE MITIGATION FOR DEVICES WITH MULTIPLE RECEIVERS

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

1. Field

This disclosure relates generally to communication systems and, more particularly, to systems, methods and devices for mitigating interference in a communication system.

2. Description of Related Art

Wireless communication systems are widely deployed to provide various types of communication (e.g., voice, data, multimedia services, etc.) to multiple users. As the demand for various types of wireless communication grows, there lies a challenge to implement efficient and robust communication systems. Wireless communication is made difficult by various factors that corrupt transmitted signals, such as for example, the presence of noise, multipath fading and interfering signals.

Certain existing communications system standards suffer from various drawbacks such as, for example, a lack of effective and constructive methods for compensating for interference or certain types of noise. In particular, the unlicensed nature of the ISM (Industrial, Scientific, and Medical) bands has allowed for rapid development of various wireless communication technologies and standards such as Bluetooth, which uses the 2450 MHz ISM band, and IEEE 802.11, which uses the 2450 and 5800 MHz ISM bands. Because communication devices using the ISM bands encounter interference from other equipment, these bands are typically given over to uses intended for unlicensed operation, since unlicensed operation typically needs to be tolerant of interference from other devices anyway. Interference becomes an issue as devices are allowed to operate in the same band without pre-determined frequency, temporal, or spatial planning.

There have been several attempts to mitigate this issue via higher layer protocols. For example, methods involving cooperative scheduling have been implemented to turn portions of the random access channel into a controlled access channel. Also, some work has been done to show that time domain signal processing can be used to mitigate the effects of narrowband interference. However, the time domain methods have primarily focused on mitigating interference on the data payload, without taking into account how interference affects other parts of the receiver.

SUMMARY

Various embodiments of systems, methods and devices within the scope of the appended claims each have several aspects, no single one of which is solely responsible for the desirable attributes described herein. Without limiting the scope of the appended claims, some prominent features are described herein.

One aspect of the disclosure is a method of suppressing interference in a wireless communication system, the method comprising: receiving one or more first signals on a frequency band, wherein each of the first signals comprises components from a plurality of sub-channels; converting each of the first signals into a respective plurality of first sub-band frequency components, wherein each sub-band is defined in the frequency domain; determining a respective spatial filter for each frequency sub-band using one or more corresponding first sub-band components for each respective spatial filter; receiving one or more second signals on said frequency band, wherein each of the second signals comprises components from the plurality of sub-channels; converting each of the second signals into a respective plurality of second sub-band frequency components; and generating a corresponding plurality of filtered sub-band components by applying the respective spatial filters to the corresponding second sub-band components for each of the second signals.

In one embodiment, one or more first signals comprises at least two first signals, wherein the first signals are received from a corresponding plurality of receiver antennas, and each of the first signals comprises components from corresponding sub-channels between the plurality of receiver antennas and a plurality of transmitter antennas.

In one embodiment, wherein one or more first signals comprises a single first signal, wherein the first signal is received from a corresponding single receiver antenna, and the first signal comprises components from corresponding sub-channels between the single receiver antenna and a plurality of transmitter antennas.

In one embodiment, wherein one or more first signals comprises at least two first signals, wherein the first signals are received from a corresponding plurality of receiver antennas, and each of the first signals comprises components from corresponding sub-channels between the plurality of receiver antennas and a single transmitter antenna.

Another aspect of the disclosure is a machine readable medium having machine executable instructions stored thereon, that when executed by a computing device are configured to: receive one or more first signals on a frequency band, wherein each of the first signals comprises components from a plurality of sub-channels; convert each of the first signals into a respective plurality of first sub-band frequency components, wherein each sub-band is defined in the frequency domain; determine a respective spatial filter for each frequency sub-band using one or more corresponding first sub-band components for each respective spatial filter; receive one or more second signals on said frequency band, wherein each of the second signals comprises components from the plurality of sub-channels; convert each of the second signals into a respective plurality of second sub-band frequency components; and generate a corresponding plurality of filtered sub-band components by applying the respective spatial filters to the corresponding second sub-band components for each of the second signals.

Another aspect of the disclosure is a device configured to suppress interference in a wireless communication system, the device comprising: at least one input configured to receive at least one signal on a frequency band, wherein each signal comprises components from a plurality of sub-channels; at least one filter configured to convert said at least one signal from the time domain into a corresponding plurality of sub-band frequency components, wherein each sub-band is defined in the frequency domain; a controller configured to execute code; and non-transitory computer readable memory storing code that when executed by the controller is configured to: determine a respective spatial filter for each frequency sub-band using one or more first sub-band components for each respective spatial filter, wherein the one or more first sub-band components are produced by the at least one filter from a corresponding one or more first signals received at the at least one input; and apply the respective spatial filter to one or more second sub-band components to produced filtered sub-band components, wherein the one or more second sub-band components are produced by the at least one filter from a corresponding one or more second signals received at the at least one input.

Another aspect of the disclosure is a method of suppressing interference in a wireless communication system, the method comprising: receiving a first signal on a frequency band, wherein the first signal comprises components from a plurality of sub-channels; converting the first signal into a respective plurality of first sub-band frequency components, wherein each sub-band is defined in the frequency domain; determining a respective spatial filter for each frequency sub-band using corresponding first sub-band components for each respective spatial filter; receiving a second signal on said frequency band, wherein the second signal comprises components from the plurality of sub-channels; converting the second signal into a respective plurality of second sub-band frequency components; and generating a corresponding plurality of filtered sub-band components by applying the respective spatial filters to the corresponding second sub-band components.

Another aspect of the disclosure is a device for suppressing interference in a wireless communication system, the device comprising: means for receiving one or more first signals on a frequency band, wherein each of the first signals comprises components from a plurality of sub-channels; means for converting each of the first signals into a respective plurality of first sub-band frequency components, wherein each sub-band is defined in the frequency domain; means for determining a respective spatial filter for each frequency sub-band using one or more corresponding first sub-band components for each respective spatial filter; means for receiving one or more second signals on said frequency band, wherein each of the second signals comprises components from the plurality of sub-channels; means for converting each of the second signals into a respective plurality of second sub-band frequency components; and means for generating a corresponding plurality of filtered sub-band components by applying the respective spatial filters to the corresponding second sub-band components for each of the second signals.

BRIEF DESCRIPTION OF THE DRAWINGS

These and other sample aspects of the disclosure will be described in the detailed description and the appended claims that follow, and in the accompanying drawings.

Figure 1:
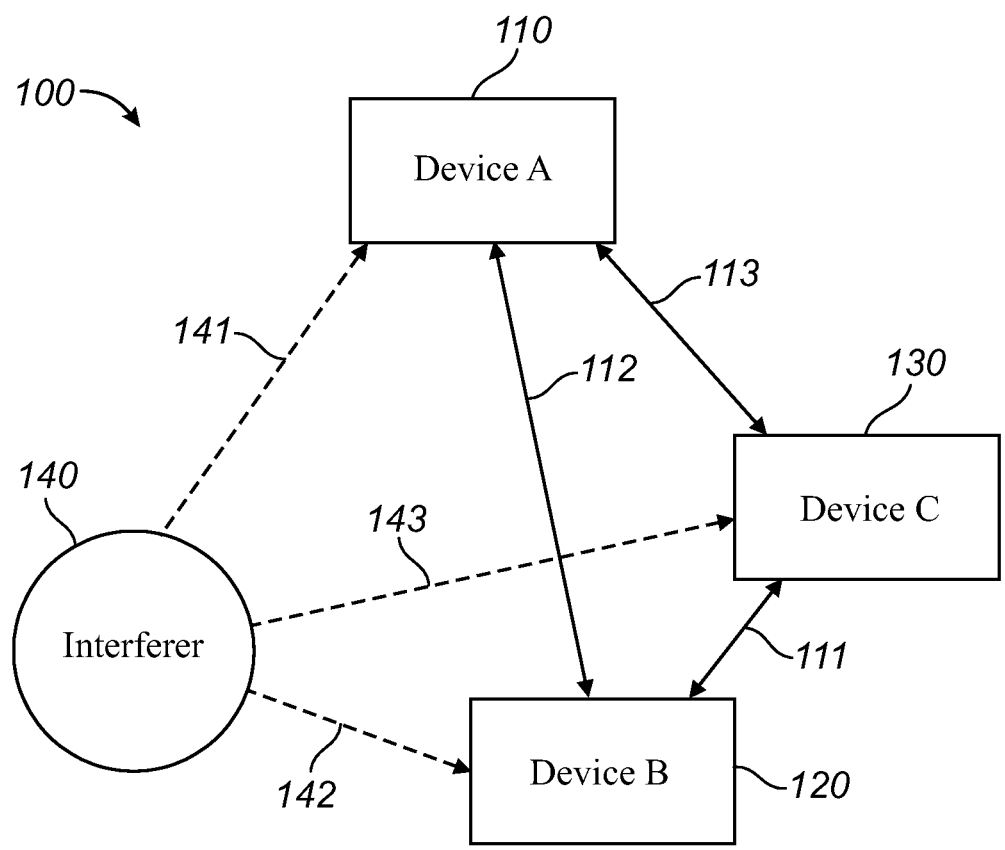
FIG. 1 is a simplified block diagram of a wireless communication network with an interferer.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Although certain preferred embodiments and examples are disclosed below, inventive subject matter extends beyond the specifically disclosed embodiments to other alternative embodiments and/or uses and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

As discussed above, wireless communications is made difficult by various factors, such as for example, the presence of noise, multipath fading and interfering signals. Signals received by a communication device can be modeled as having two components: 1) a signal of interest and 2) other signals, including noise and interference. The signal of interest includes information a transmitter transmits to a receiver. The rest of the signal includes noise and/or interference that make it difficult to discern the signal-of-interest. There are various types of interference. For example, certain types of interference are the result transmission from other devices, or natural phenomena that emit electromagnetic radiation in a frequency band used for communication. Interference can also be created by multiple reflections of a desired signal arriving at a receiver at different times. Those skilled in the art will appreciate that there are numerous types of interference and an enumeration of each type of interference has not been provided herein for the sake of brevity.

FIG. 1 is a block diagram of a wireless communication network with an interferer (or jammer). The wireless communication network 100 comprises three communication devices 110, 120, 130 in data communication with each other over a number of channels 111, 112, 113. When the first device 110, labeled Device A, transmits information to the second device 120, labeled Device B, over a wireless channel 112, the second device 120 receives both the transmitted information and noise. Noise sources in wireless data communication include, but are not limited to, background radiation, thermal noise, electronic noise, etc. The second device 120 can also receive a signal from an interferer 140 over another wireless communication channel 142. The interferer 140 may, for example, be attempting to transmit information to the third device 130, labeled Device C, be transmitting information within another wireless communication network, or transmitting a jamming signal to interfere with the network. Although the interferer 140 may be transmitting information, from the point of view of the second device 120, the interferer 140 is a noise source.

Various methods of communicating in the presence of noise and/or interference have been developed, including the use of multiple transmitters and/or multiple receivers at one or more of the communicating devices. For example, IEEE 802.11n is a proposed amendment to the IEEE 802.11-2007 wireless networking standard to significantly improve network throughput over previous standards, such as 802.11b and 802.11g, by using a multiple-input/multiple-output (MIMO) system.

Nevertheless, some existing communications system standards lack of effective and constructive methods for compensating for interference and/or noise. In particular, the unlicensed nature of the ISM (Industrial, Scientific, and Medical) bands often requires communication devices that use the ISM bands to tolerate interference from other equipment. Interference from other devices becomes an issue as devices are allowed to operate in the same band without pre-determined frequency, temporal, or spatial planning.

There have been several attempts to mitigate this issue via higher layer protocols. For example, methods involving cooperative scheduling have been implemented to turn portions of the random access channel into a controlled access channel. Also, some work has been done to show that time domain signal processing can be used to mitigate the effects of narrowband interference. However, these methods have primarily focused on mitigating interference on the data payload, without taking into account how interference affects other parts of the receiver, e.g., they assume ideal estimation for parameters such as synchronization, including tasks such as gain control, packet detection, carrier frequency offset correction and channel estimation.

Moreover, in military applications, where protection against jamming interference is a design criterion, there is now an increasing demand for high speed communications. On the other hand, several commercial networks such as WiFi and wireless video distribution systems are using unlicensed bands which are quickly becoming overcrowded. The ability of a system to cancel interference in these conditions may affect its commercial viability.

The use of multiple antennas is motivated in part by the fact that the channel capacity of the resultant channel can scale linearly with the number of transmitters/receivers. Multiple-Input/Multiple-Output (MIMO) antenna systems also provide the user with additional degrees of freedom over traditional single antenna (SISO) systems to enable optimum transmission and compensate for in-band interference in scatter rich environments. It may be desirable to use multi-antenna techniques to compensate for in-band interference in scatter rich environments. Some work has been done on MIMO based interference mitigation for cellular systems. This work has focused on reducing interference from neighboring cells or users by coordinating transmissions either in time, space or frequency. MIMO does not, however, provide a method for mitigating interference from a non-cooperative external device transmitting an interfering signal, such as a jammer or a non-cooperative co-user of the frequency band.

An iterative maximum likelihood (ML) based algorithm may be effective, but it is computationally expensive and may not be feasible for high rate modulations. A minimum interference method may offer good performance in some scenarios but degrades when the interference becomes weak. While these methods address channel estimation in the presence of interference, they likewise do not consider gain control, packet detection or carrier frequency offset in the presence of a non-cooperative external devices.

The multiple antennas in MIMO systems can be used as a spatial filter to mitigate unwanted interferences. The most straightforward approach to provide spatial interference mitigation is to introduce at the beginning of the receiver chain a multi-tap interference rejection matrix filter. The matrix taps of this filter can be chosen to provide a null in the directions of the MIMO mulitpaths channels of the interferences. However, this approach has as least two drawbacks which make it impractical. First, the estimation algorithms used to find the multitude of spatial filter taps are complex and take a long time to converge within an acceptable residual error, which makes it inappropriate for packet-based communications. Second, the spatial filter must operate at the symbol rate, and the filter length must match the interference channels excess delay. This means that for each received symbol, a large number of matrix multiplications occur, making this approach too computing intensive for a practical implementation.

Figure 2:
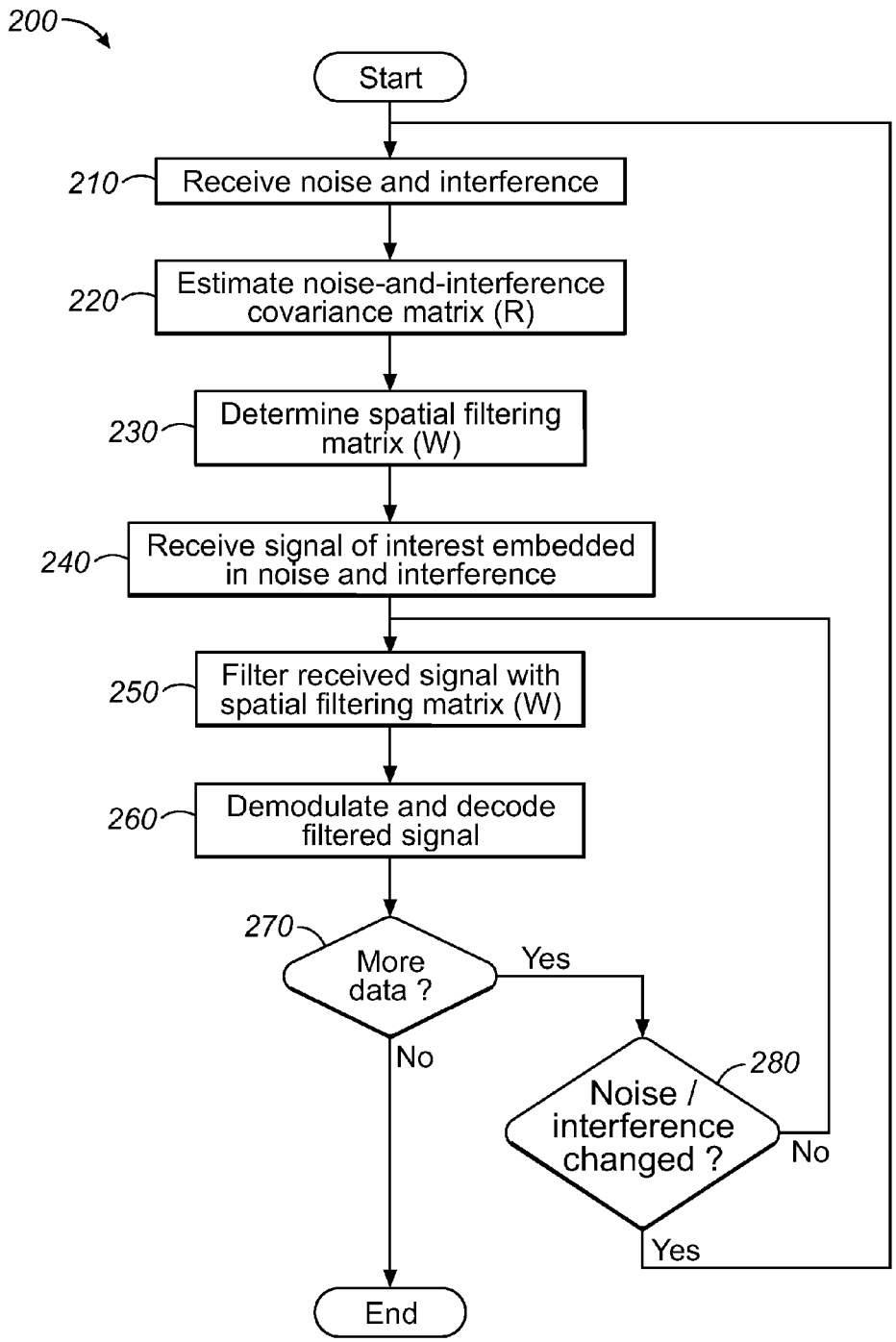
FIG. 2 is a flowchart illustrating a method of mitigating interference in a wireless communication network.

By contrast, using a single tap spatial filter, in accordance with aspects of embodiments disclosed herein, instead of the multi-tap filter addresses both these problems. Embodiments of a single-tap spatial filter can be effective in mitigating or reducing narrowband interference. FIG. 2 is a flowchart illustrating a process 200 for mitigating interference in a wireless communication network using multiple antennas. The process 200 for mitigating interference can be performed, for example, by a receiving device. In block 210, the process begins by receiving a noise-and-interference signal comprising at least noise component and an interference component. It is preferable that the noise-and-interference signal not comprise a component corresponding to the signal of interest; however, the scope of the invention is not so-limited. In some embodiments, the noise-and-interference signal is further processed to identify the separate noise and/or interference components from other components. The noise-and-interference signal can be received on a number of different antennas; therefore, the noise-and-interference signal can include multiple sub-signals, each sub-signal corresponding to a single antenna. Reception of the noise-and-interference signal can be performed prior to the transmission of the signal of interest by a transmitting device, or can be received in between transmissions by the transmitting device.

In block 220, the covariance matrix of the noise-and-interference signal is estimated. The noise-and-interference covariance matrix (R) can be estimated using a number of suitable methods. For example, the noise-and-interference signal can be decomposed in time into a number of shorter sub-signals. The outer product of each of these sub-signals can then be taken and averaged to form an estimate of the noise-and-interference covariance matrix (R). In other embodiments, the noise-and-interference signal can be decomposed in frequency, e.g., via a suitable transform such as the Fourier transform. In block 230, a spatial filtering matrix (W) is computed, or otherwise derived, based on the estimated noise-and-interference covariance matrix (R). The spatial filtering matrix (W) is, in some embodiments, a multi-antenna filter. A number of methods for determining the spatial filtering matrix are disclosed herein, including eigenvector nullling, noise whitening, covariance matrix inversion, and covariance matrix inversion with diagonal loading.

In block 240, a communication signal is received, the communication signal including the signal of interest, noise, and interference. As described above with respect to the noise-and-interference signal, the communication signal can be received on a number of antennas, and therefore can include multiple sub-signals, each sub-signal corresponding to a single antenna. In other embodiments, the signal of interest, embedded in noise and interference, is received, before the noise-and-interference signal. In general, in different embodiments of the method, the steps performed in the blocks of FIG. 2 can be performed in different orders. In block 250, the spatial filtering matrix (W) is applied to the communication signal to produce a filtered communication signal. Application of the spatial filtering matrix (W) to the communication signal can be a matrix-vector multiplication performed by software running in a microprocessor. Alternatively, application of the spatial filtering matrix can be accomplished using hardware such as an adaptive filter. Other suitable techniques for applying the spatial filtering matrix can be used. The filtered communication signal is then, in block 260, demodulated and/or decoded according to standard methods.

In block 270, it is determined if there is more data to be received. If not, the process 200 ends. If there is more data to be received, the process moves to block 280, where it is determined whether the noise-and-interference signal has changed. In some embodiments, when an analog gain control (AGC) gain has changed, it is determined that the noise-and-interference signal has changed. Other methods of determining a change in the noise-and-interference signal can also be used. When it is determined that the noise-and-interference signal has changed, the process restarts at block 210. However, when it is determined that the noise-and-interference signal is substantially the same, the process returns to block 240 to receive further communication signals. Some embodiments of the process lack block 280, and instead return to block 210 when more data is to be received.

Figure 3:
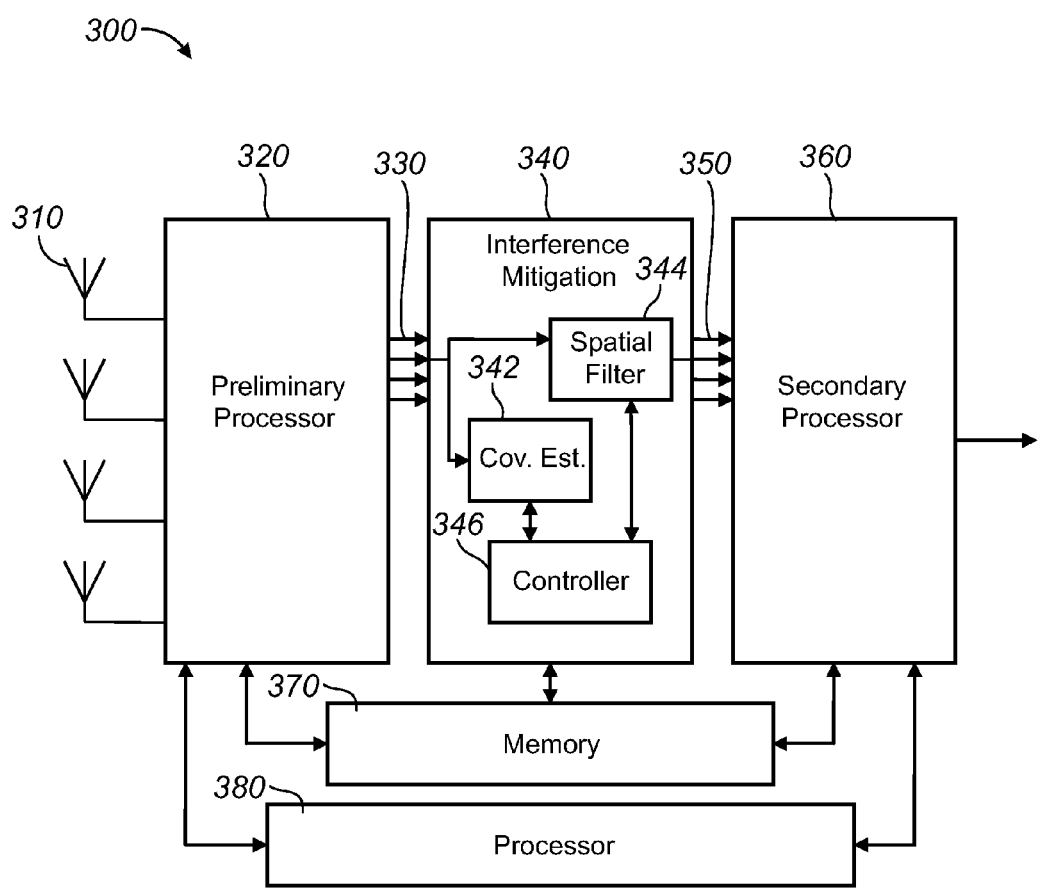
FIG. 3 is a block diagram of a receiver in a wireless communication network.

FIG. 3 is a functional block diagram of a receiver having an interference mitigation module. The receiver 300 can implement the procedure 200 described above and/or other interference mitigation procedures. The receiver 300 includes a number of antennas 310. Without limiting the number, the receiver can have two, three, four, or more than four antennas. In some embodiments, the antennas are configured for both reception and transmission of signals, whereas in other embodiments, the antennas are only configured for receiving signals. In some embodiments, the receiver 300 can have a different number of transmitting antennas than receiving antennas. The antennas are electrically coupled to a preliminary processor 320.

The receiver includes both a preliminary processor 320 and a secondary processor 360. The preliminary processor 320 can include mechanisms for processing received signals prior to interference mitigation, and the secondary processor 360 typically includes mechanisms for processing the filtered communication signal. The preliminary processor 320 can include modules for analog gain control (AGC), spatial, temporal, or frequency-based filtering, such as bandpass or halfband filtering, and/or performing a Fourier or inverse Fourier transform. The secondary processor 360 can include modules such as a demodulation module, a Fourier transform or inverse Fourier transform module, a decoder module for decoding signals coded using an error-corrective code such as a Hamming code, a convolutional code, a turbo code, or a low-density parity check (LDPC) code, a deinterleaving module, and a demultiplexer. In other embodiments, modules which are listed as being associated with the secondary processor 360 can be included in the preliminary processor 320.

The receiver also includes an interference mitigation module 340 which receives data from the preliminary processor 320 over a data link 330, performs an interference mitigation procedure on the data received from the preliminary processor 320, and then transmits the filtered data to the secondary processor 360 over a data link 350. The interference mitigation module 340 can include a number of sub-components, as discussed in detail below.

The receiver can also include a microprocessor 370 and a memory 380. The microprocessor can be used by any of the other components, such as the primary processor 320, the interference mitigation module 340, or the secondary processor 360 to perform data calculations. As used herein, the term "processor" refers broadly to any suitable device, logical block, module, circuit, or combination of elements for executing instructions. The microprocessor 370 can be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the processor can be any conventional special purpose microprocessor such as a digital signal processor. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor, such as microprocessor 370 can be a conventional microprocessor, but in the alternative, the microprocessor 370 can be any conventional processor, controller, microcontroller, or state machine. Microprocessor 370 can also be implemented as a combination of computing devices, e.g., a combination of a DSP and a microprocessor, a plurality of microprocessors, one or more microprocessors in conjunction with a DSP core, or any other such configuration.

The memory 380 can also be connected to the other components of the receiver, such as the preliminary processor 320, the interference mitigation module 340, the secondary processor 360 and the microprocessor 370. Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), which are directly connected to the one or more processors of the receiver 300. Other types of memory include bubble memory and core memory.

The interference mitigation module 340 comprises a number of sub-components, including a covariance estimation submodule 342, a spatial filter submodule 344, and a controller 346. The covariance estimation submodule 342 and spatial filter submodule 344 both receive data from the preliminary processor 320 over the data link 330. Both the covariance estimate submodule 342 and the spatial filter submodule 344 are electrically coupled to the controller 346 which controls the functions of the submodules.

The covariance estimation submodule 342 receives signals from the antennas 310 via the preliminary processor 320 and estimates the covariance of the received signal. As described above, in one embodiment, the covariance estimation submodule temporally splits the received signal into a number of sub-signals and averages the outer product of the sub-signals.

The spatial filter submodule 344 both generates and applies a spatial filter to signals received from the antennas via the preliminary processor 320, such as the communication signal comprising the signal of interest embedded in noise and interference. In some embodiments of the receiver 300, the generation and application of the spatial filter are performed in separate modules. For example, in one embodiment the generation of the spatial filter is performed by the microprocessor 380. In other embodiments, a dedicated spatial filter generation module can be distinct from a spatial filter application module. Once the noise-and-interference covariance matrix (R) has been estimated, e.g., by the covariance estimation submodule 342, there are several methods that can be used to generate a spatial filtering matrix (W). Methods disclosed herein include eigenvector nulling, noise whitening, covariance matrix inversion, and covariance matrix inversion with diagonal loading. Other methods of generating the spatial filtering matrix can also be used.

As mentioned above, there are a number of methods for generating a spatial filtering matrix (W) based on the estimated noise-and-interference covariance matrix (R). One such method, eigenvector nulling (or simply eigen nulling), involves placing a null in the direction of the strongest eigenmode. One method of doing this involves taking a eigendecomposition or singular value decomposition (SVD) of the estimated noise-and-interference covariance matrix (R) and replacing the strongest eigenvector corresponding to the largest eigenvalue with the all-zeroes vector. The singular value decomposition theorem states that any matrix, such as the estimated noise-and-interference covariance matrix (R), can be factored as follows:

$$R = U\Sigma V^*,$$

where U and V are unitary matrices, and E is an matrix with non-negative values along its diagonal. Assuming that R is a 4×4 matrix, corresponding to a receiver 300 with four antennas 310, this can further be written as:

$$R = U\Sigma V^* = \begin{bmatrix} [u_1] & [u_2] & [u_3] & [u_4] \end{bmatrix} \begin{bmatrix} \sigma_1 & & & \\ & \sigma_2 & & \\ & & \sigma_3 & \\ & & & \sigma_4 \end{bmatrix} \begin{bmatrix} [v_1] \\ [v_2] \\ [v_3] \\ [v_4] \end{bmatrix}^*,$$

where $u_1$, $u_2$, $u_3$, and $u_4$ are eigenvectors, and $\sigma_1$, $\sigma_2$, $\sigma_3$, and $\sigma_4$, are the singular values. The singular values are sorted such that $\sigma_1 > \sigma_2 > \sigma_3 > \sigma_4$.

The spatial filtering matrix (W) can be derived from the matrix U, by replacing the leftmost column with the all-zeros vector and conjugating the result. Thus, in some embodiments, $$W = [[0][u_2][u_3][u_4]]^*.$$

Eigenvector nulling has shown to be very effective when the interference power is high. It places a harsh null in the direction of the strongest eigenmode. However, as the interference power approaches the noise floor, the harshness of the null may be detrimental to the performance. This may result from the main lobe of the strongest eigenmode becoming distorted by the noise. This may also result in the sidelobes being larger. When the noise power is within 10 dB of the interference power, the covariance matrix may be less likely to optimally identify the interference source with its strongest eigenvector. This may cause suboptimal nulling and, in some cases, may hinder performance. Heuristic schemes can be derived to disable interference mitigation using eigenvector nulling when the interference power is low.

Another method of interference mitigation is noise whitening. Noise whitening (or simply whitening) involves using the square root of the inverse of the estimated noise-and-interference covariance matrix as the spatial filter. The noise whitening approach provides an output signal with substantially uncorrelated noise. A drawback of this approach is that, in some applications, it can potentially amplify the noise. Preferably, the interference mitigation method should suppress the interference power more than it amplifies then noise power.

Simulations have shown circumstances in which the noise whitening approach was unable to sufficiently suppress the interference power, and provided only a marginal improvement when compared to results with no interference mitigation at all. An alternative approach is to skip the square root and use the inverse directly. This method, referred to a covariance matrix inversion (or nulling), results in a suppression of the interfering signal which is much higher, with the drawback that the residual noise will be correlated. Since the residual interference power may in some circumstances be the limiting factor for performance, the reduction in its power may be more beneficial than the lack of whiteness in the noise signal.

Mathematically, the spatial filter (W) for noise whitening can be written as follows:

$$W = \begin{bmatrix} [u_1] & [u_2] & [u_3] & [u_4] \end{bmatrix} \begin{bmatrix} \frac{1}{\sqrt{\sigma_1}} & & & \\ & \frac{1}{\sqrt{\sigma_2}} & & \\ & & \frac{1}{\sqrt{\sigma_3}} & \\ & & & \frac{1}{\sqrt{\sigma_4}} \end{bmatrix} \begin{bmatrix} [v_1] \\ [v_2] \\ [v_3] \\ [v_4] \end{bmatrix}^*.$$

The spatial filter (W) for nulling can be written as follows:

$$W = \begin{bmatrix} [u_1] & [u_2] & [u_3] & [u_4] \end{bmatrix} \begin{bmatrix} \frac{1}{\sigma_1} & & & \\ & \frac{1}{\sigma_2} & & \\ & & \frac{1}{\sigma_3} & \\ & & & \frac{1}{\sigma_4} \end{bmatrix} \begin{bmatrix} [v_1] \\ [v_2] \\ [v_3] \\ [v_4] \end{bmatrix}^*.$$

Inadequate estimation of the covariance matrix can lead to large sidelobes and a distorted mainlobe in the spatial gain pattern of the receiver 300. In order to mitigate these effects, diagonal loading can be applied to the estimated noise-and-interference covariance matrix prior to taking the inverse as described above. This method has been shown to improve the stability of the resulting inverse. Diagonal loading involves adding a value to each diagonal element of the estimated noise-and-interference covariance matrix. This improves the rank of the estimated noise-and-interference covariance matrix and the spatial gain pattern of the inverse that is calculated. One may see the greatest benefit from this technique when the interference power is close to the noise power. Diagonal loading reduces the depth of the nulls that are created. The diagonal loading added to the estimated noise-and-filter covariance can be based on the noise power and can be any fraction of or greater than the noise power.

Other methods, such as methods based on combinations of the teachings of the disclosed embodiments, can also be used to determine the spatial filter (W). The spatial filter (W) can be based, at least in part, on the estimated noise-and-interference covariance matrix (R). The spatial filter (W) can also or instead be based on a different covariance matrix, such as the covariance matrix of the communication signal or a predetermined noise-and-interference covariance matrix.

As stated above, both the covariance estimation submodule 342 and the spatial filter submodule 344 are provided to the controller 346 which controls the functions of the submodules. The controller 346 is, in some embodiments, responsible for coordinating the transmission and reception of data (such as matrices) between components of the receiver 300. It can also be responsible for ensuring that the noise-and-interference covariance matrix is not estimated while the signal of interest is being transmitted. Finally, the controller 346 may also ensure that the spatial filtering matrix is not updated while the receiver 300 is decoding a packet.

In order to prevent estimation of the covariance matrix while the signal of interest is in transit, a protocol may be used that provide times when the channel between two devices is free of a signal-of-interest component. For example, by guaranteeing an interframe spacing (IFS), the protocol can ensure that the receiver 300 has enough time to estimate the noise-and-interference covariance matrix between packets. In some embodiments, a protocol guarantees an IFS of at least 1 microsecond, about 50 microseconds, between 10 and 100 microseconds, or another suitable IFS that provides enough time for covariance matrix estimation to occur. The controller 346 can also keep track of settings from within the preliminary processor 320, such as the gain setting of an analog gain control unit. If the gain changes during an estimation period, this can be factored into the estimation of the noise-and-interference covariance matrix. In one embodiment, the estimation is restarted. In other embodiments, the data is weighted according to the gain setting at the time of recording, but this is complicated by the transient dynamics of the analog gain control unit. While estimating the covariance of the noise-and-interference signal, key control signals from the receiver 300 can also be observed, such as a control signal indicating a packet has been detected.

In order to have a robust interference mitigation subsystem another protocol for handling loss of synchronization with the transmitter has been developed. If the covariance matrix is estimated while the signal of interest is being transmitted, or if the covariance estimate is otherwise faulty, the signal of interest could potentially be removed. To prevent this failure condition, a timeout period is used as a failsafe mechanism. If no packet is detected after a given amount of time, the controller 346 can enter a timeout state. While in this state the controller 346 waits for a fixed period of time between computing estimates of the noise-and-interference covariance. The microprocessor 380 can continue to process the covariance estimates and return filtering matrices. The controller 380 can continue to operate in timeout mode until another packet is detected. The amount of time required to recover from this type of failure depends on the ratio of the length of the packet (in microseconds) and the length of the interframe spacing. If the transmission times are chosen randomly, then the probability of n successive failed covariance estimates and the probability of a successful covariance estimate can be determined from the equations that follow:

$$P_{fail} = \frac{T_{packet}}{T_{IFS} - T_{estimation}}$$

$$P_{failed\_covariance} = P_{fail}^n, n = \text{trails}$$

$$P_{succesful\_covariance} = 1 - P_{failed\_covariance} = 1 - P_{fail}^n$$

Figure 4:
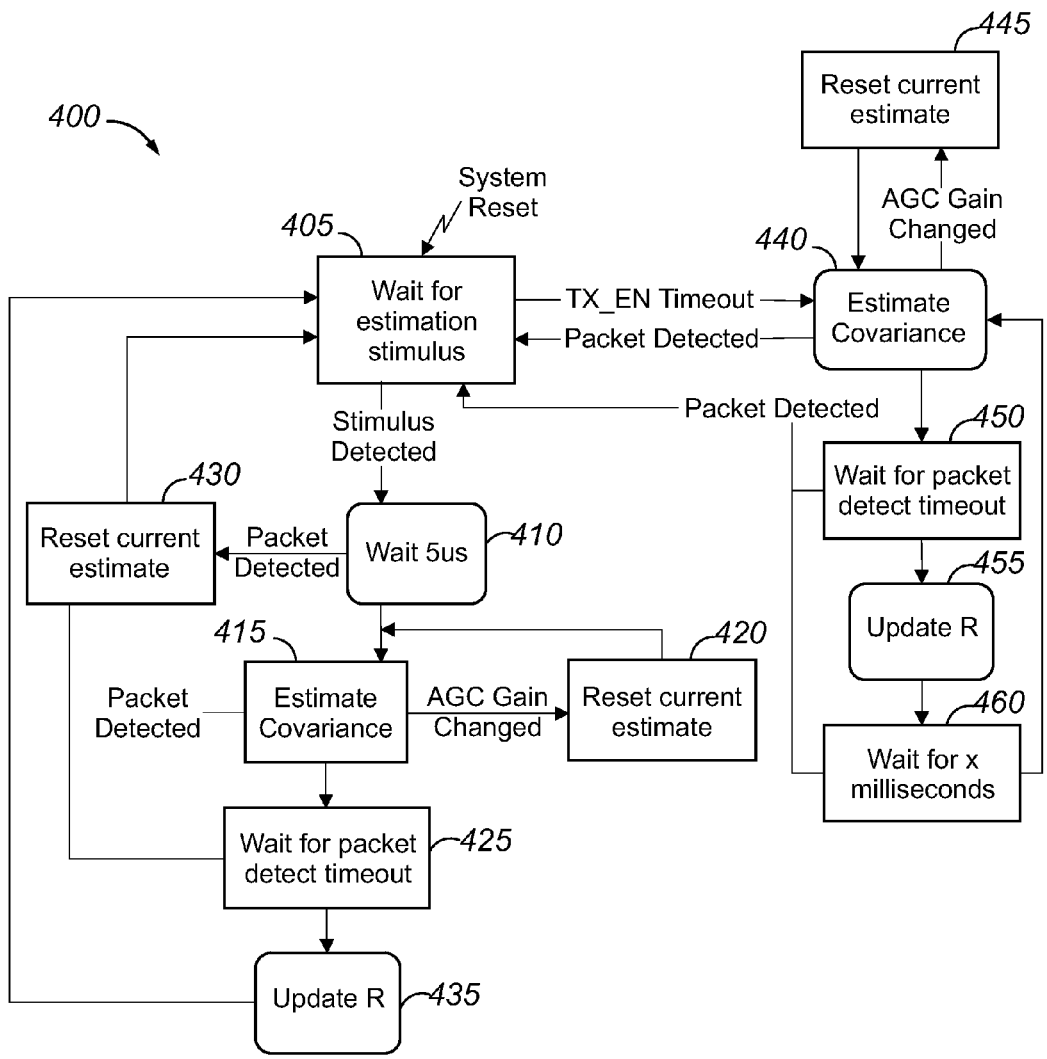
FIG. 4 is a state diagram illustrating a method of controlling an interference mitigation module.

The state diagram of an embodiment of a controller 346 that performs the operations described above is shown in FIG. 4. The oval states are the states during which the controller 346 allows for updating of the spatial filtering matrix from the microprocessor 380. The states labeled "Update R" are the states during which the controller 346 can pass a new matrix to the microprocessor 380. This state machine ensures the covariance matrix is computed during interframe spacings without fluctuations from the analog gain control unit. It also ensures that the spatial filtering matrix is not updated while a packet is being decoded, e.g., by the secondary processor 360.

The controller 346 begins in state 405, in which it waits for an estimation stimulus. The estimation stimulus is any event recognizable by the controller 346 to trigger estimation of the covariance matrix. The estimation stimulus can be derived from a waveform received on the antennas 310, or the estimation stimulus can be a control signal from the microprocessor 380. For example, the event can be the detection of a packet, or the detection of a packet with specific information in a header thereof. Alternatively, the event can be the reception of a signal from the microprocessor 380 indicating that estimation of the covariance matrix should occur. The microprocessor 380 can determine when to transmit such a signal based on any of a number of factors, such as when a packet has been detected or when it is determined that packets are no longer being detected. Once the stimulus is detected, the controller 346 moves to state 410 in which it waits a certain amount of time, such as, for example, a predetermined amount of time sufficient to ensure the channel is free of a signal-of-interest component, e.g., at least 1 microsecond, between about 1 microsecond and about 100 microseconds, 5 microseconds, an amount of time determined algorithmically, or another suitable amount of time, before moving to state 415. The controller 346 can be configured to wait another suitable amount of time before moving to state 415. In state 415, the controller 346 instructs the covariance estimation submodule 342 to estimate the noise-and-interference covariance matrix based on a received waveform. The waveform can be associated with a reception time, e.g., the period of time over which the waveform was received on the antennas 310. Due to finite processing speed, the time at which the covariance matrix submodule 342 obtains the waveform can be different from the reception time, which corresponds to when the waveform is received on the antennas 310. If the controller 346 determines that the analog gain control setting has changed during the reception time, the controller 346 can reset the current estimate in state 420 and instruct the covariance estimation submodule 342 to restart estimation of the noise-and-interference covariance matrix based on a new waveform with a new reception time. Similarly, if the controller 346 determines that a packet has been detected during the reception time, the controller 346 can reset the current estimate of the covariance matrix in state 430.

Once the noise-and-interference covariance matrix is estimated, the controller 346 enters an idle state 425 in which it waits to detect a packet or to timeout. Due to finite processing speed, there is a delay between the reception time of the waveform and when a packet is detected in the waveform. Thus, the controller waits an appropriate delay or interval before determining that a packet (or signal of interest component) is not present in the received waveform on which the covariance matrix estimate is based. If a packet is detected during idle state 425, the controller enters a state 430 in which the noise-and-interference covariance matrix is reset. If the controller 346 times out from state 425, it enters a state 435 in which it instructs the microprocessor 380 or the spatial filter module 344 to update the spatial filtering matrix. Both states 430 and 435 return the controller 346 to the start state 405.

If an estimation stimulus is not detected, or if a faulty estimation occurs, as described above, the controller 346 enters a state 440 in which it instructs the covariance estimation submodule 342 to estimate the noise-and-interference covariance matrix based on a received waveform associated with a reception time. As above, if the controller 346 detects that the analog gain control settings have changed during the reception time, the controller 346 resets the current estimate in a reset state 445 and instructs the covariance estimation submodule 342 to restart estimation of the noise-and-interference covariance matrix based on a new received waveform with a new reception time. If the controller 346 determines that a packet has been detected during the reception time, the controller 346 returns to the start state 405.

After the noise-and-interference covariance matrix has been estimated, the controller 346 enters an idle state 450 in which it waits to detect a packet or timeout. If a packet is detected, the controller returns to the start state 405. If the controller 346 times out from state 450, it enters a state 455 in which it instructs the microprocessor 380 or spatial filter module 344 to update the spatial filtering matrix before changing to a state 460 in which the controller 346 waits an amount of time before returning to the start state 405.

Simulation and Implementation

The systems and methods disclosed above can be implemented using suitable hardware, software, and/or a combination of hardware and software. A discussion of the results of empirical tests using the above-discussed systems and methods is now presented.

A simulation of the systems and methods disclosed herein was performed using a model of a transmitter compliant with the current IEEE 802.11n standard, channel models disclosed by the IEEE 802.11 standard, and a model of the receiver as discussed above. The simulation was performed using MATLAB produced by The MathWorks, Inc. The transmitted data was randomly generated and encoded with a rate 1/2 convolutional code ($133_8$, $171_8$). In cases where the transmission scheme called for more than one spatial stream, the encoded data was spread across the streams in a systematic manner to take advantage of spatial diversity.

The encoded data on each spatial stream was then interleaved and mapped into a quadrature amplitude modulation (QAM) constellation. The interleaver depth was matched to the number of encoded bits that was modulated onto each orthogonal frequency division multiplex (OFDM) symbol. The constellation used in the simulation was 16-QAM. Each of these constellation points was used to modulate 52 data subcarriers in the OFDM system. The modulation was performed with a 64-point FFT (Fast Fourier Transform), after which the resulting signal was extended with a 16 sample cyclic prefix. When added to a OFDM modulation scheme, the cyclic prefix helps combat the effects of a multipath channel and reduces inter-carrier interference. The resulting OFDM symbols were then windowed and concatenated to generate the data payload of the transmitted packet, which was sampled at 20 MHz.

In order to test the performance of some of the disclosed multi-antenna interference mitigation algorithms disclosed above, simulations were performed in which single tone jammer was randomly placed in the band of interest. Both the jammer and the transmitted packet were passed through spatial channels and combined at the receiver. The resultant signal was subjected to an interference mitigation algorithm and demodulated and decoded according to current standards.

The transmitted signal and the interfering source were convolved with randomly generated channels. These channels were modeled after the channels described in the IEEE 802.11 TGn Draft proposal, in which channels A, B, and D were used. Channel A is a signal-tap Rayleigh flat fading channel, channel B is a frequency-selective channel with 15 ns rms delay spread, and channel D is a frequency-selective channel with 50 ns rms delay spread. These channels are typical of what would be seen in a home environment. In some embodiments, the amount of delay spread has a dramatic affect on the performance of the system.

The transmitted waveform was an 802.11n compliant OFDM signal. Thus, it used the same short and long training sequences for time and frequency synchronization. In the simulation, an HT (High Throughput) mixed mode packet format was used for all packets. Channel estimation was done using the HT long training sequences. The data payload of the packets was 100 bytes.

A quiet period was inserted before each packet which the receiver used to estimate the noise-and-interference covariance matrix (R). The estimation was performed using 1000 samples. Once the noise-and-interference covariance matrix (R) had been estimated, various method were used to generate the spatial filtering matrix (W). The received signal ($y_{dirty}$) was multiplied by spatial filtering matrix (W) to generate the filtered version of the signal ($V_{clean}=Wy_{dirty}$). The filtered signal was then passed into a standard-compliant 802.11n receiver. The decoded data was compared with the transmitted data to determine if the packet was received correctly. Packet error rate is calculated based on the output of the receiver.

As an initial measure of performance, simulations were performed to investigate the gain in SINR. To perform this measurement, instead of combining the data signal and the interference signal, the spatial filtering matrix was applied to each signal individually. The signal power and interference power were measured before and after the application of the spatial filtering matrix. The ratio of these powers was averaged over 1000 trials. The signal-to-interference ratio (SIR) was swept from −20 dB to +15 dB for channels A, B, and D at a signal-to-noise ratio (SNR) of 10 dB, 15 dB, 20 dB, and 25 dB.

Figure 5A:
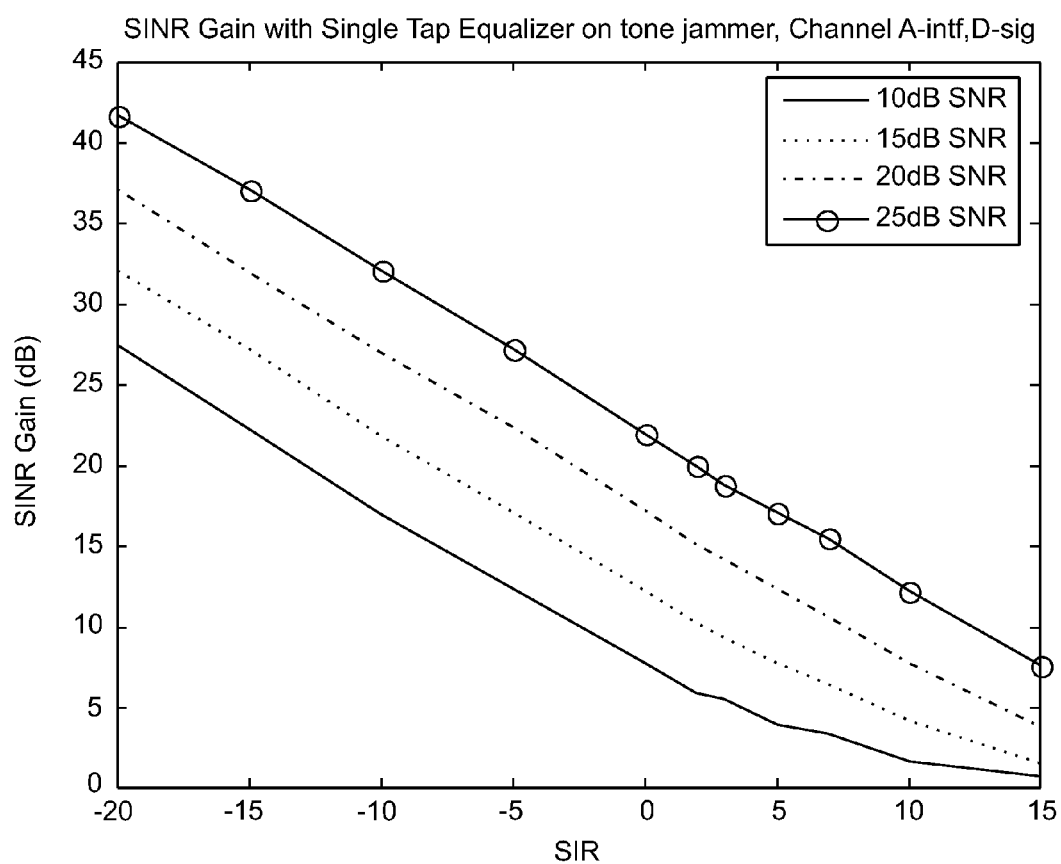
FIGS. 5A-5L are plots of the simulated signal-to-noise-plus-interference ratio (SINR) gain of various channels using a various interference mitigation methods.
Figure 5B:
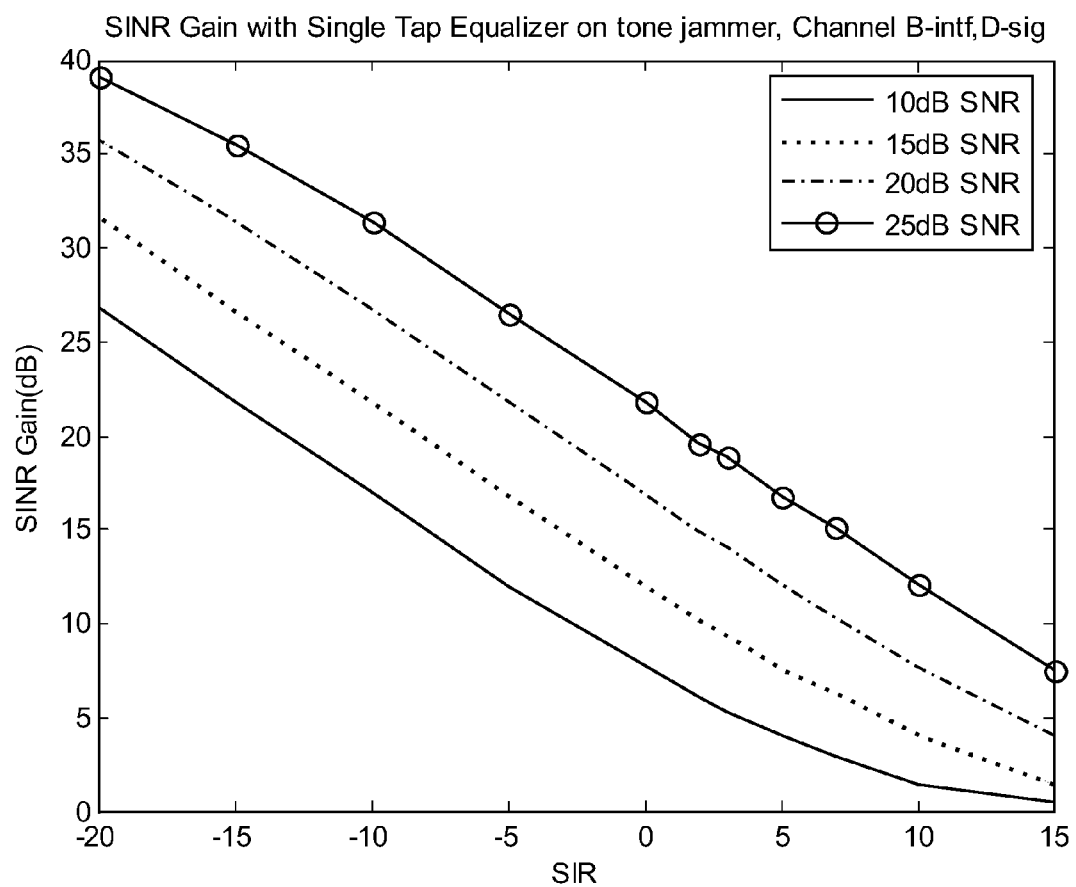
Figure 5C:
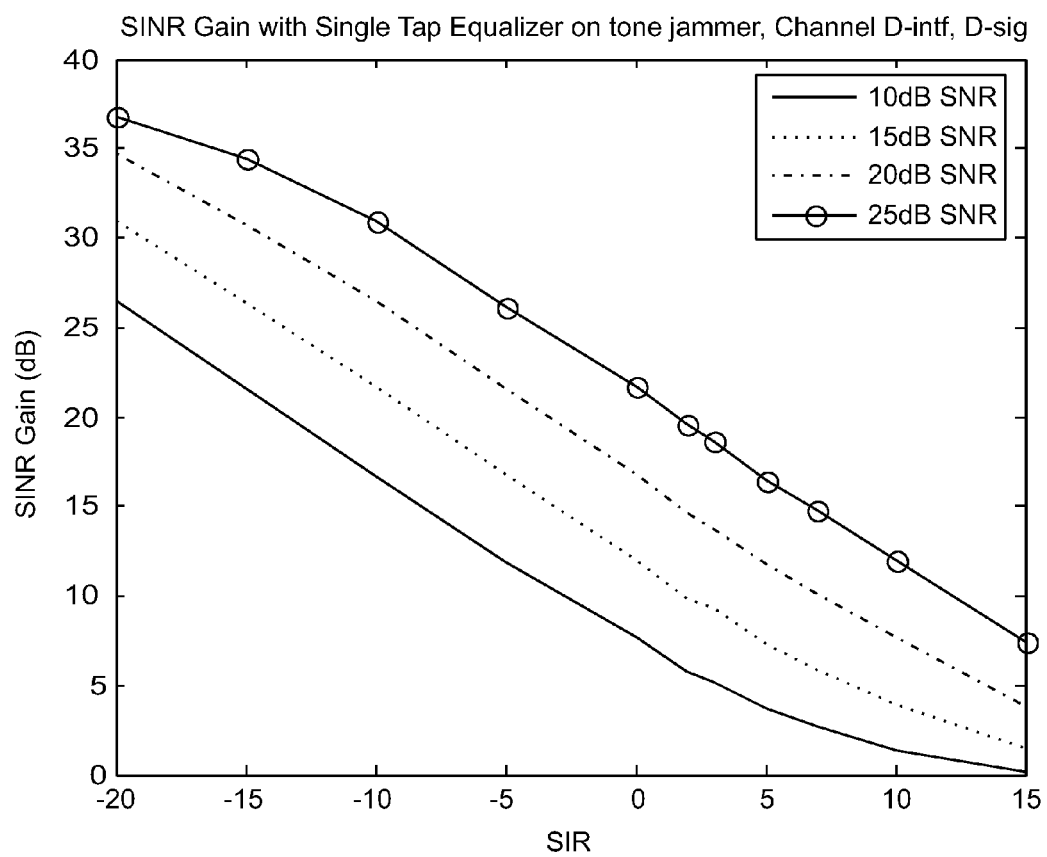
Figure 5D:
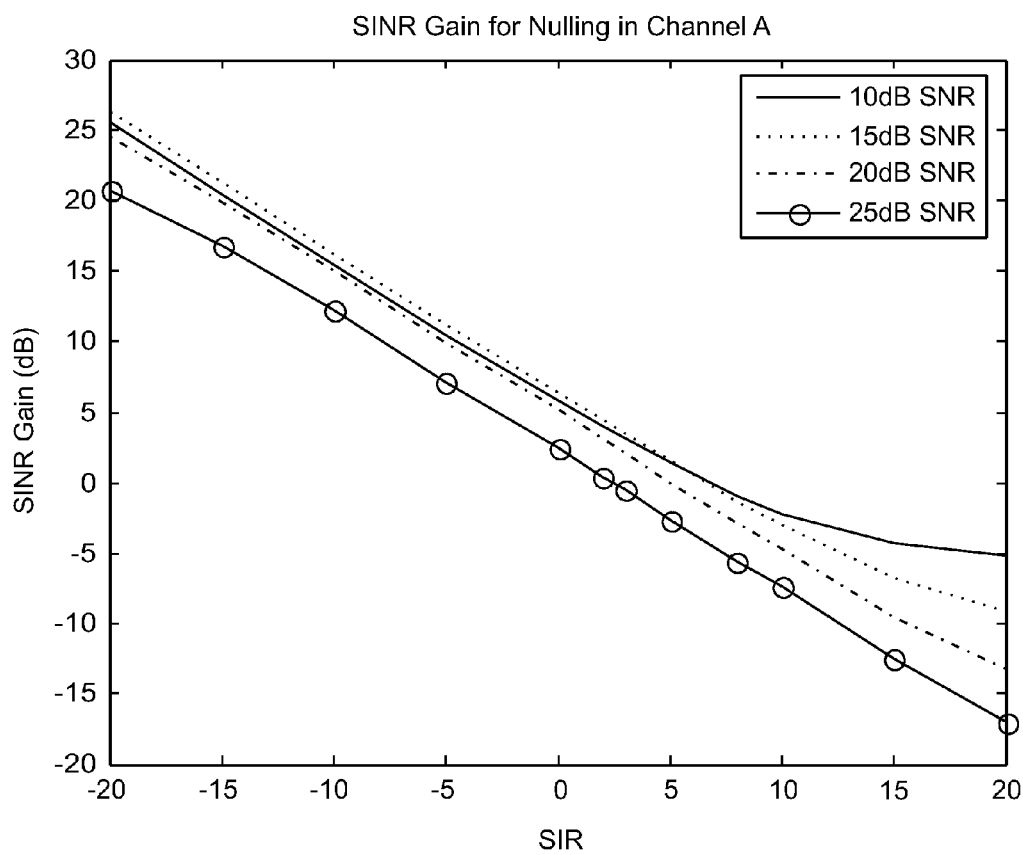
Figure 5E:
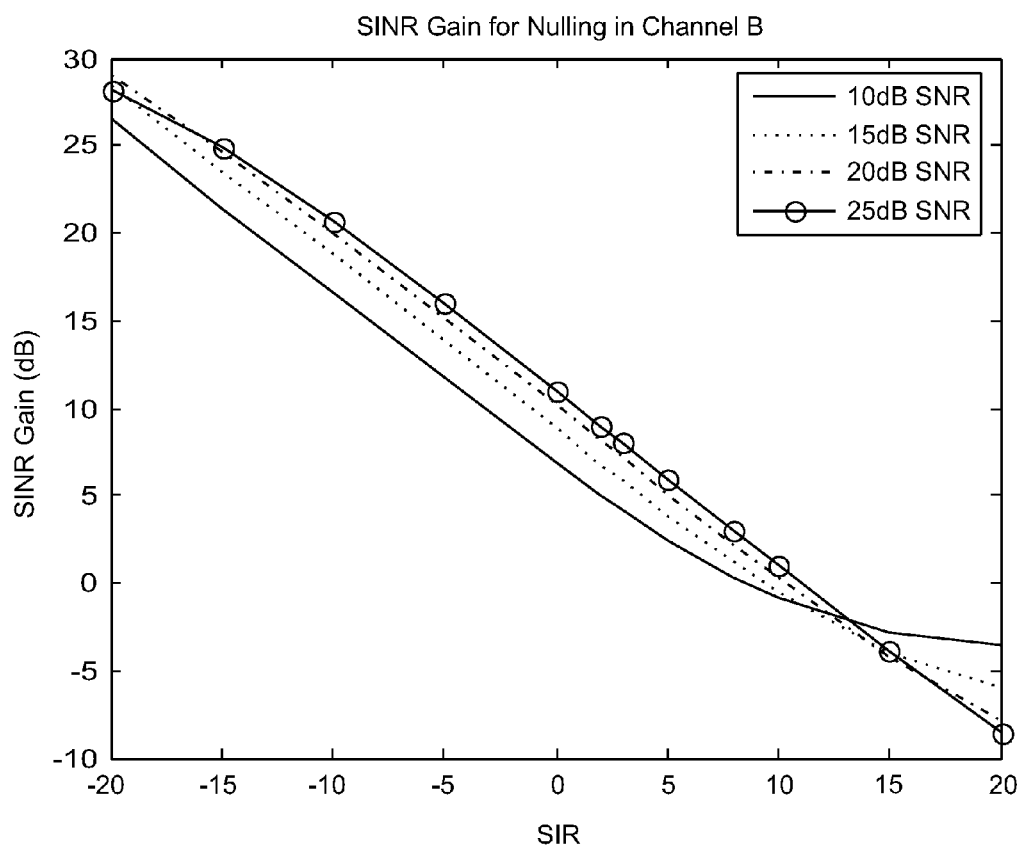
Figure 5F:
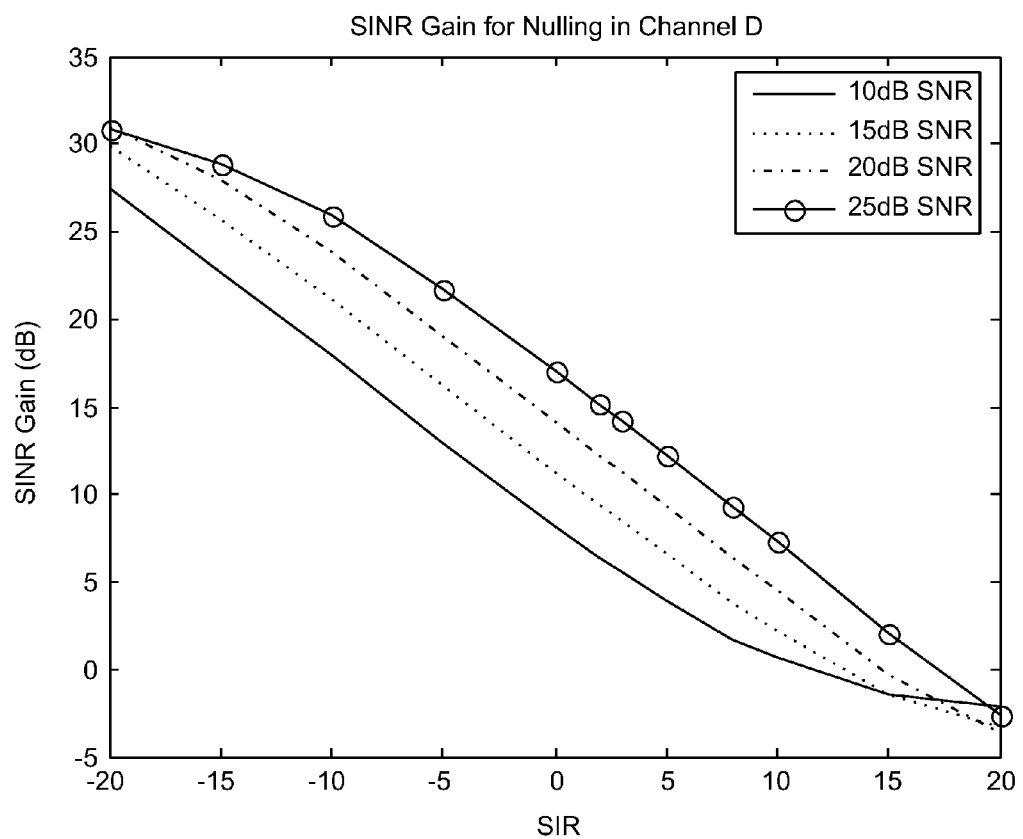
Figure 5G:
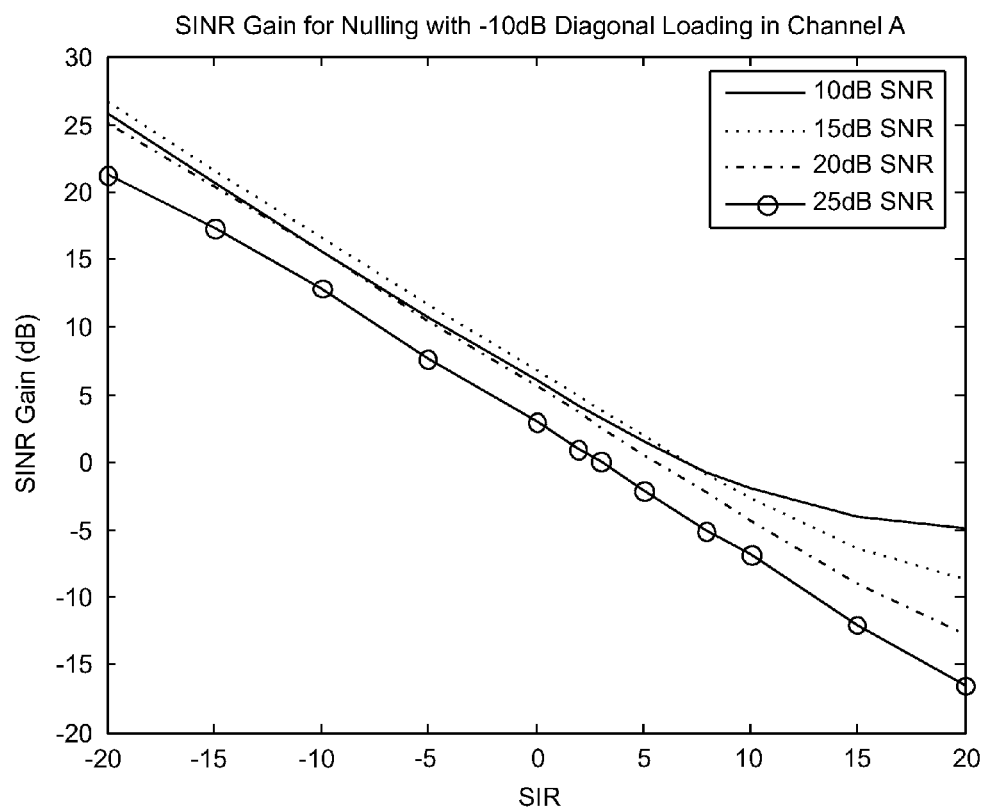
Figure 5H:
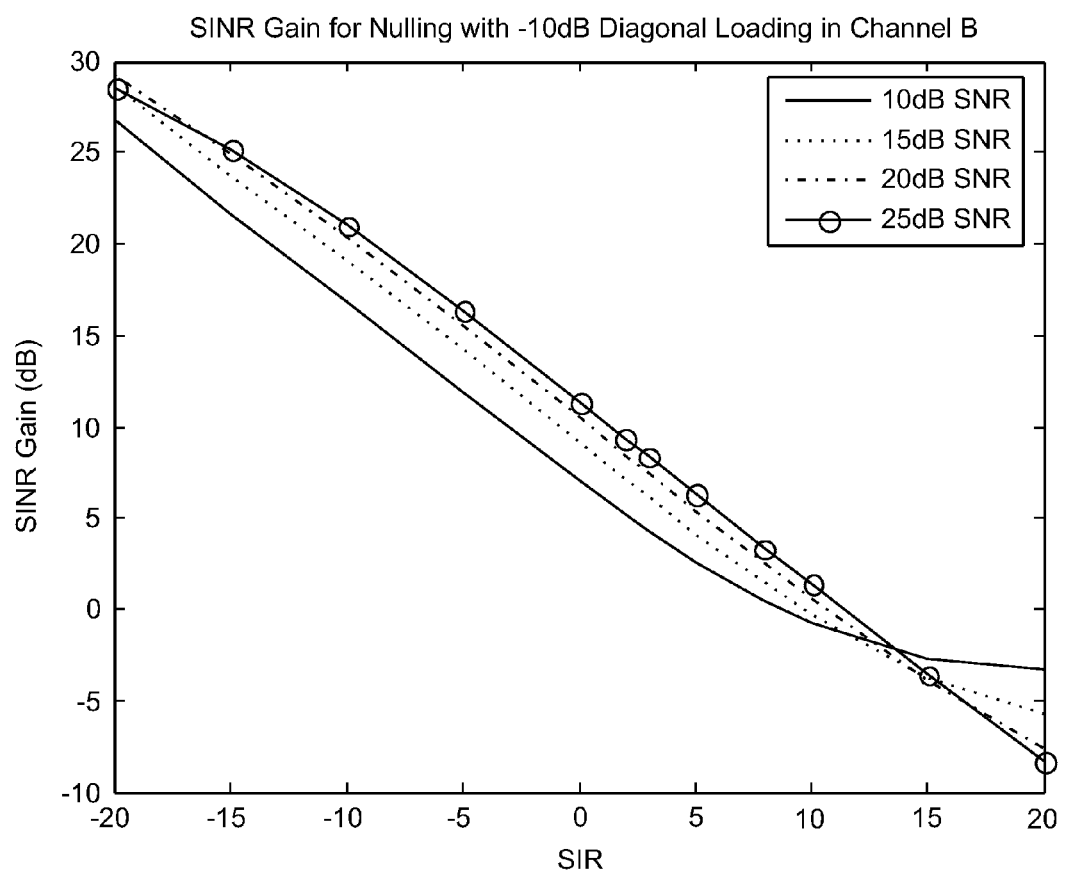
Figure 5I:
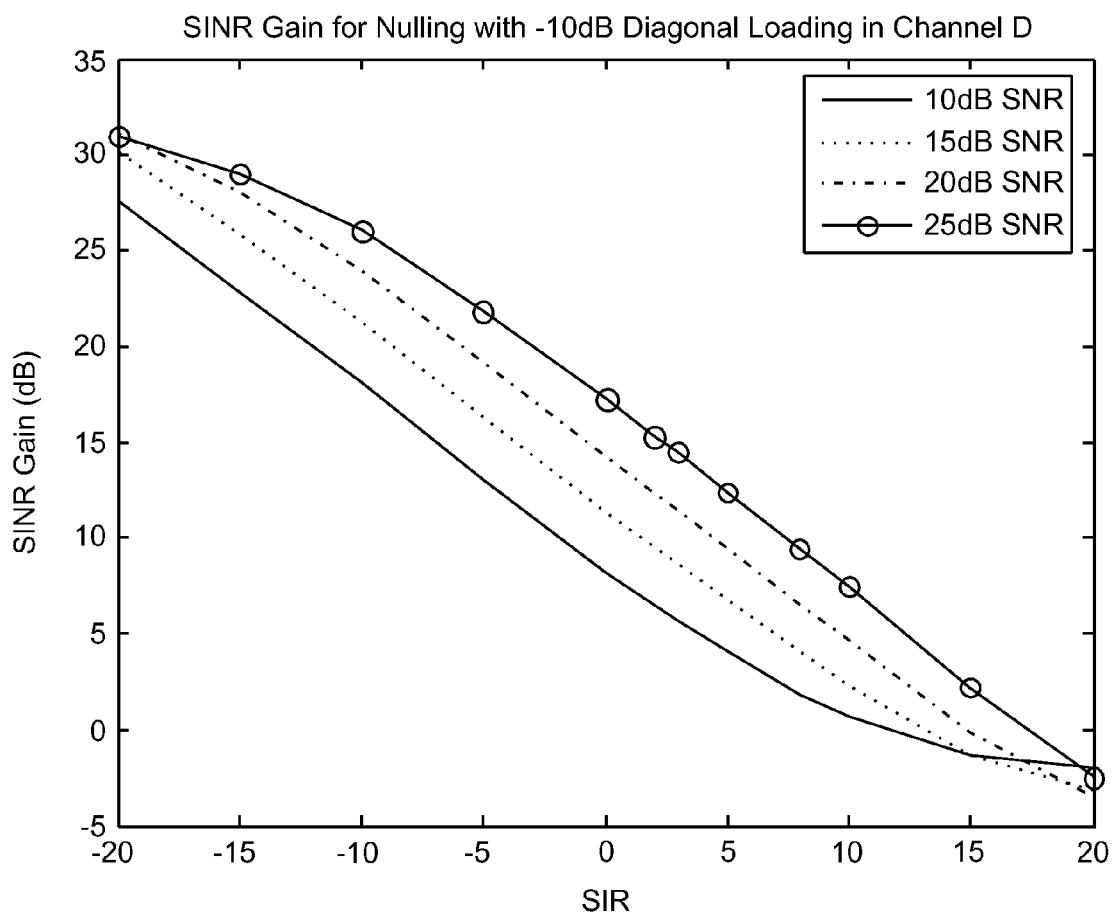
Figure 5J:
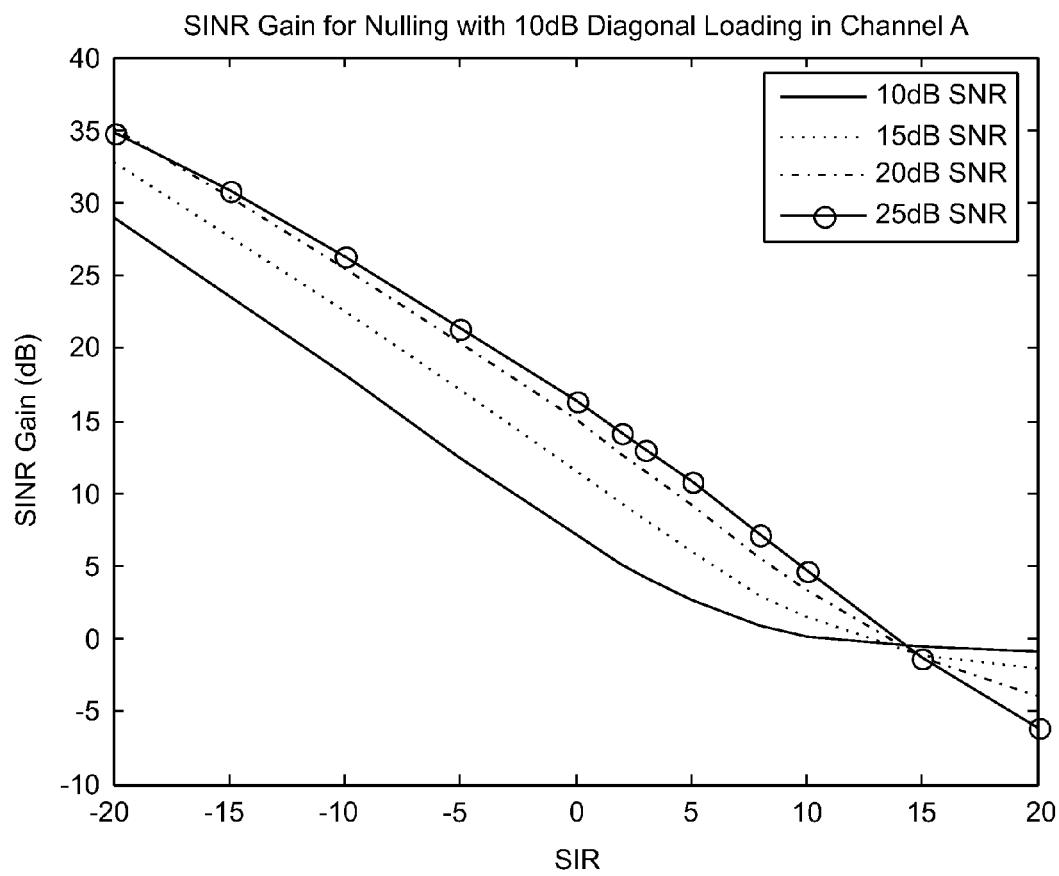
Figure 5K:
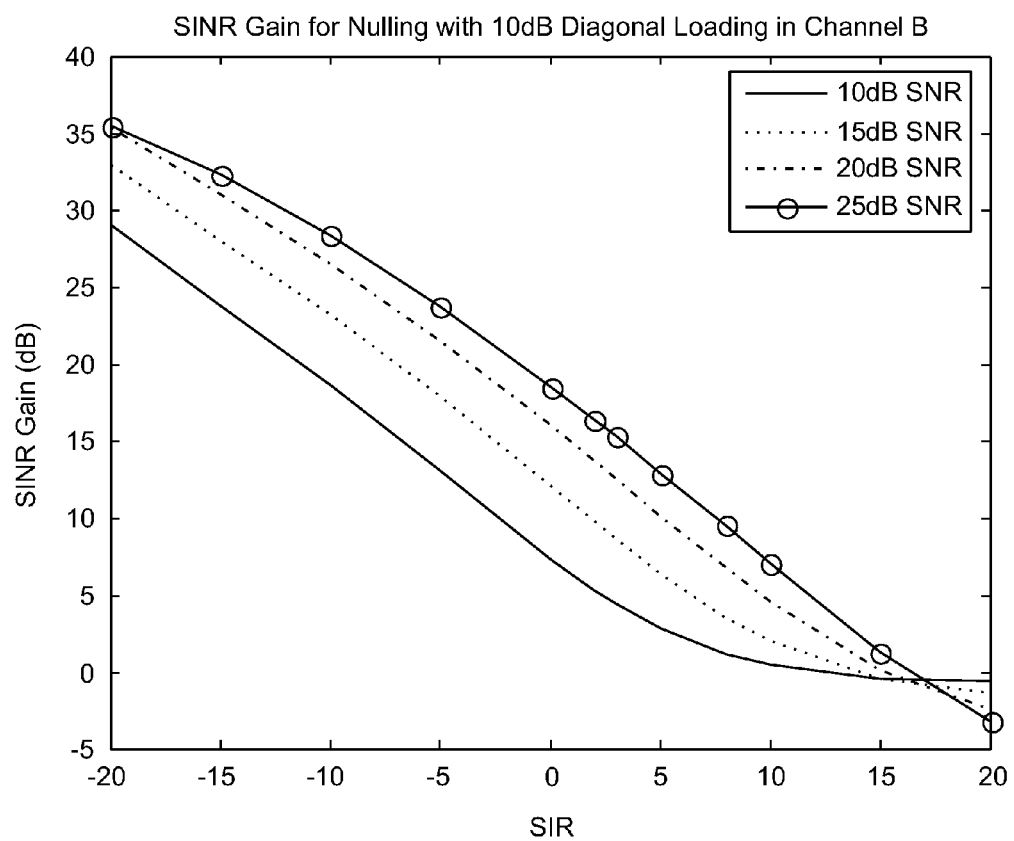
Figure 5L:
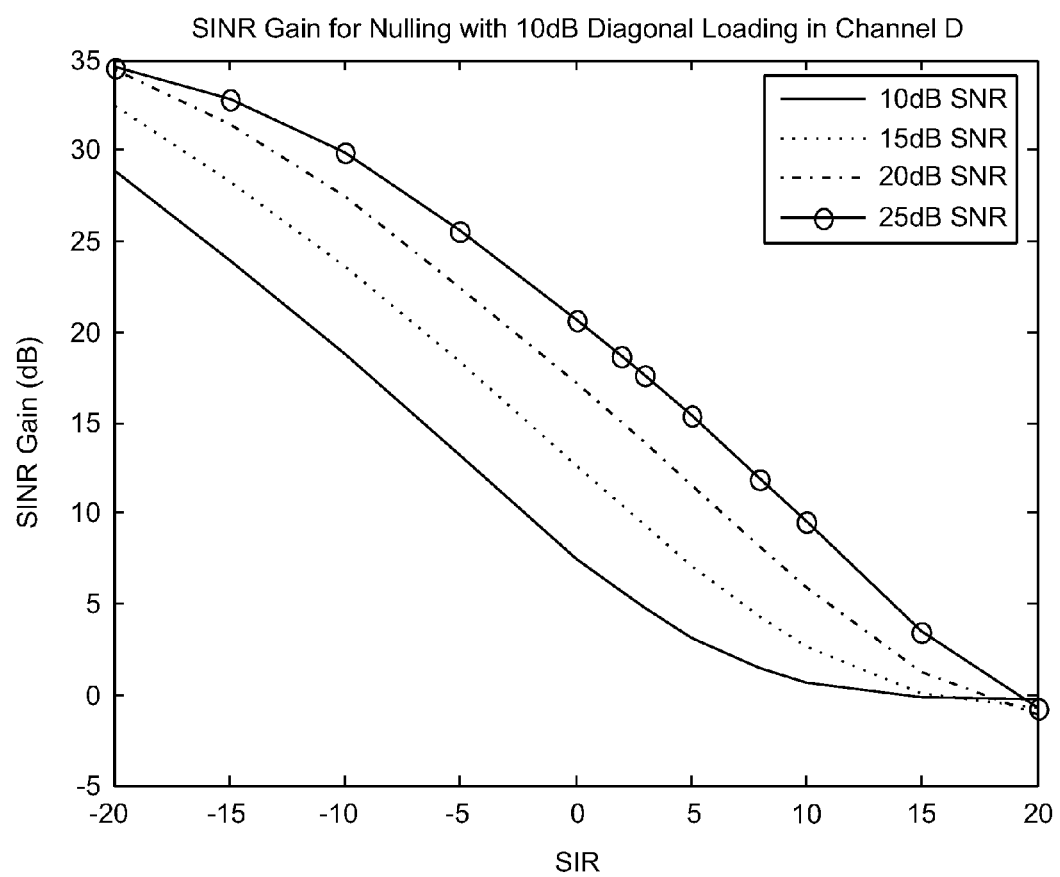

FIGS. 5A-5L are plots of the simulated signal-to-noise-plus-interference ratio (SINR) gain of the results. FIGS. 5A-5C show the results of the simulation using an eigenvector nulling interference mitigation method for channels A, B, and D. FIG. 5D-5F show the results of the simulation using a covariance matrix inversion interference mitigation method using no diagonal loading for channels A, B, and D. FIGS. 5G-5I show the results of the simulation using the covariance matrix inversion method with −10 dB of diagonal loading, and FIGS. 5J-5L show the results of the simulation using the matrix inversion method with +10 dB of diagonal loading.

The results show that the covariance matrix inversion method without some amount of diagonal loading may cause a decrease in the SINR when the interference power is low (see, e.g. FIGS. 5D-5L). As the amount of diagonal loading is increased, a floor develops at high SIR. This floor may represent the fact that the total SINR is dominated by the noise power as opposed to the interference power. In this scenario, the simulations show no appreciable gain in SINR.

Another factor in the performance of a communications system is synchronization. In order to properly decode an OFDM waveform, the receiver may benefit from synchronizing in time with the OFDM symbol boundary. Once the receiver is synchronized, it can further correct for carrier frequency change that could occur due to frequency offset between the transmitter and receiver local oscillators. Once it has corrected for these effects, the receiver can also estimate the channel. The presence of an interfering signal can have detrimental effect on parameter estimations. In order to test the performance of some of the mitigation techniques, a simulation was performed with the lowest rate modulation, binary phase shift keying (BPSK), with a rate 1/2 code transmitted on a single spatial stream. The simulation determined if the packet was detected and the header data correctly decoded.

Figure 6A:
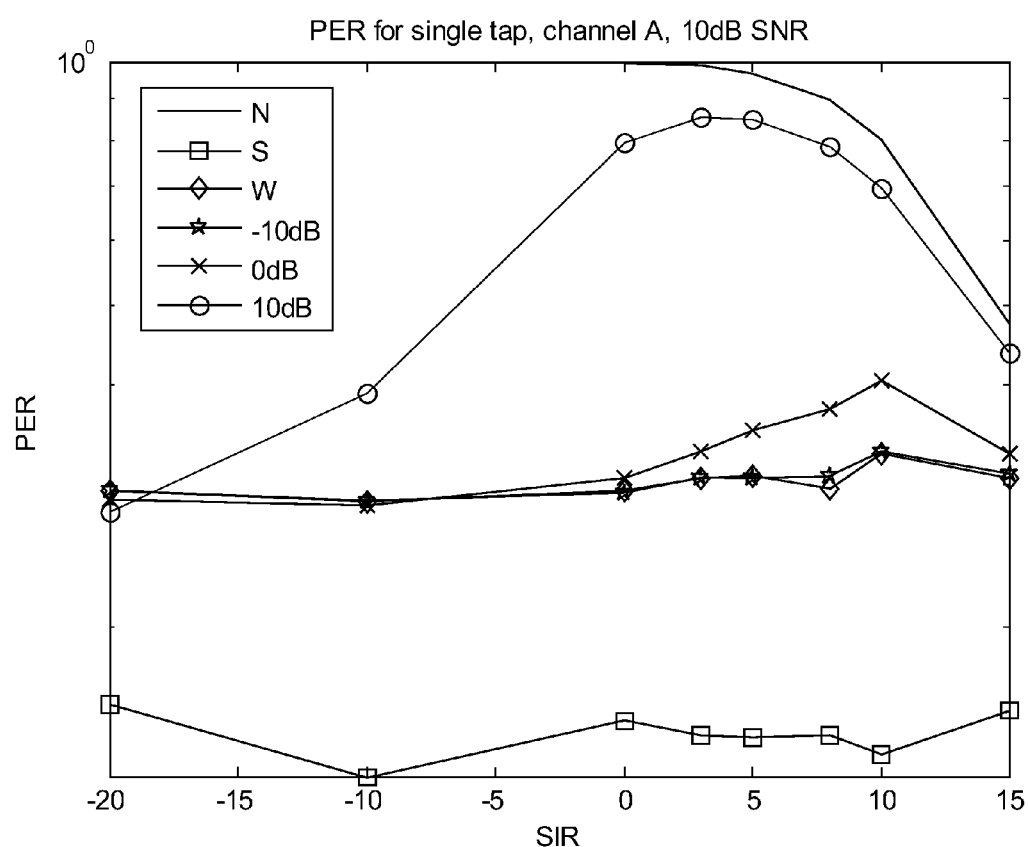
FIGS. 6A-6F are plots of the simulated packet detection performance of various channels using a number of interference mitigation methods.
Figure 6B:
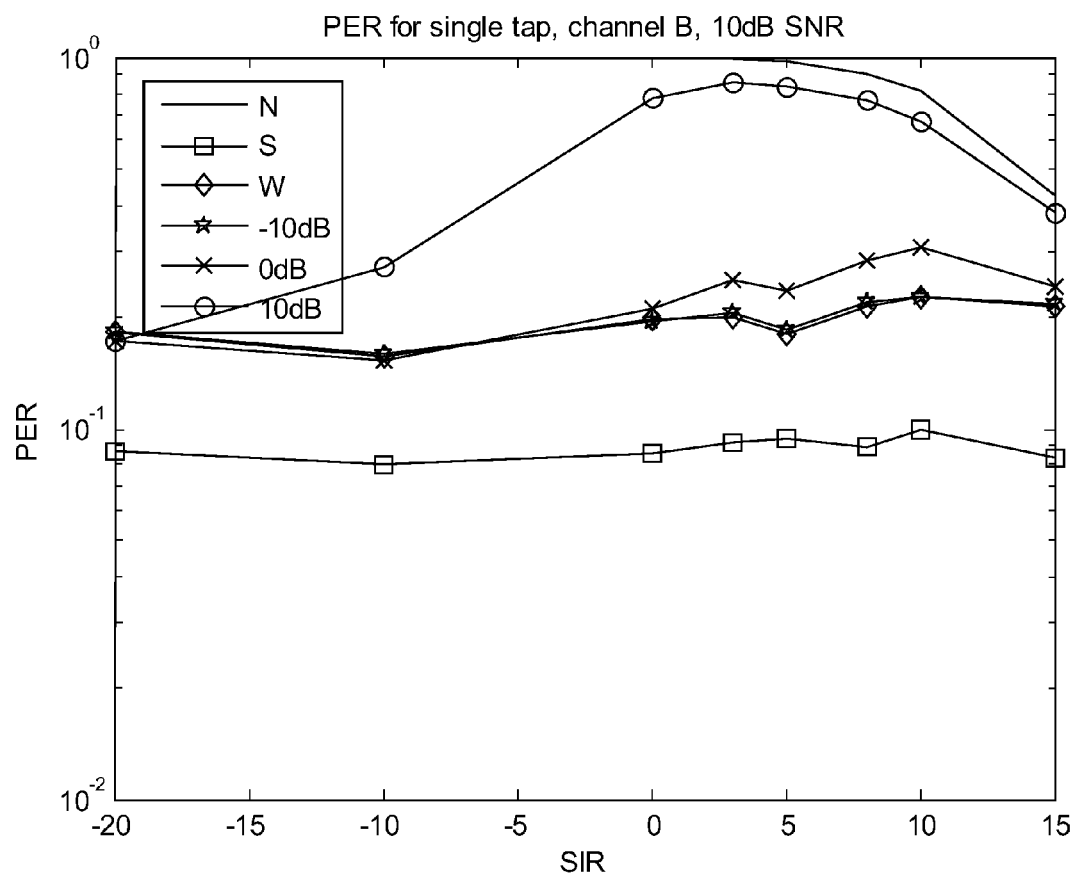
Figure 6C:
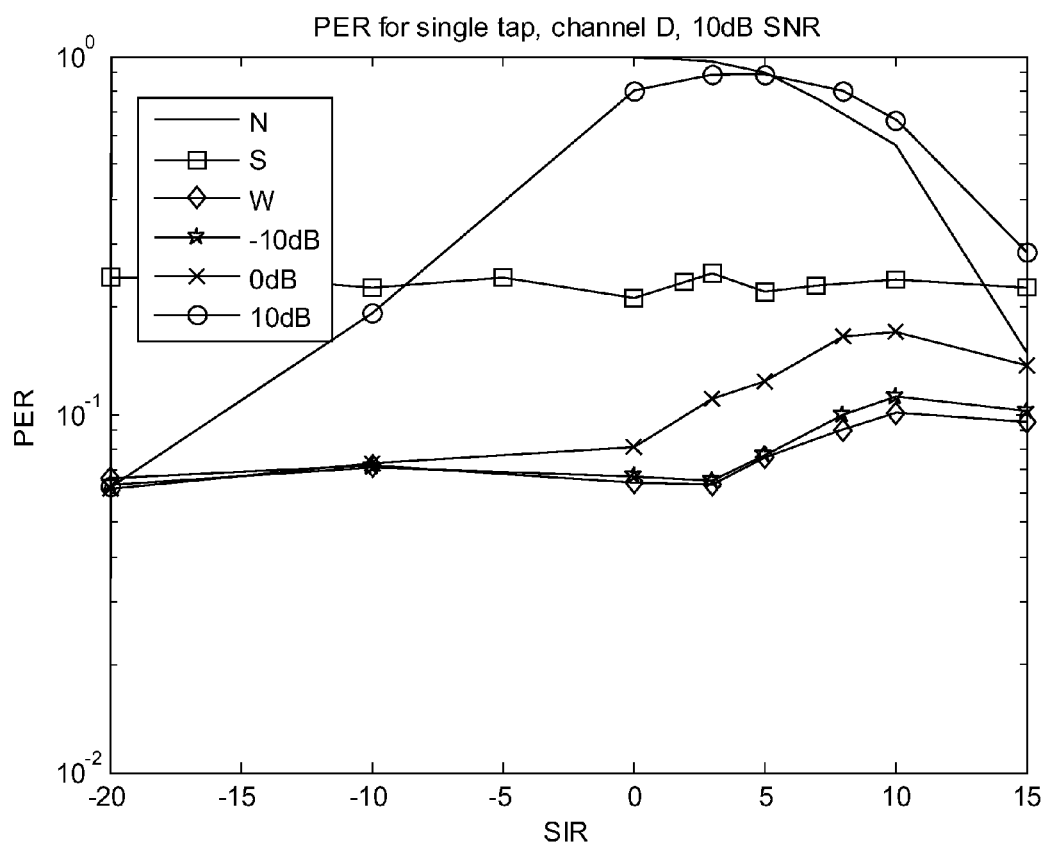
Figure 6D:
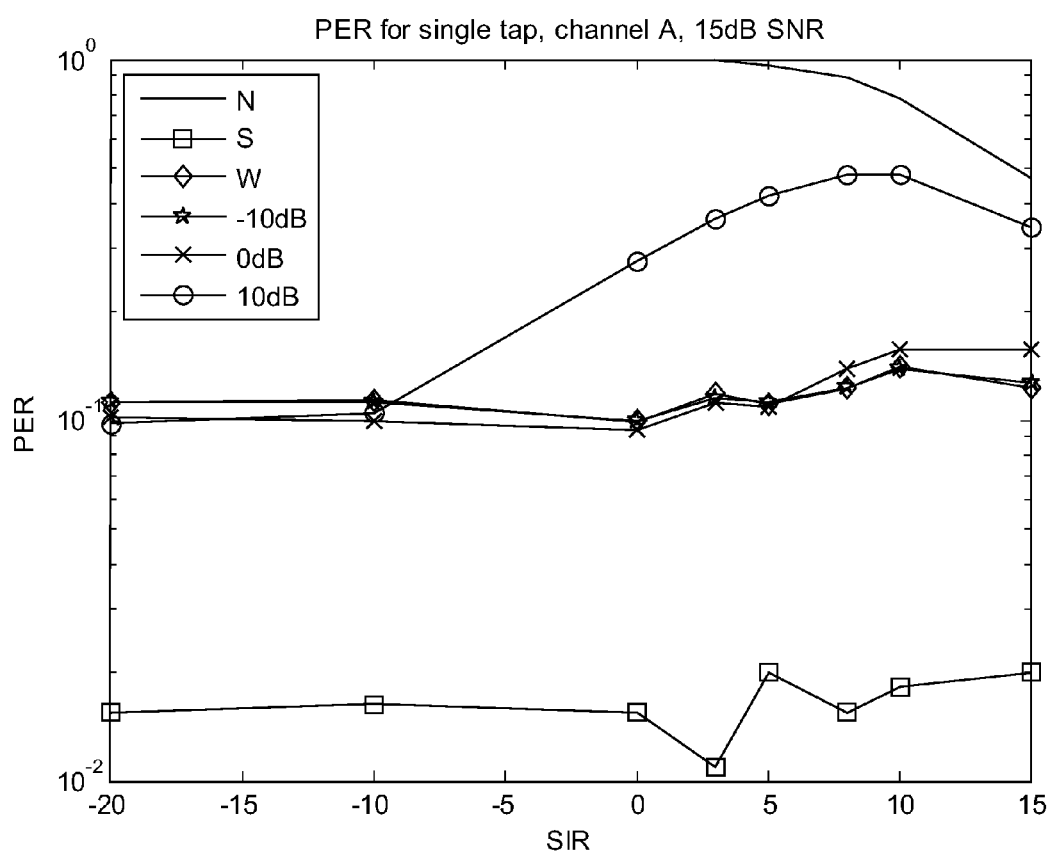
Figure 6E:
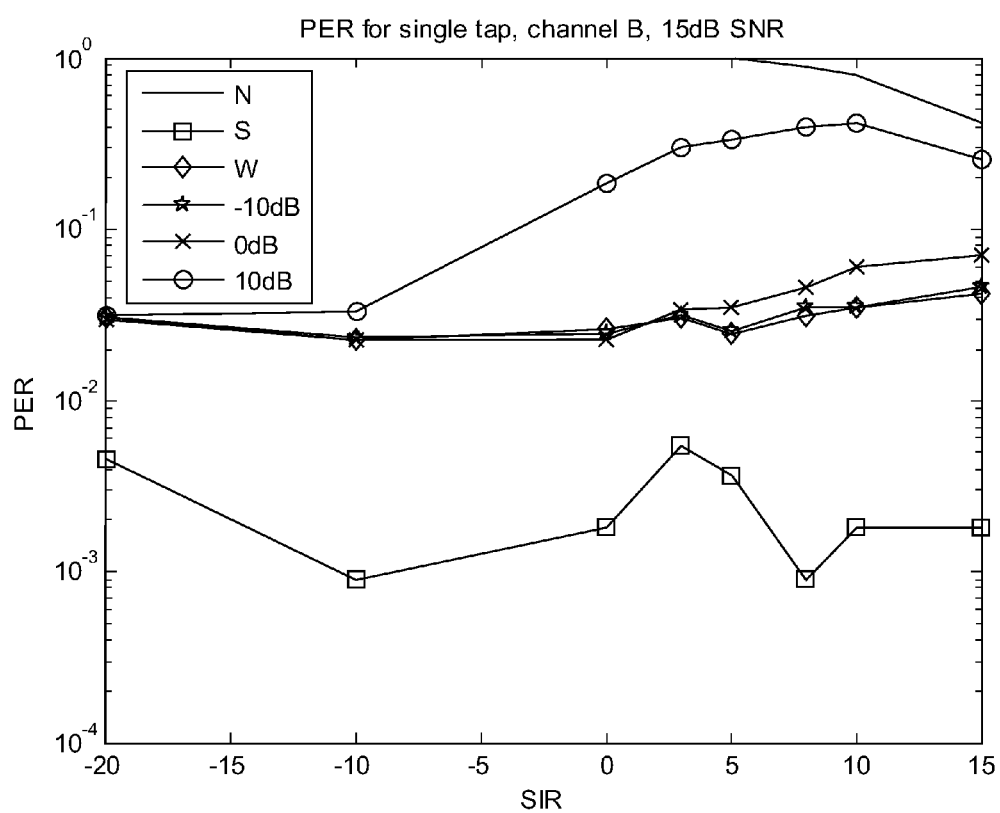
Figure 6F:
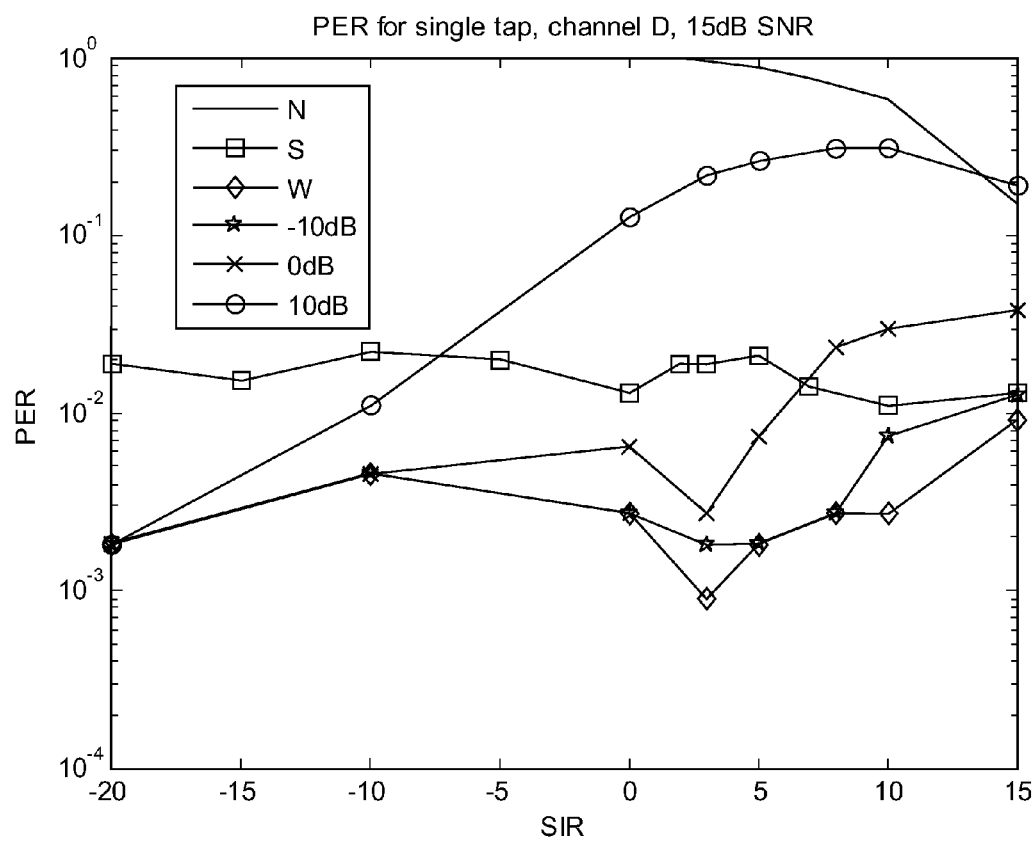

FIGS. 6A-6F are plots showing the packet detection performance of the various methods in channels A, B, and D. FIGS. 6A-6C show the results for channels A, B and D in 10 dB SNR, whereas FIGS. 6D-6F show the results for the same channels in 15 dB SNR. The following table is a legend for the curves of FIGS. 6A-6F.

TABLE 1

| | Legend for Packet Error Rate Curves |
|---|---|
| N | No interference mitigation |
| S | Eigenvector nulling |
| W | Covariance matrix inversion without diagonal loading |
| −10 dB | Covariance matrix inversion with −10 dB diagonal loading |
| 0 dB | Covariance matrix inversion with 0 dB diagonal loading |
| 10 dB | Covariance matrix inversion with 10 dB diagonal loading |

The performance of the covariance matrix inversion based methods was similar in all channels, but the eigenvector nulling clearly showed a better preference in non-dispersive channels. The simulation shows that the eigenvector nulling method outperformed the other methods when the delay spread in the channel was relatively small.

Figure 7A:
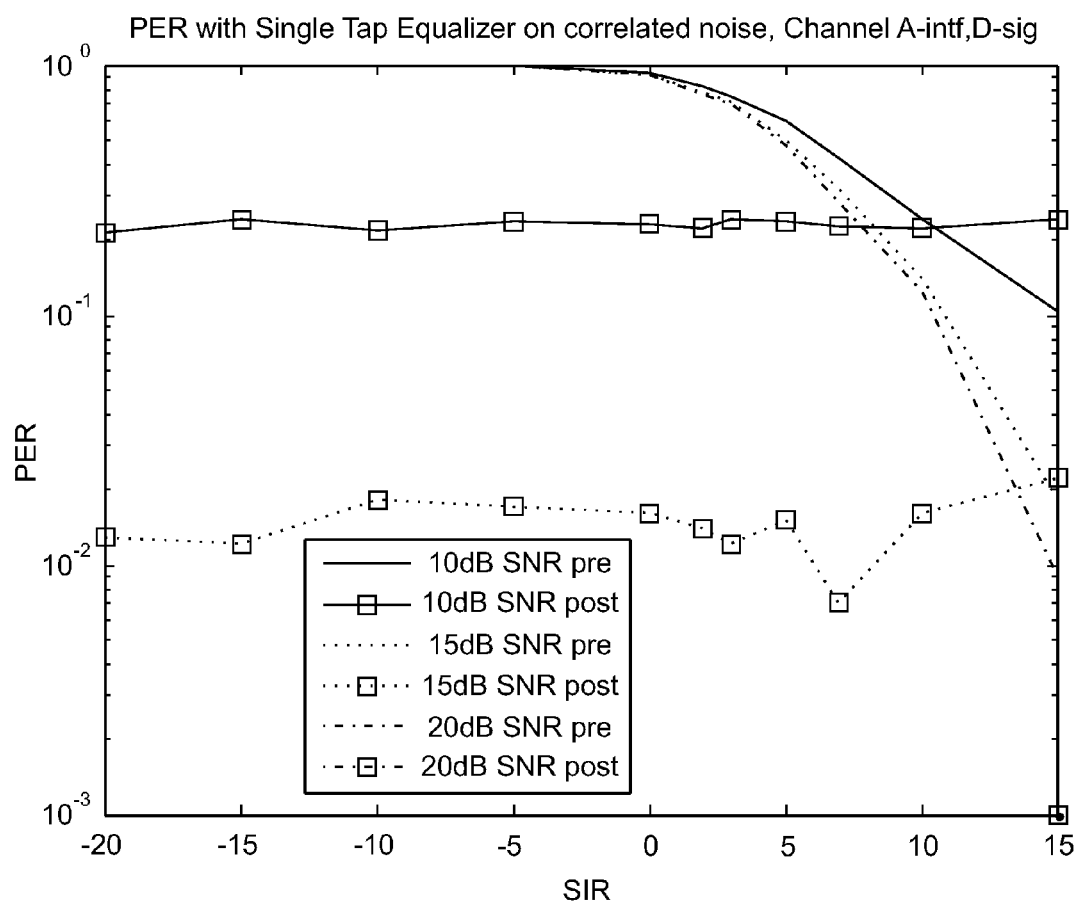
FIGS. 7A-7C are plots of the simulated packet detection performance of various channels in wideband noise using an eigen nulling interference mitigation method.
Figure 7B:
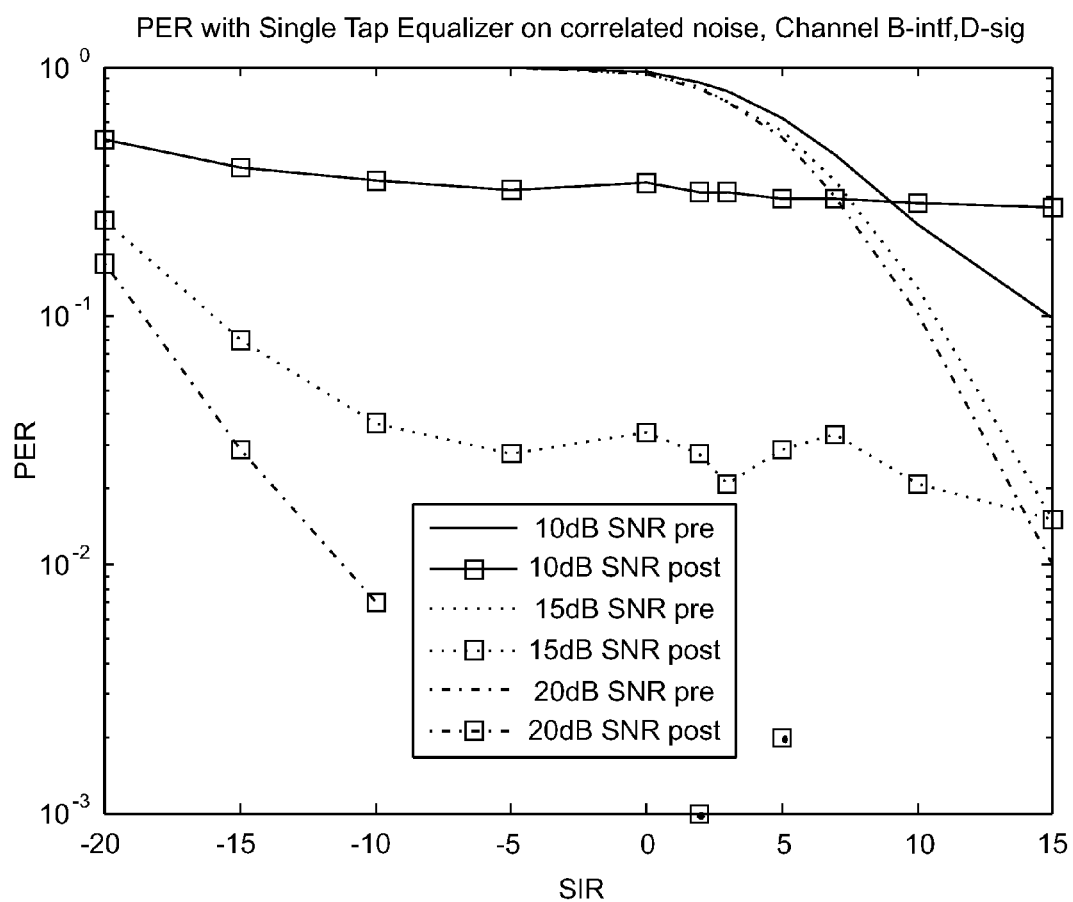
Figure 7C:
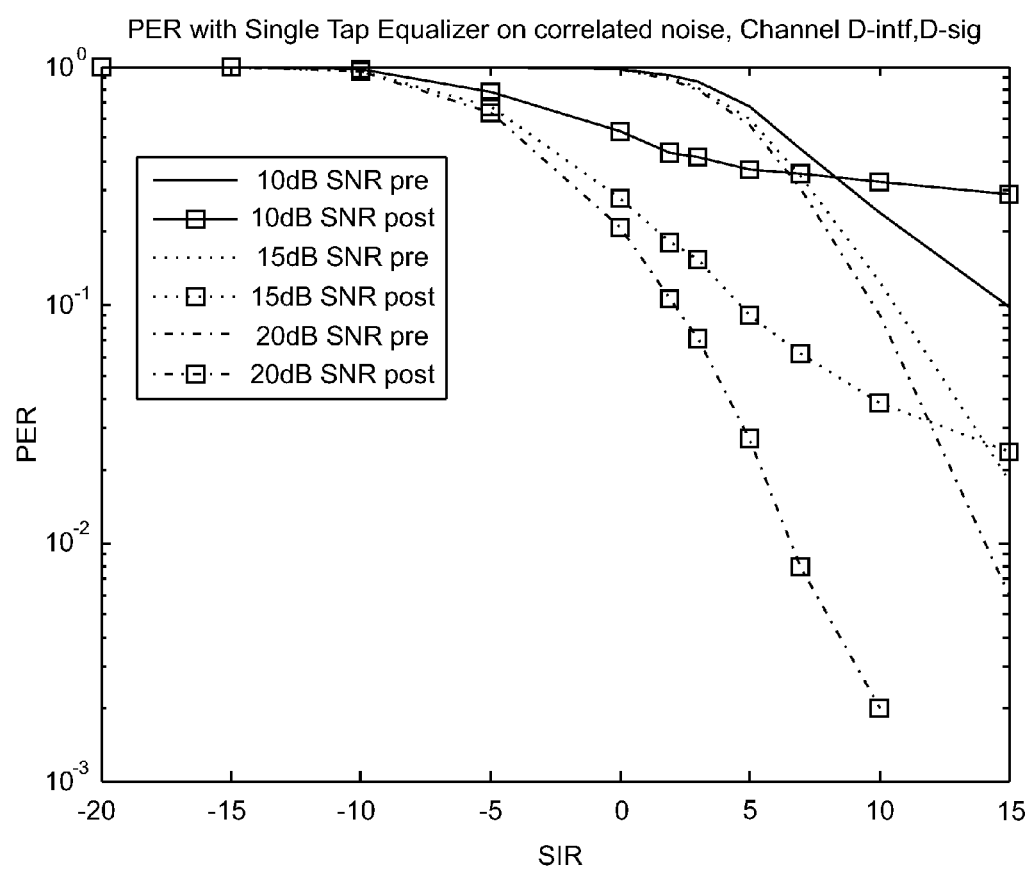

Similar multi-antenna interference mitigation methods were tested in the presence of a wideband interference source. In this case, the simulation again shows that the channel may have a significant impact on the performance of the mitigation algorithm. FIGS. 7A-7C show the results of the simulation for channels A, B, and D. The performance of the single tap system in channel A, which is a single-tap Rayleigh flat fading channel, is reasonably good, however, once the channel becomes more dispersive, the simulations show that a single spatial tap may not be enough to cancel the interference. The simulations show that in a non-dispersive channel, the single spatial tap performs relatively well even at very low SIR, however, once the channel becomes more dispersive (see, e.g., FIGS. 7B and 7C) the performance quickly degrades at lower SIR. The previously mentioned heuristic scheme for disabling the interference mitigation helps to solve this issue. Again, the simulations show the harshness of covariance matrix inversion may be detrimental when the performance of the system is limited by noise power as opposed to interference power.

Figure 8A:
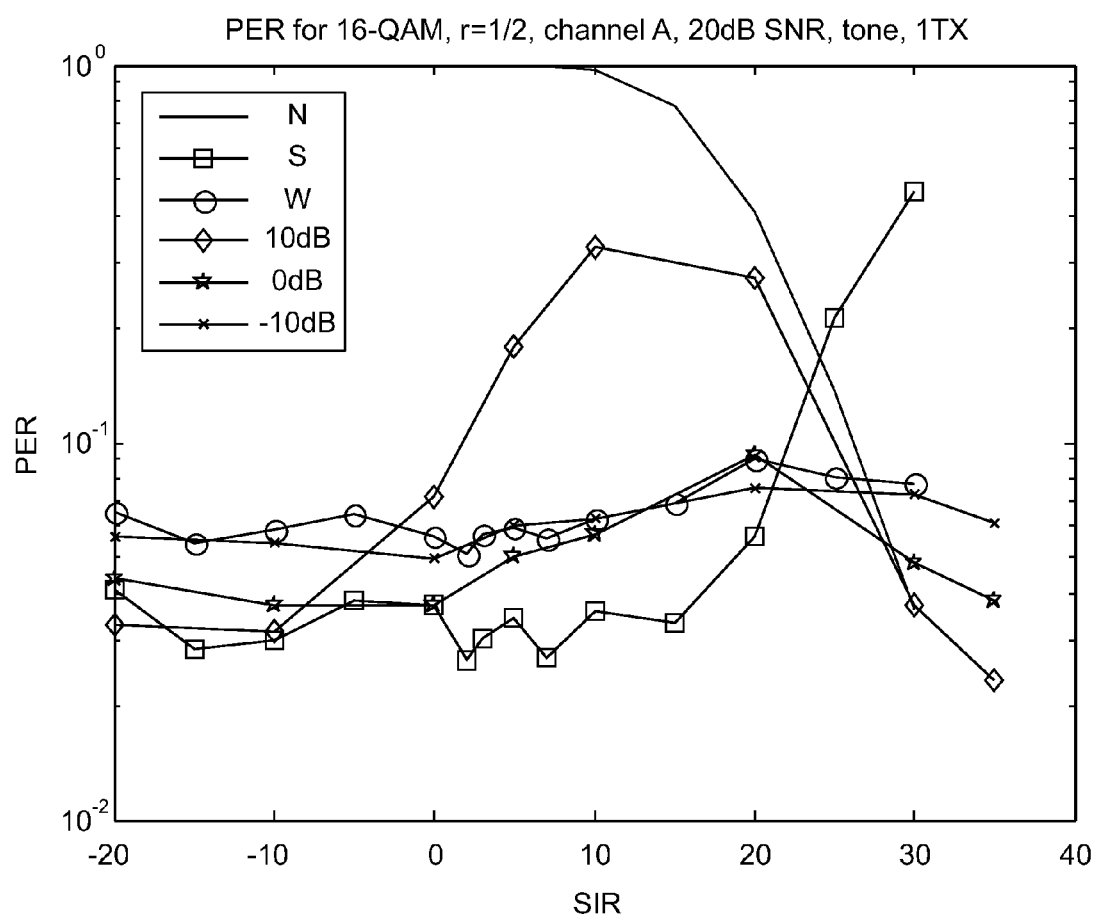
FIGS. 8A-8I are plots of the simulated packet detection performance on various channels with various numbers of transmitter antennas.
Figure 8B:
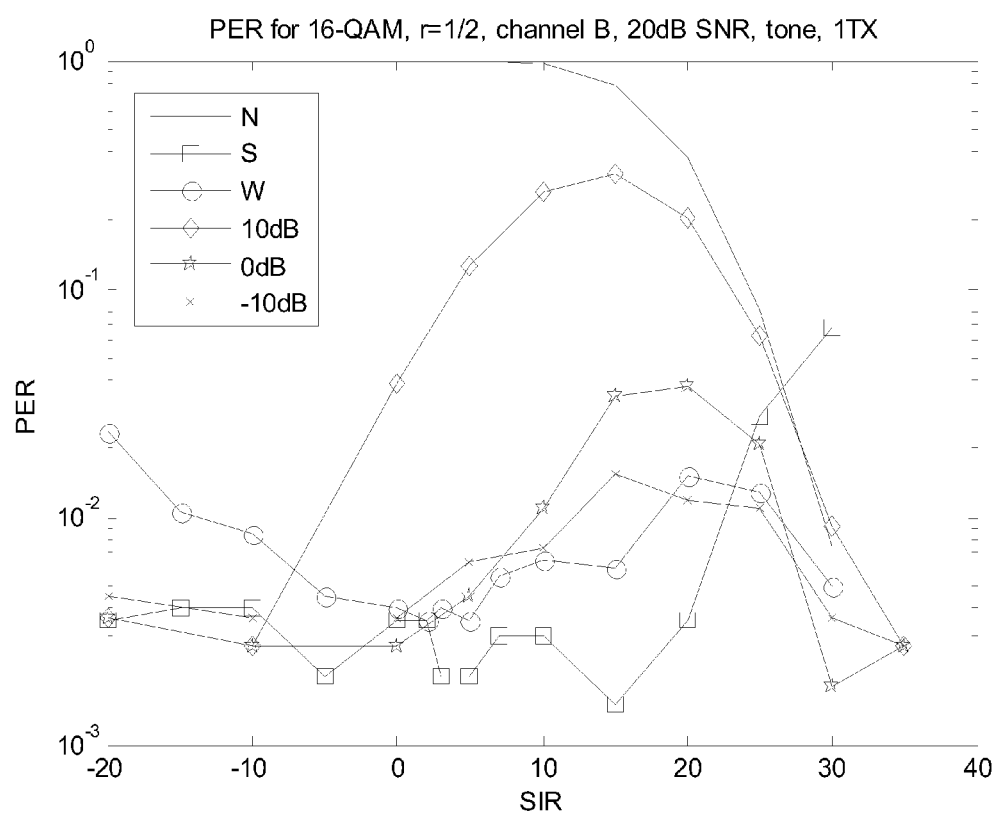
Figure 8C:
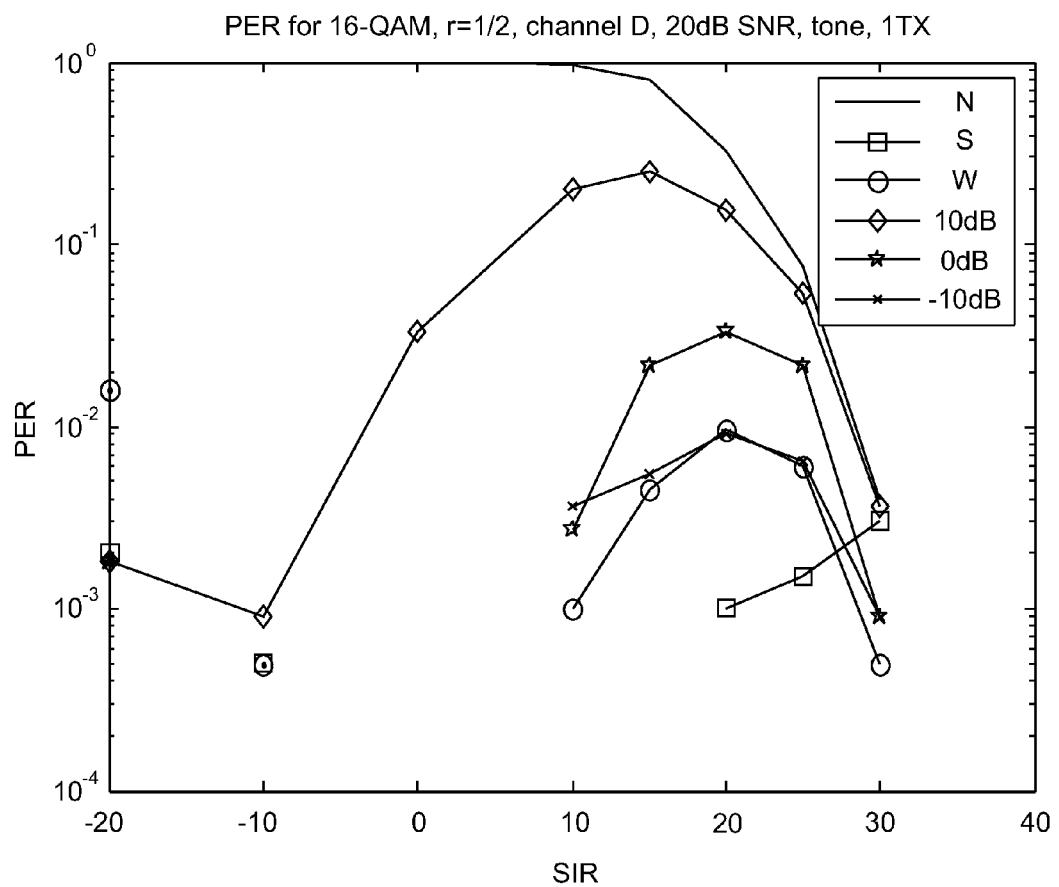
Figure 8D:
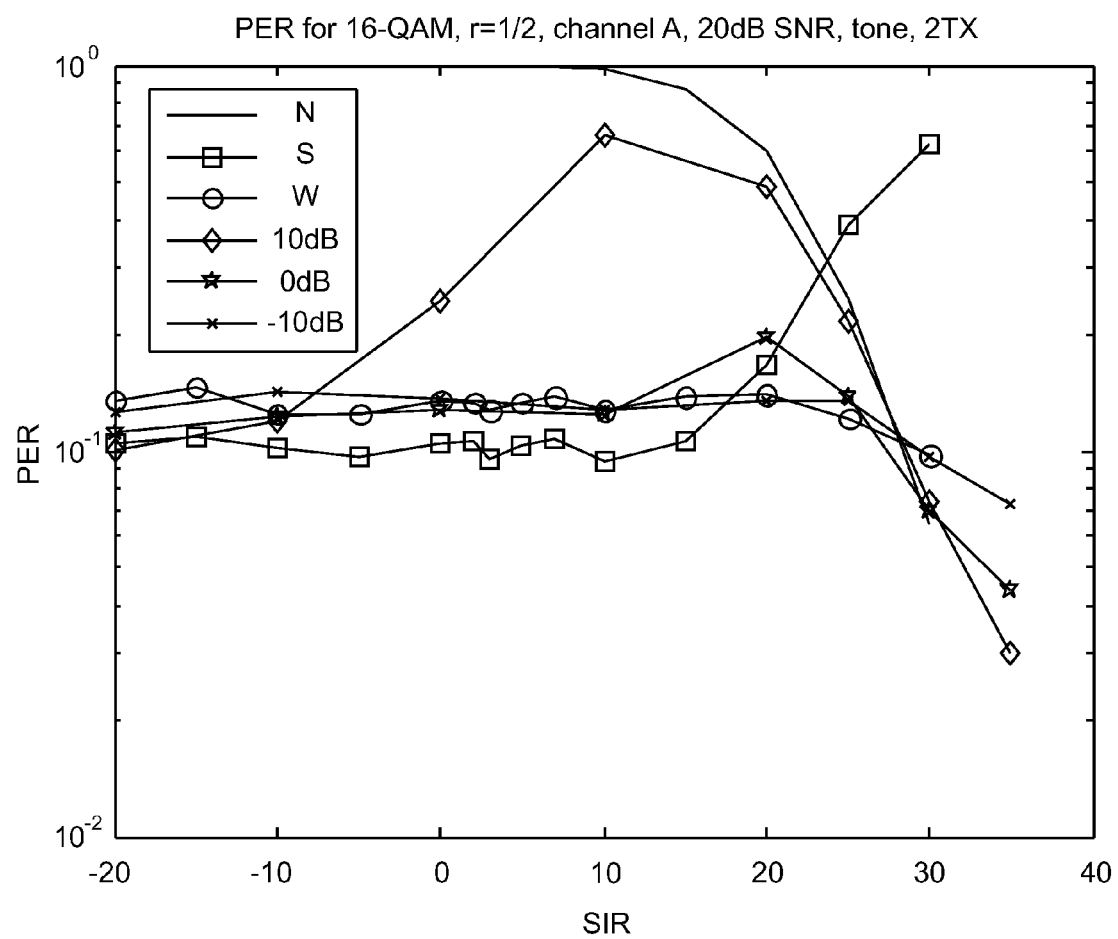
Figure 8E:
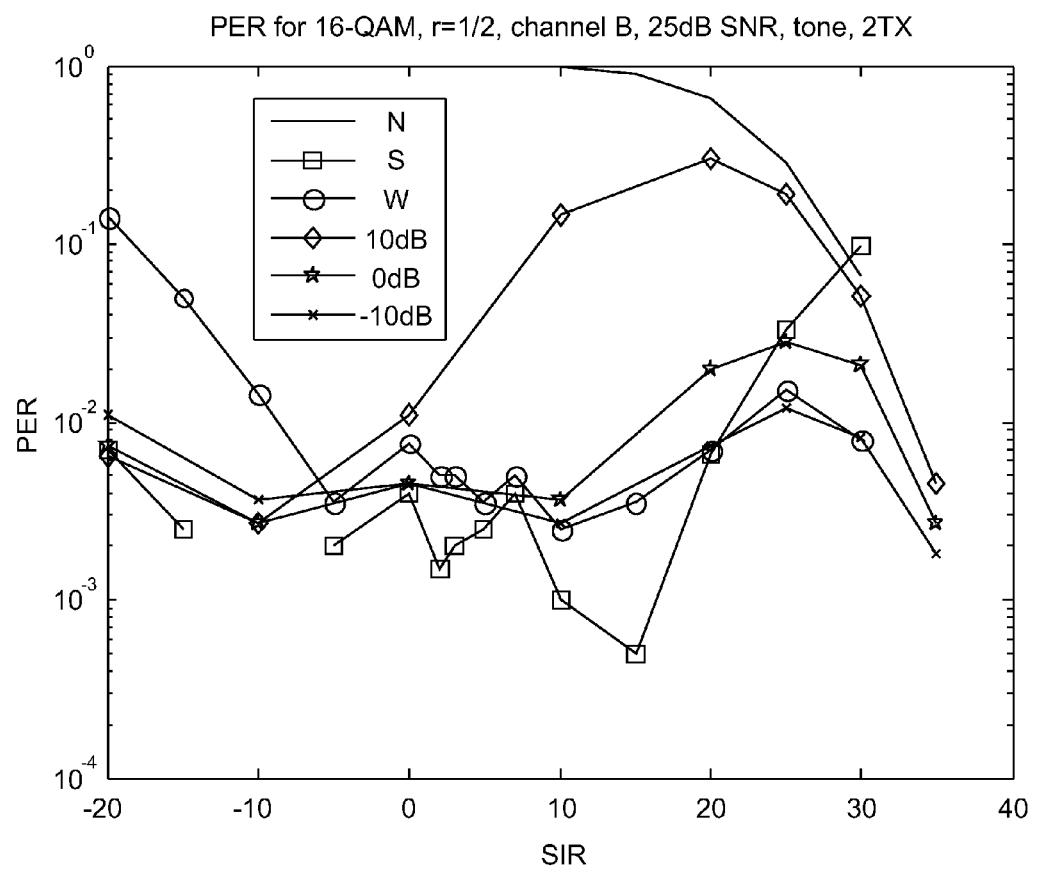
Figure 8F:
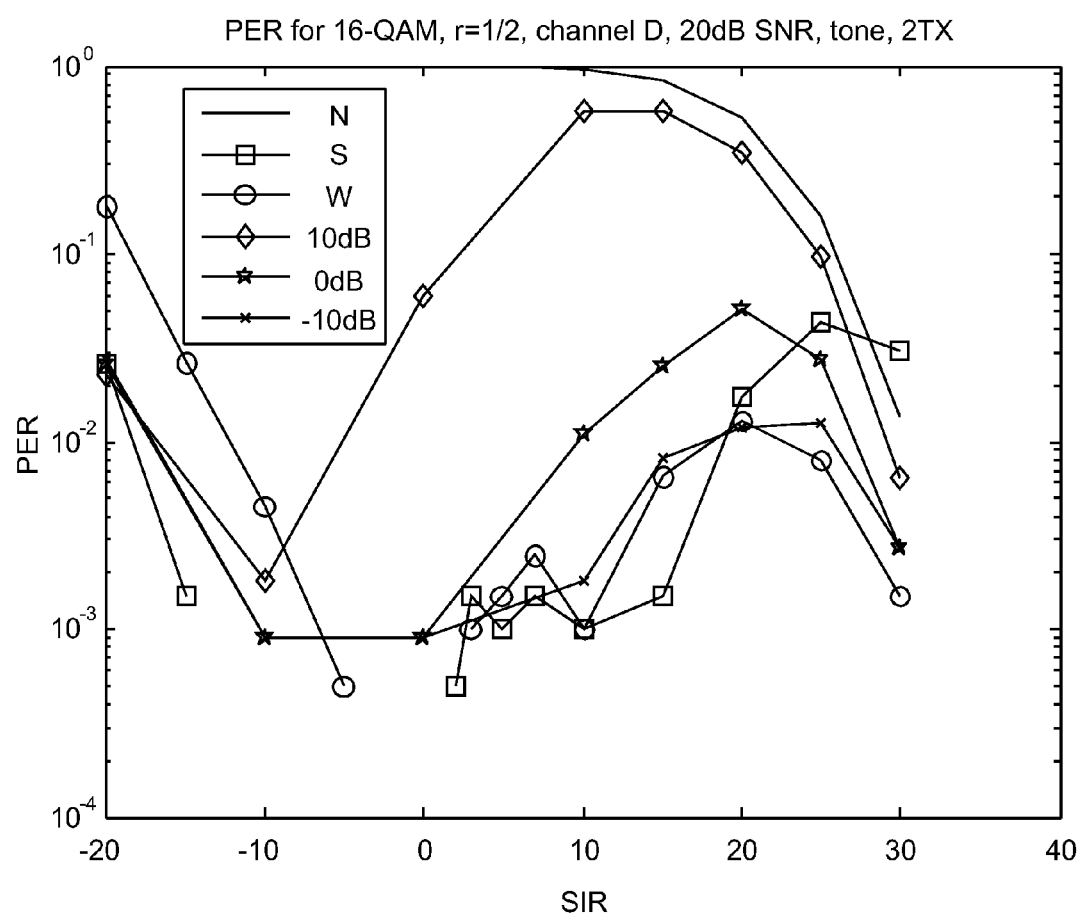
Figure 8G:
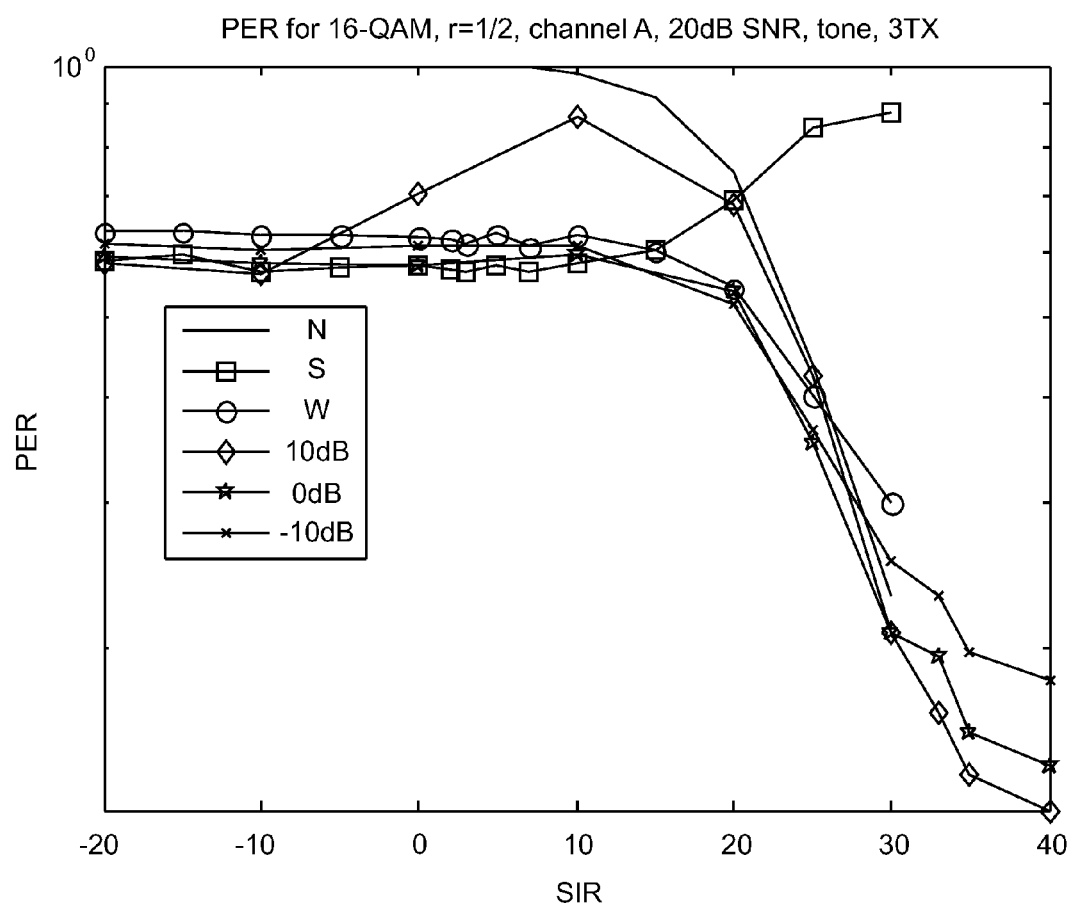
Figure 8H:
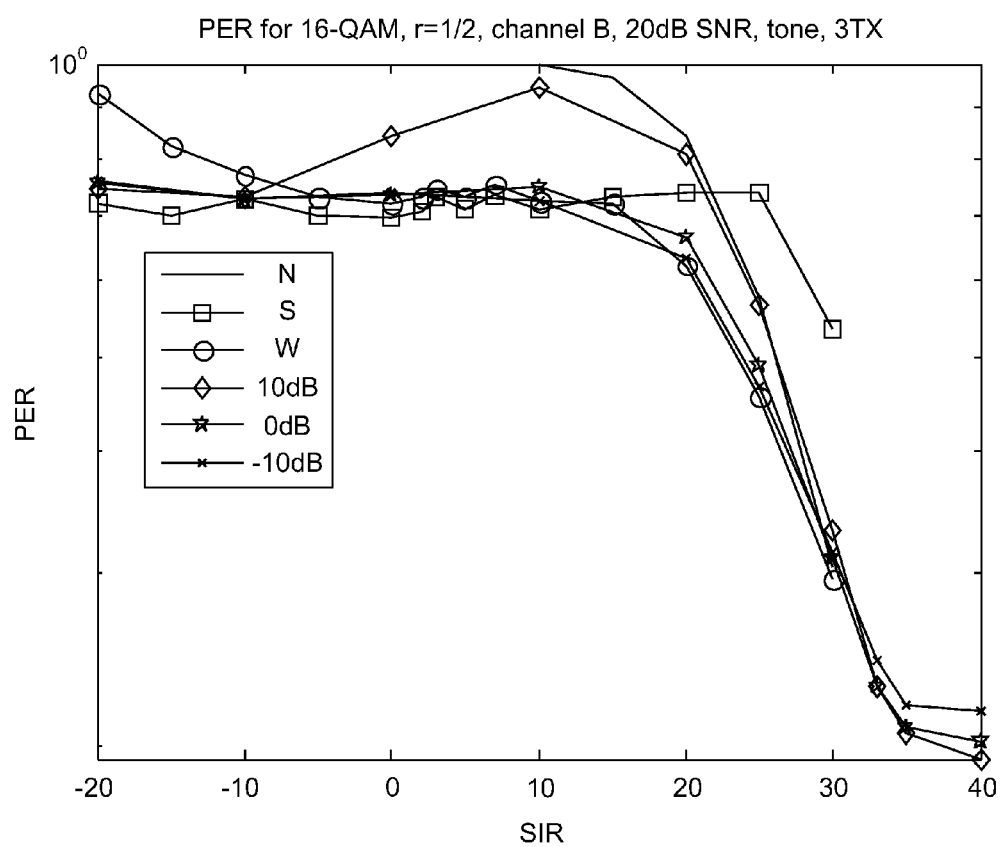
Figure 8I:
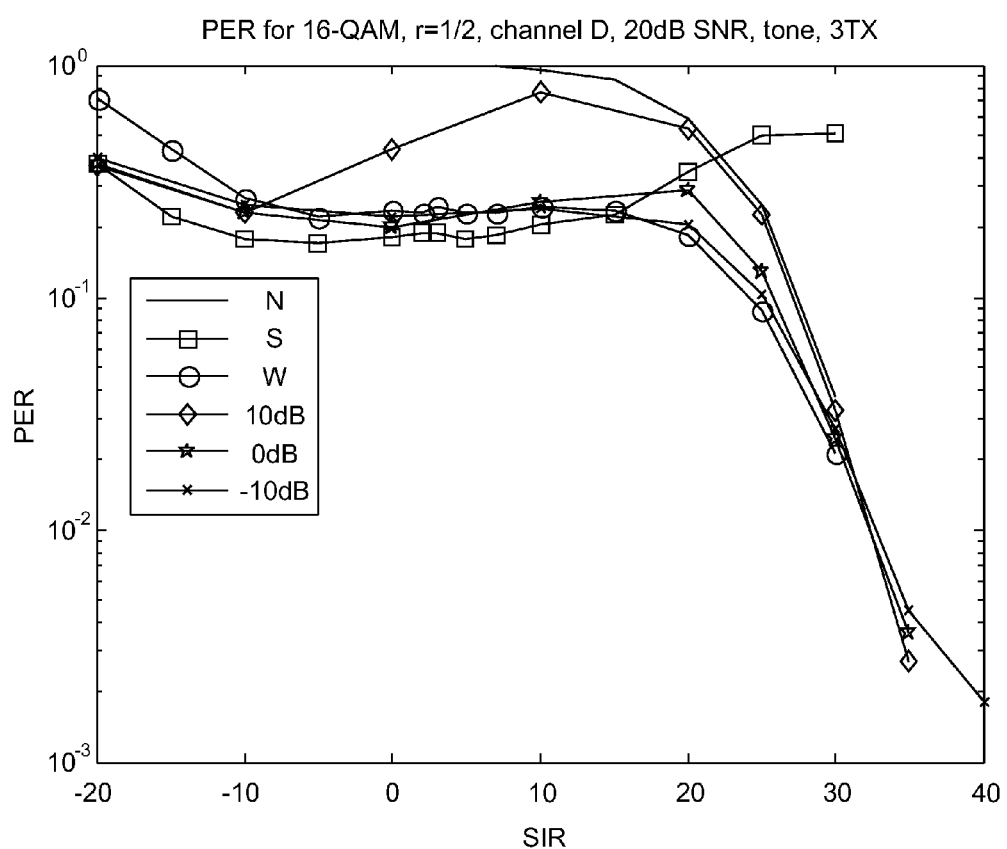

Simulations were also performed to determine the packet error rate (PER). FIGS. 8A-8I are plots showing the results of a packet error rate simulation for various channels for a various number of transmitter antennas at 20 dB SNR. FIGS. 8A-8C show the results of the PER simulation for channels A, B, and D using 1 transmitter antenna. FIGS. 8D-8F show the results of the PER simulation for the same channels using 2 transmitter antennas. FIG. 8G-8I show the results of the PER simulation for the same channels using 3 transmitter antennas.

The simulations show that the frequency diversity present in the multipath channel has a beneficial effect on the performance. They also show that the eigenvector nulling method has a poor performance in the high SIR region of the plots. This may be due to the lack of intelligence in the receiver to disable the interference mitigation when the interference power has dropped well below the noise floor. The methods examined have similar performance in the low SIR (−20 dB) region. The performance varies for each algorithm as the SIR is increased from −20 dB to +40 dB. The simulations show that the covariance matrix inversion method has almost no benefit when the interference power is equal to or less than the noise power. As discussed previously, one drawback of covariance matrix inversion without diagonal loading is that it can potentially amplify the noise power. If the noise power is amplified more than the interfering signal is suppressed, there should be no distinguishable improvement in performance. The diagonal loading improves performance in this region by biasing the noise-and-interference covariance matrix. The simulations show that as the diagonal loading is increased, the performance in the 0 dB to 20 dB region is similarly increased. These gains are achievable with little or no loss in the low SIR region from −20 dB to 0 dB. The simulations also show that when the interference power is sufficiently below the noise floor, the performance of the diagonally loaded covariance matrix inversion tracks the performance of the non-filtered signal, whereas the other methods actually have performed worse in this region.

Channel D provides the best performance, possibly due to the nature of OFDM modulation, rather than the nature of the interference. Channel D has a 50 ns rms delay spread, which creates a frequency-selective channel. This frequency diversity is exploited by the coding and interleaving that is performed over the data subcarriers. Channel A is a single tap Rayleigh flat fading channel. Since the simulated OFDM modulation scheme cannot exploit frequency diversity in this channel, there are more drastic results when the packet is transmitted through a bad channel. Channel B has 15 ns rms delay spread, so it is not as selective as channel D, but it does provide some amount of frequency diversity. The increase in performance is apparent from the y-axis of FIGS. 8A-8C.

The same simulations were run with 2 and 3 transmit antennas. The PER curves generally have the same basic shape, with the main difference being the overall performance (see, e.g., FIGS. 8D-8I).

Some of the disclosed multi-antenna mitigation schemes can be implemented on hardware. For example, the hardware can be combined with a MIMO OFDM cognitive radio testbed, such as, for example, a cognitive radio testbed developed and available from Silvus Technologies, Inc. of Los Angeles, Calif. In some embodiments, the transmitter and receiver on a testbed are contained in a field-programmable gate array (FPGA), in a programmable logic device, or in another suitable type of circuit. An interference mitigation module can be added functionally before the existing receiver to filter the received signal and mitigate interference before the existing receiver attempts to decode the packet.

The interference mitigation module, similar to the embodiment shown in FIG. 3, comprised four major logical components. The first of the four components was a covariance estimation block for estimating a covariance matrix based on a received waveform. This was performed as an averaging of the outer product of the received waveform.

The second component was responsible for calculation of the spatial filtering matrix. For practical reasons, this operation was done on a microprocessor that was attached to the FPGA which contains the real-time MIMO OFDM transceiver. As this was being done on a microprocessor, it was done in full-floating point arithmetic using matrix inversion and SVD decomposition algorithms, all of which can be written in a computer programming language, such as, for example C or C++. The third component performed the matrix-vector multiplication required to apply the spatial filter. The final component was a controller which executed a finite state machine similar to that shown in FIG. 4.

A protocol was developed for passing matrices between the host and FPGA to prevent data corruption. The typical interval between passing the covariance matrix to the host and receiving a spatial filtering matrix back was roughly 1 millisecond. The matrices were double-buffered within the FPGA to ensure the interference mitigation subsystem did not attempt to read a matrix before the data had been successfully received from the microprocessor. A similar protocol was used to ensure data integrity on the covariance matrices sent to the microprocessor.

Without additional processing, a single-tap spatial filter is ineffective at suppressing wideband interference in dispersive channels due to the frequency selectivity present in dispersive channels. Because the frequency response of the channel is not constant across the entire band, unwanted attenuation occurs outside of the flat range of the filter. In certain embodiments, a filter that doesn't use a flat channel response is implemented in order to mitigate the wideband interference. For example, the signal may be broken into sub-band components and the interference in each sub-band may be individually mitigated. If each sub-band is narrow enough, the channel in the sub-band may approximate a frequency flat channel. Individual mitigation of sub-bands could be performed according to any appropriate means, including the techniques discussed herein.

Sub-banding could be done using polyphase filter banks, but they may be computationally expensive. Various transforms or filters may be used to separate the incoming signal into its sub-band components. In certain embodiments, the Discrete Fourier Transform (DFT), which is a linear transformation, is used to separate the incoming signal into its sub-band components. While this transform has an efficient hardware implementation, it creates filters with relatively high side-lobes. These side-lobes may allow energy from neighboring sub-bands to leak into the primary sub-band.

Windows, such as the Hamming window, can be applied to data before the transform to suppress the side-lobes. While these may be effective in suppressing the energy in the side-lobes, they tend to widen the main lobe causing the effective sub-bands to become wider. The bandwidth of the sub-band is a key factor in the validity of the narrowband assumption used to drive the filter-bank approach. To improve effectiveness, the bandwidth of the sub-band is generally less than the coherence bandwidth of the channel. Another window that may be considered is the Rife-Vincent window which has a narrower main-lobe at the cost of slightly higher side-lobes. Embodiments may incorporate any suitable window or windows, including but not limited to, rectangular windows, Hann windows, Tukey windows, cosine windows, or any other suitable windows.

Figure 9A:
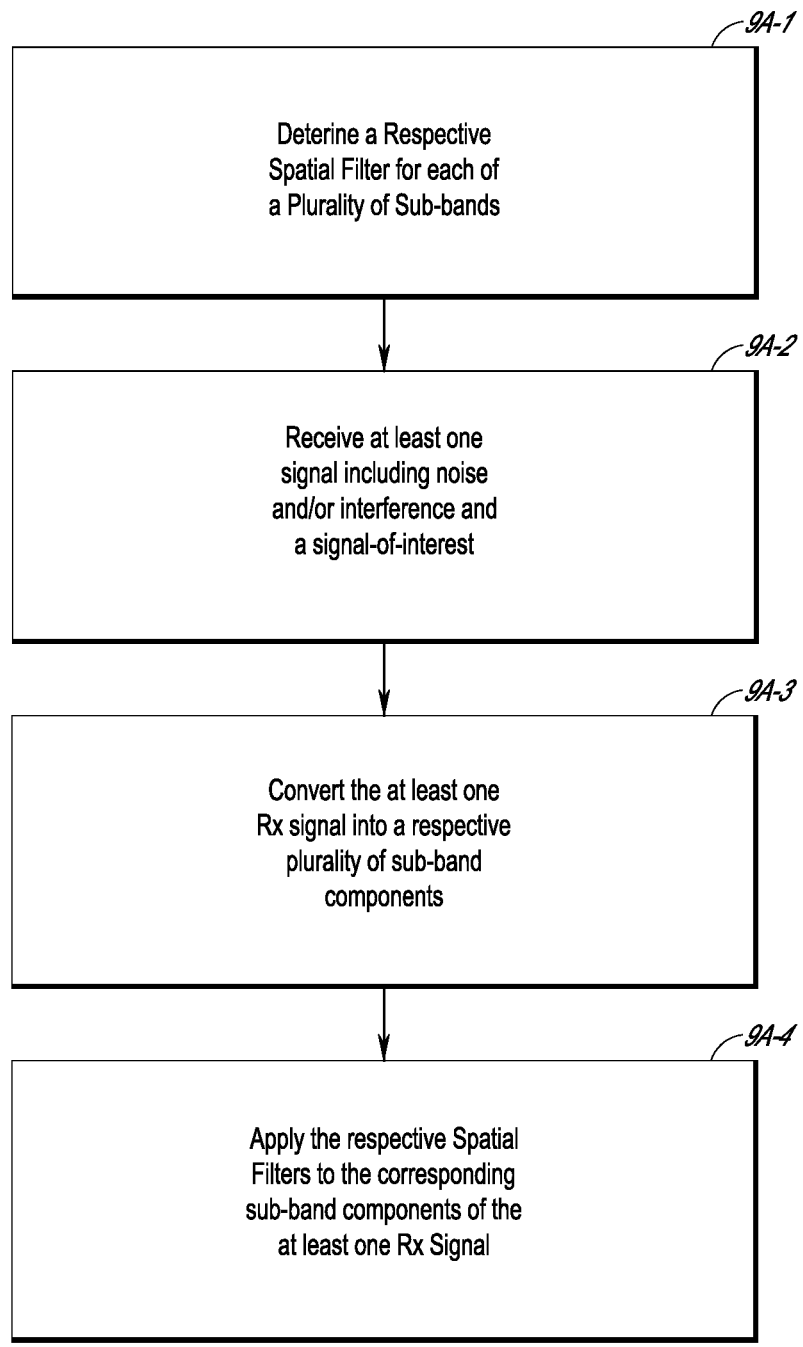
FIGS. 9A-9F are flowcharts illustrating various methods of mitigating interference in a wireless communication network.

FIG. 9A is a flowchart illustrating a method for mitigating interference in a wireless communication network using multiple antennas. As indicated by 9A-1, the method includes determining a respective spatial filter for each of a number of sub-bands that the wideband channel has been divided into. In one embodiment each respective spatial filter is a single tap spatial filter. As indicated by 9A-2, the method includes receiving at least one signal including a signal-of-interest (i.e. information), noise and/or interference. As indicated by 9A-3, the method includes converting the at least one received signal into a respective number of frequency sub-band components. As indicated by 9A-4, the method includes applying the respective spatial filters to the corresponding frequency sub-band component of the at least one received signal to obtain filtered frequency sub-band components.

Figure 9B:
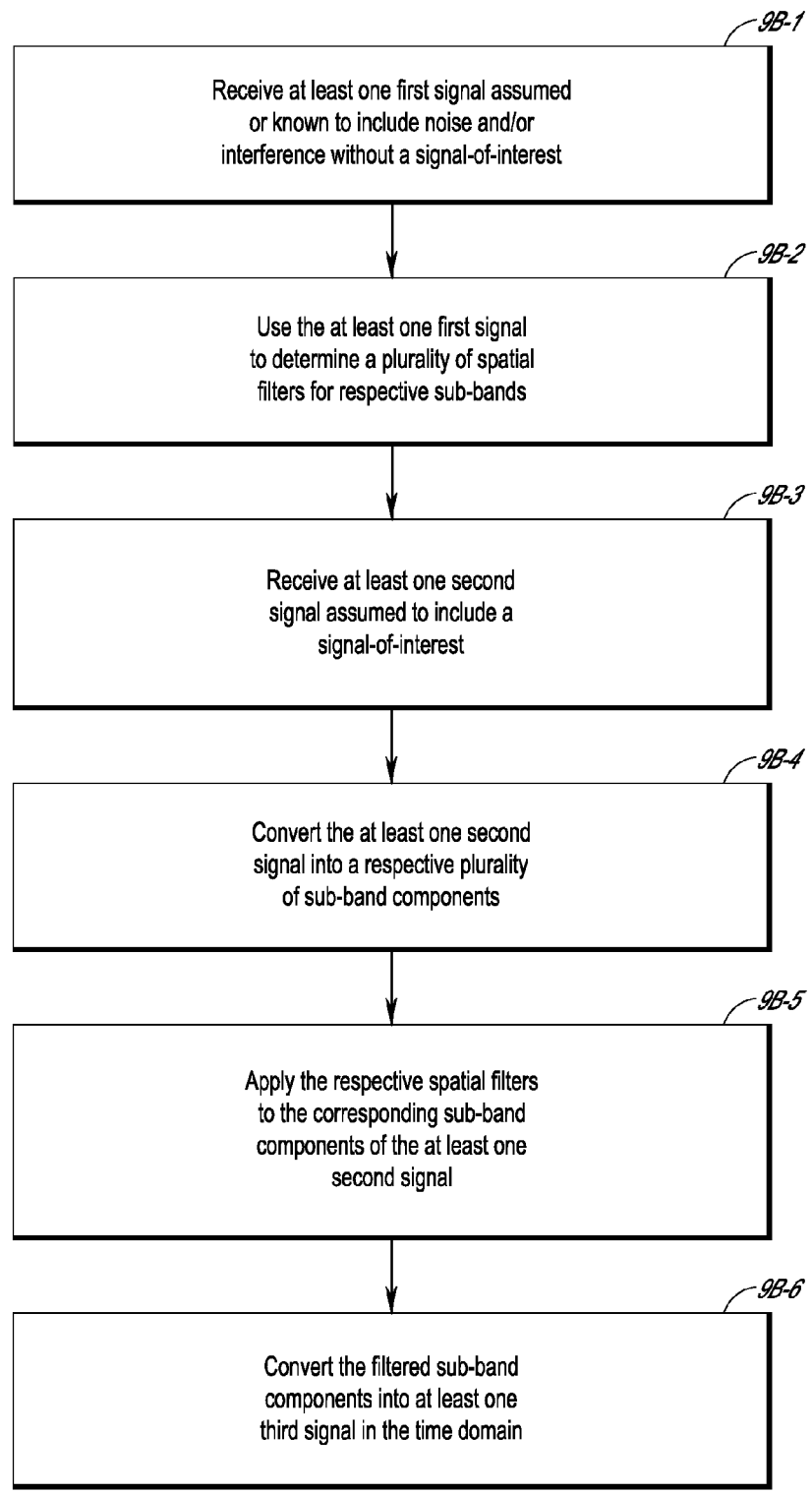

FIG. 9B is a flowchart illustrating a method for mitigating interference in a wireless communication network using multiple antennas. As indicated by 9B-1, the method includes receiving at least one first signal assumed or known to include noise and/or interference without a substantial signal-of-interest. As indicated by 9B-2, the method includes determining a respective spatial filter for each of a number of sub-bands that the wideband channel has been divided into using the at least one first signal. In one embodiment each respective spatial filter is a single tap spatial filter. As indicated by 9B-3, the method includes receiving at least one second signal assumed or known to include a signal-of-interest (i.e. information), noise and/or interference. As indicated by 9B-4, the method includes converting the at least one second signal into a respective number of frequency sub-band components. As indicated by 9B-5, the method includes applying the respective spatial filters to the corresponding frequency sub-band components of the at least one second signal to obtain filtered frequency sub-band components. As indicated by 9B-6, the method includes converting the filtered frequency sub-band components into at least one third signal in the time domain.

Figure 9C:
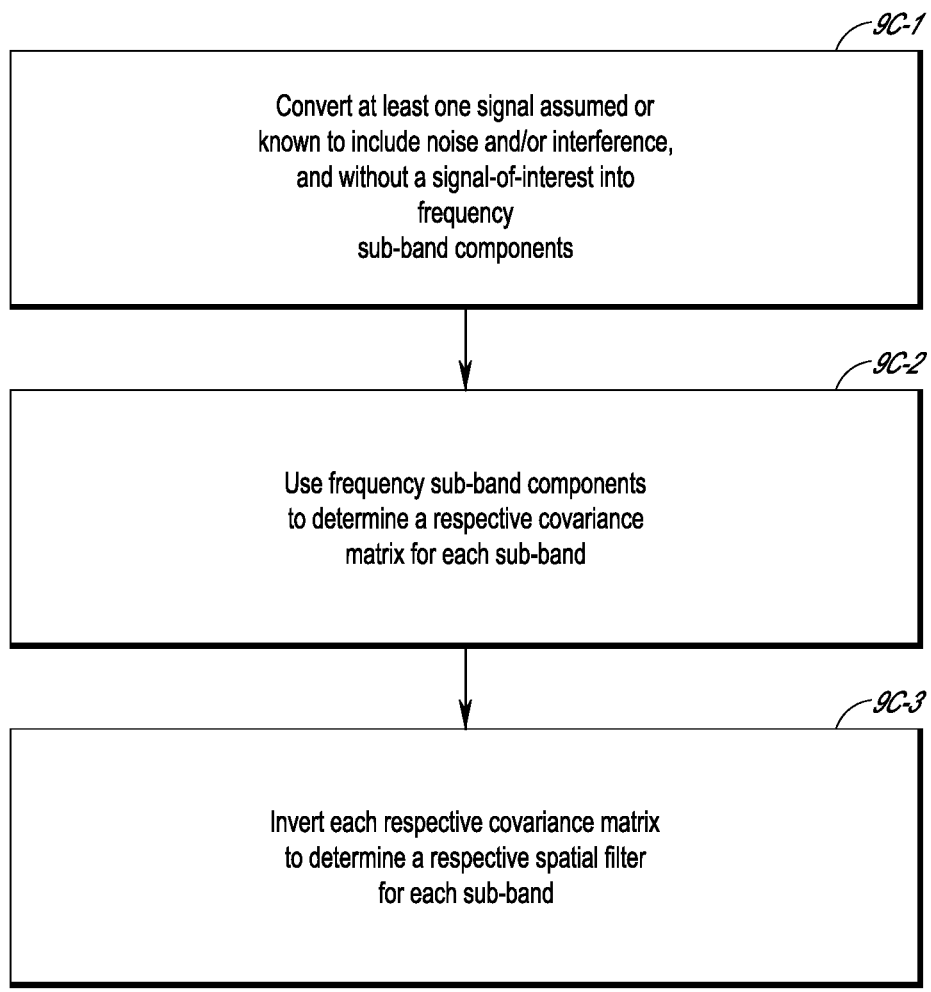

FIG. 9C is a flowchart illustrating a method for mitigating interference in a wireless communication network using multiple antennas. As indicated by 9C-1, the method includes converting at least one signal assumed or known to include noise and/or interference and assumed or known to not include a substantial signal of interest into a respective number of frequency sub-band components. As indicated by 9C-2, the method includes using the frequency sub-band components to determine a covariance matrix for each sub-band. As indicated by 9C-3, the method includes inverting each respective covariance matrix to determine a respective spatial filter for each sub-band.

Figure 9D:
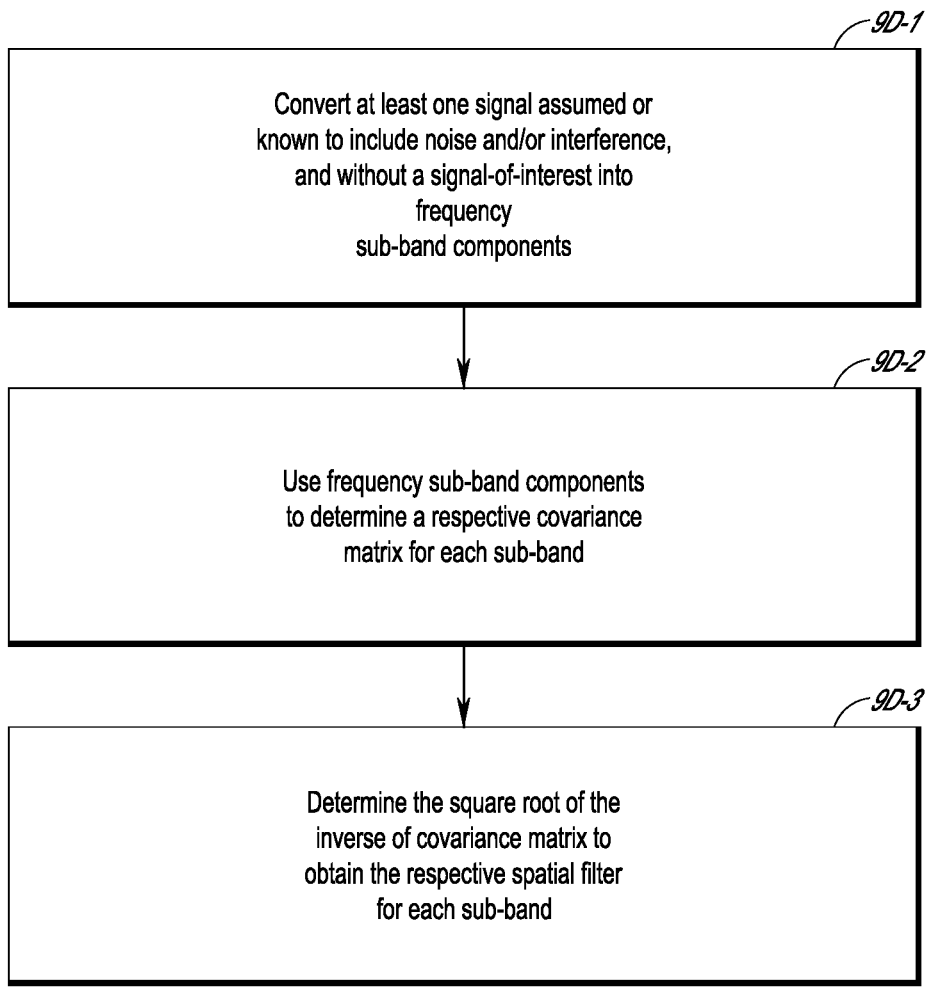

FIG. 9D is a flowchart illustrating a method for mitigating interference in a wireless communication network using multiple antennas. As indicated by 9D-1, the method includes converting at least one signal assumed or known to include noise and/or interference and assumed or known to not include a substantial signal of interest into a respective number of frequency sub-band components. As indicated by 9D-2, the method includes using the frequency sub-band components to determine a covariance matrix for each sub-band. As indicated by 9D-3, the method includes determining the square root of the inverse of the covariance matrix to obtain the corresponding spatial filter for a sub-band.

Figure 9E:
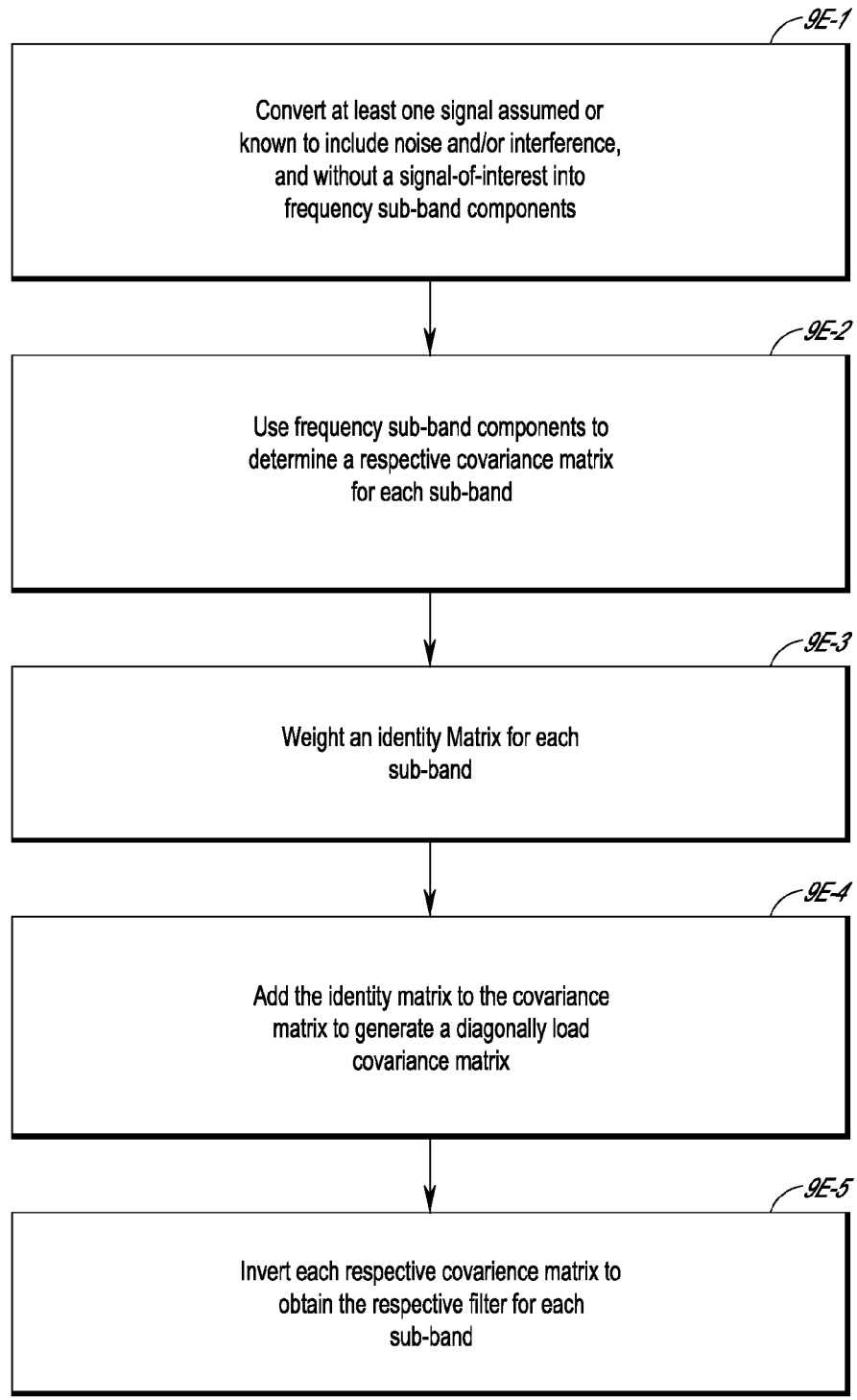

FIG. 9E is a flowchart illustrating a method for mitigating interference in a wireless communication network using multiple antennas. As indicated by 9E-1, the method includes converting at least one signal assumed or known to include noise and/or interference and assumed or known to not include a substantial signal of interest into a respective number of frequency sub-band components. As indicated by 9E-2, the method includes using the frequency sub-band components to determine a covariance matrix for each sub-band. As indicated by 9E-3, the method includes weighting a respective identity matrix for each sub-band. As indicated by 9E-4, the method includes adding the respective identity matrix to the corresponding estimated covariance matrix to produce a respective diagonally loaded covariance matrix for each sub-band. As indicated by 9E-5, the method includes inverting each respective diagonally loaded covariance matrix to determine a respective spatial filter for each sub-band.

Figure 9F:
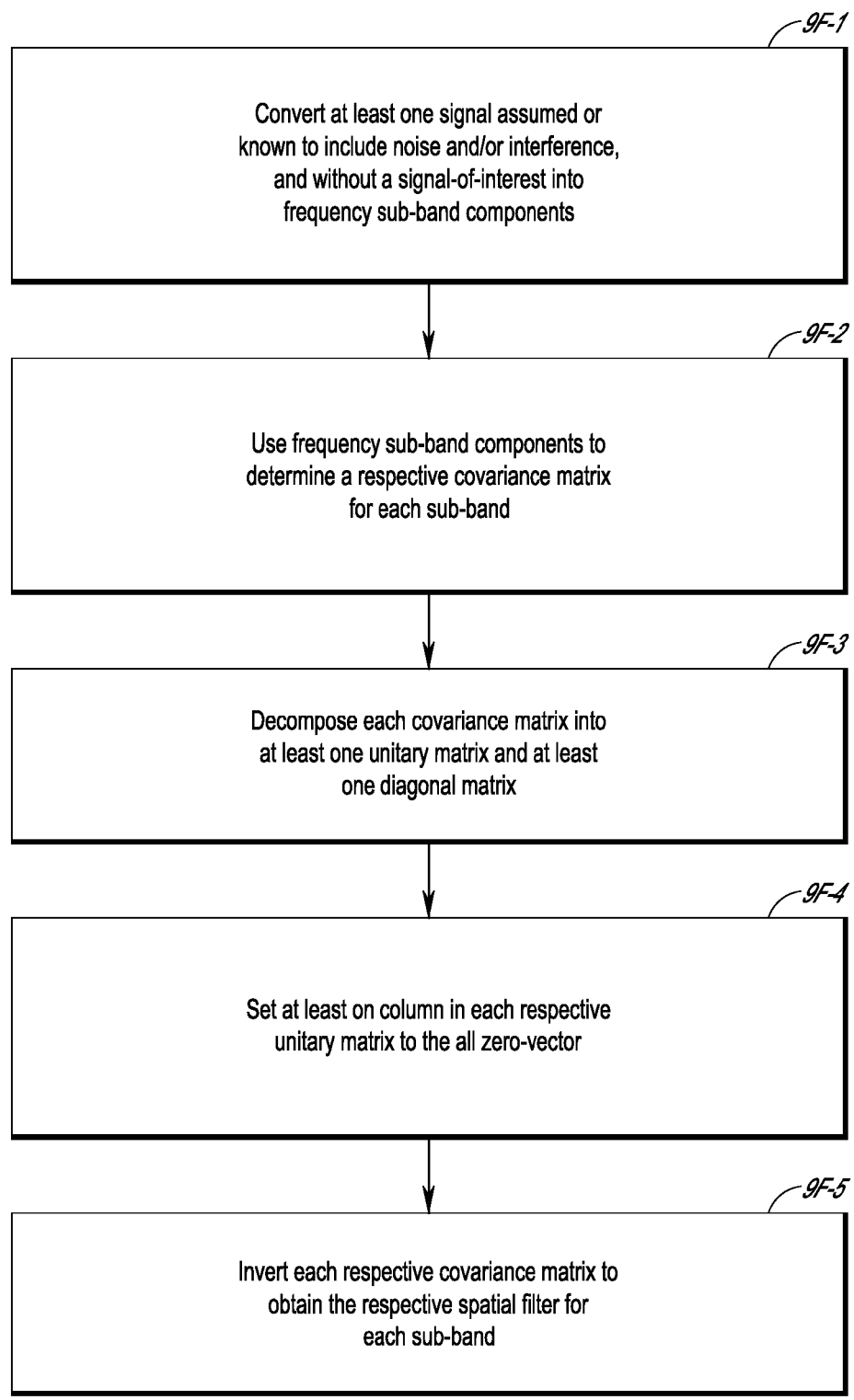

FIG. 9F is a flowchart illustrating a method for mitigating interference in a wireless communication network using multiple antennas. As indicated by 9F-1, the method includes converting at least one signal assumed or known to include noise and/or interference and assumed or known to not include a substantial signal of interest into a respective number of frequency sub-band components. As indicated by 9F-2, the method includes using the frequency sub-band components to determine a covariance matrix for each sub-band. As indicated by 9F-3, the method includes decomposing each covariance matrix into at least one unitary matrix and at least one diagonal matrix. As indicated by 9F-4, the method includes setting at least one column in a respective unitary matrix to the all zero vector. As indicated by 9F-5, the method includes inverting each respective diagonally loaded covariance matrix to determine a respective spatial filter for each sub-band.

The systems and methods disclosed above can be implemented using suitable hardware, software, and/or a combination of hardware and software. A discussion of the results of empirical tests using the above-discussed systems and methods is now presented.

A simulation of the systems and methods disclosed herein were evaluated using a model comprising a MATLAB (The MathWorks, Inc.) model of a MIMO OFDM transmitter, Rayleigh flat fading and frequency selective channel models, and a model of the entire receiver complete with all estimation and synchronization loops. The user data was encoded with a rate 1/2 convolutional code ($133_8$, $171_8$). When the transmission scheme called for more than one spatial stream the encoded data was spread across the streams to exploit spatial diversity.

The encoded data on each spatial stream was then interleaved and mapped into a quadrature amplitude modulation (QAM) constellation. The interleaver depth was matched to the number of coded bits that will be modulated onto each orthogonal frequency division multiplex (OFDM) symbol. A 16-QAM constellation was used to modulate the data onto each subcarrier. The modulation was performed by a 64-point FFT (Fast Fourier Transform), after which the resulting signal was extended with a 16 sample cyclic prefix. The resulting OFDM symbols were then windowed and concatenated to generate the data payload of the transmitted packet, which was sampled at 20 Mhz.

The transmitted waveform was a MIMO OFDM signal with the appropriate number of spatial streams. Training sequences were used for time and frequency synchronization as well as channel estimation. Each packet was transmitted with a 100 byte data payload.

The receiver performed time and frequency synchronization with the incoming packet to align the Fourier transform with the OFDM symbol boundary and to compensate for carrier frequency offset. It also estimated the channel for each subcarrier using training sequences. A MMSE MIMO decoder used channel estimates and demodulated signal to estimate the transmitted constellation points. These points were then de-mapped, de-interleaved and decoded using standard techniques. This system is similar to the one used in the narrowband interference mitigation simulation described above, with the primary difference being that the single-tap spatial filter was replaced with a filter-bank.

Figure 10:
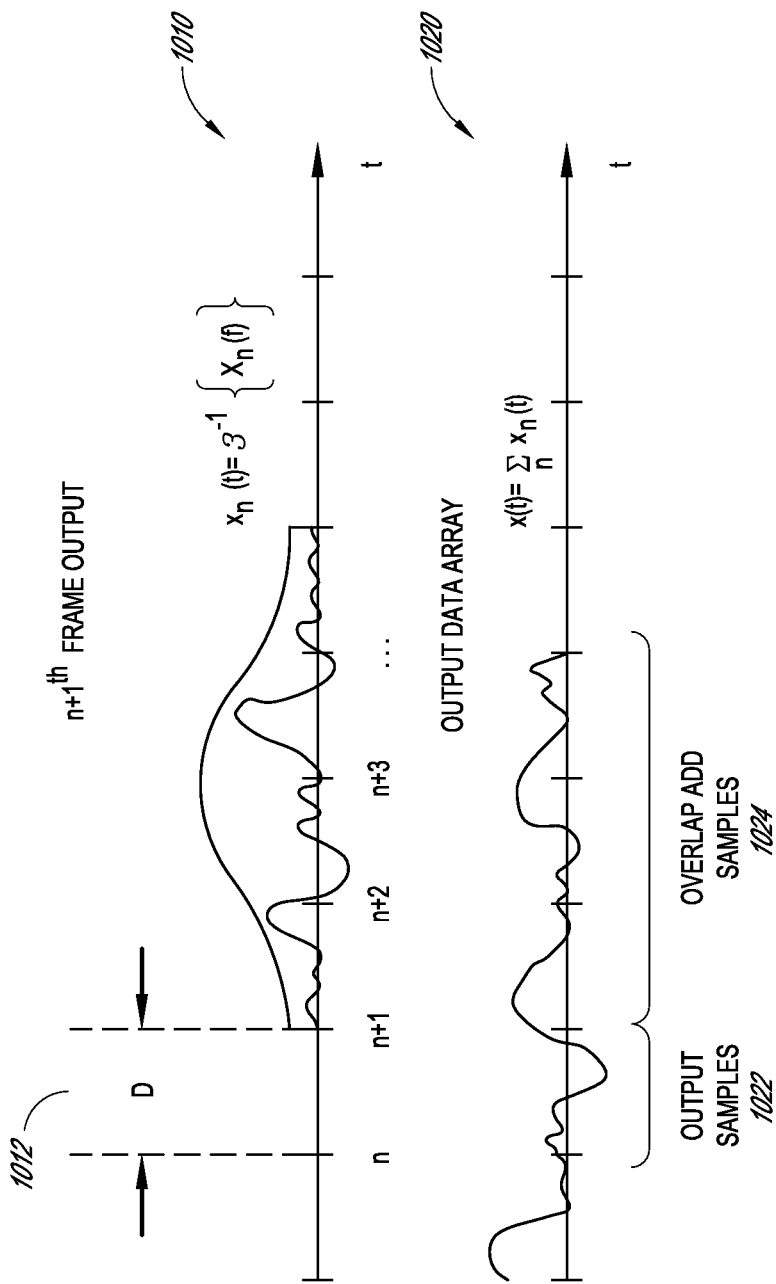
FIG. 10 is a plot of overlapping DFT operations used for sub-banding and filtering.

In certain embodiments, an overlap and add technique is integrated in a MIMO receiver to provide spatial interference mitigation for wideband channels. With reference to FIG. 10, the wideband filter-bank employed a series of overlapping DFT operations to perform the sub-banding and filtering. Consecutive samples of the incoming signal were transformed via the DFT operation and filtered in the frequency domain. These transforms were taken every D samples, where D represents the Short-time Fourier Transform (STFT) interval 1012. For a 32-point DFT with an 8-sample STFT interval, a new 32-DFT point is computed every 8 samples. Each sub-band was filtered using the sub-band filtering matrices after which the inverse DFT transformed the signal back into the time-domain. Samples from overlapping DFT operations 1024 were averaged to generate the filtered time-domain signal. When the simulation parameters called for them, windows were applied to the input of the DFT and output of the inverse DFT operations. The windows were matched in length to the size of the DFT.

Figure 11A:
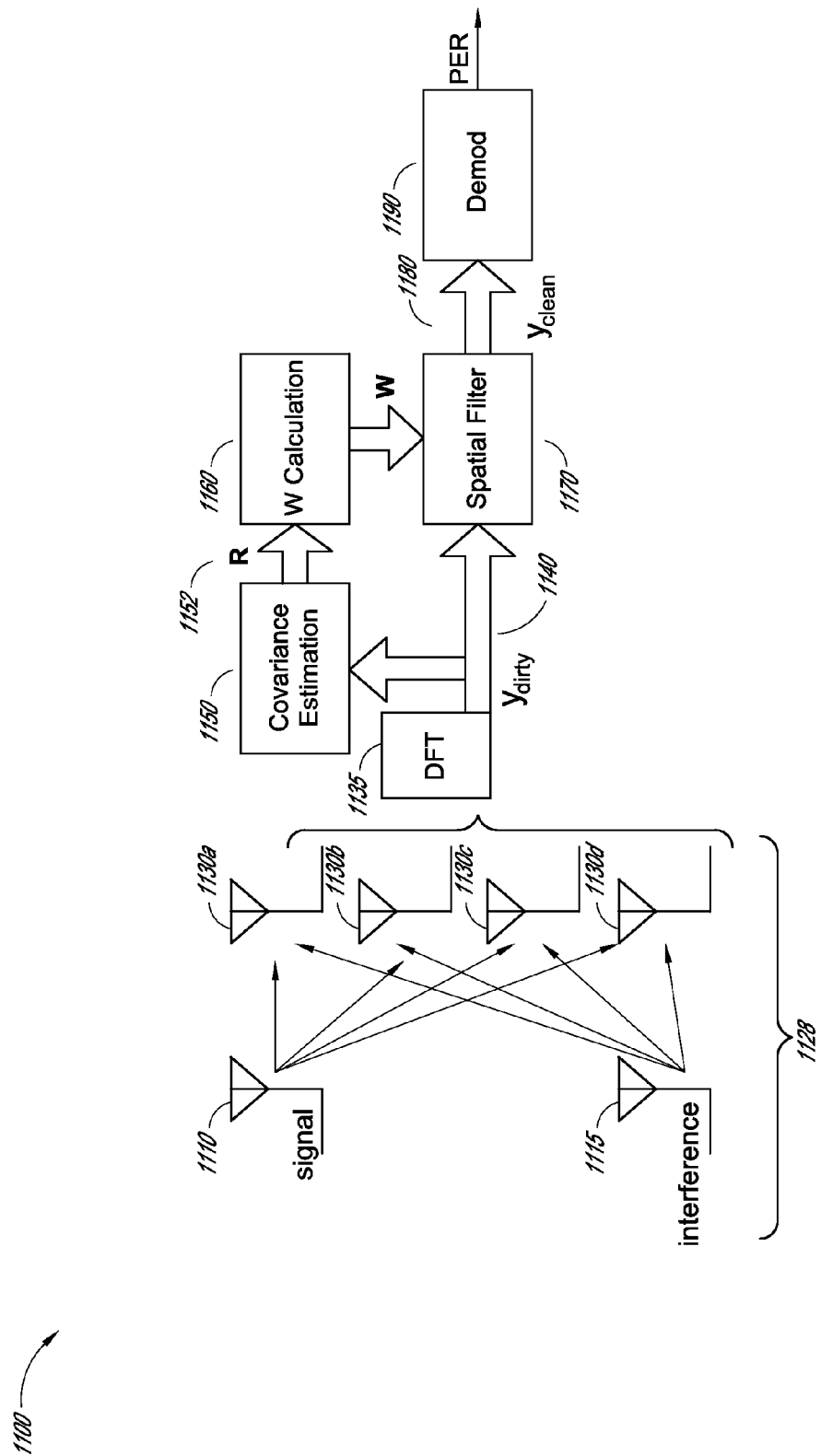
FIGS. 11A-C are simplified block diagrams of various embodiments of a multi-antenna interference mitigation system.

FIG. 11A is a simplified block diagram of an embodiment of a Single-Input-Multiple-Output (SIMO) system 1100a in which multi-antenna interference mitigation procedures such as those disclosed above may be implemented. The system 1100a includes a single transmitter antenna 1110 and four receiver antennas 1130a, 1130b, 1130c, 1130d. While four receiver antennas 1130*a*, 1130*b*, 1130*c*, 1130*d* are shown, those skilled in the art will appreciate that a SIMO system may include two or more receiver antennas.

The system also includes a Discrete Fourier Transform (DFT) module 1135, a covariance matrix estimation module 1150, a spatial filter calculation module 1160, a spatial filter module 1170 and a demodulator 1190. Those skilled in the art will appreciate from the disclosure herein that the DFT module 1135, the covariance matrix estimation module 1150, the spatial filter calculation module 1160, the spatial filter module 1170 and the demodulator 1190 are each more complex than what is illustrated. Those skilled in the art will also appreciate that the system 1100*a* would contain more elements than are shown FIG. 11A, and FIG. 11A only includes those elements beneficial to describing certain aspects of embodiments specific to SIMO systems.

In operation, the single transmitter antenna 1110 and four receiver antennas 1130*a*, 1130*b*, 1130*c*, 1130*d* create independent frequency selective channels 1128. Moreover, the methods performed by the DFT module 1135, the covariance matrix estimation module 1150, the spatial filter calculation module 1160, and the spatial filter module 1170 can be used to reduce the impact of interfering signals transmitted from jammer 1115, which may be a wideband or narrowband jammer. Both the jammer 1115 and the transmitter antenna 1110 transmit signals that are received by the receiver antennas 1130*a*, 1130*b*, 1130*c*, 1130*d*. These signals are combined at the receiver antennas 1130*a*, 1130*b*, 1130*c*, 1130*d* and passed through the interference mitigation algorithm, which operates as disclosed herein. This filtered signal 1180 was then fed into the receiver.

Figure 11B:
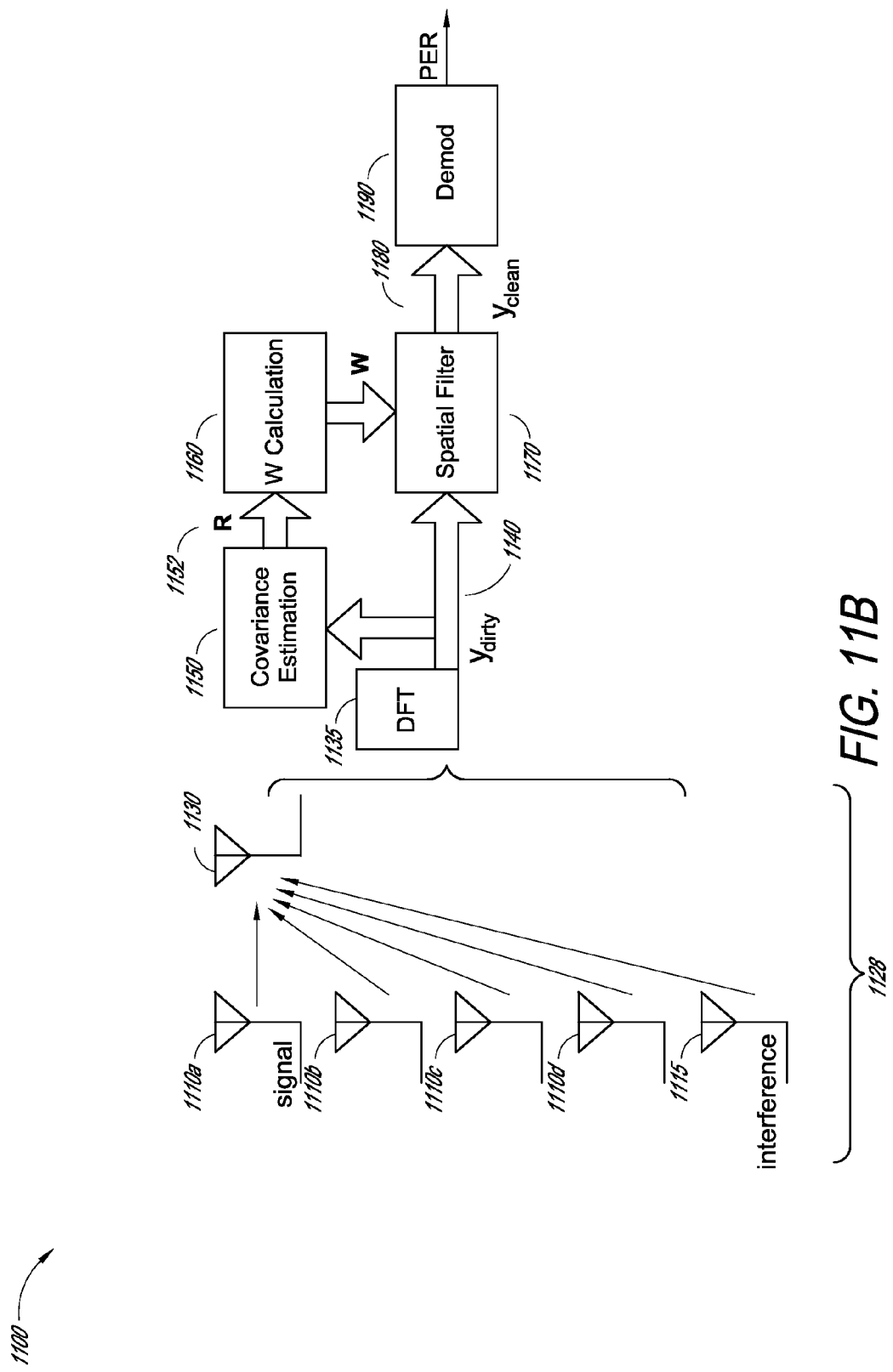

FIG. 11B is a simplified block diagram of an embodiment of a Multiple-Input-Single-Output (MISO) system 1100*b* in which multi-antenna interference mitigation procedures such as those disclosed above may be implemented. The system 1100*a* includes four transmitter antennas 1110*a*, 1110*b*, 1110*c*, 1110*d* and a single receiver antenna 1130. While four transmitter antennas 1110*a*, 1110*b*, 1110*c*, 1110*d* are shown, those skilled in the art will appreciate that a MISO system may include two or more transmitter antennas.

The system 1100*b* also includes a Discrete Fourier Transform (DFT) module 1135, a covariance matrix estimation module 1150, a spatial filter calculation module 1160, a spatial filter module 1170 and a demodulator 1190. Those skilled in the art will appreciate from the disclosure herein that the DFT module 1135, the covariance matrix estimation module 1150, the spatial filter calculation module 1160, the spatial filter module 1170 and the demodulator 1190 are each more complex than what is illustrated. Those skilled in the art will also appreciate that the system 1100*b* would contain more elements than are shown FIG. 11B, and FIG. 11B only includes those elements beneficial to describing certain aspects of embodiments specific to MISO systems.

In operation, the single receiver antenna 1130 and four transmitter antennas 1110*a*, 1110*b*, 1110*c*, 1110*d* create independent frequency selective channels 1128. Moreover, the methods performed by the DFT module 1135, the covariance matrix estimation module 1150, the spatial filter calculation module 1160, and the spatial filter module 1170 can be used to reduce the impact of interfering signals transmitted from jammer 1115, which may be a wideband or narrowband jammer. Both the jammer 1115 and the transmitter antennas 1110*a*, 1110*b*, 1110*c*, 1110*d* transmit signals that are received by the receiver antenna 1130. These signals are combined at the receiver antenna 1130 and passed through the interference mitigation algorithm, which operates as disclosed elsewhere herein. This filtered signal 1180 was then fed into the receiver.

Figure 11C:
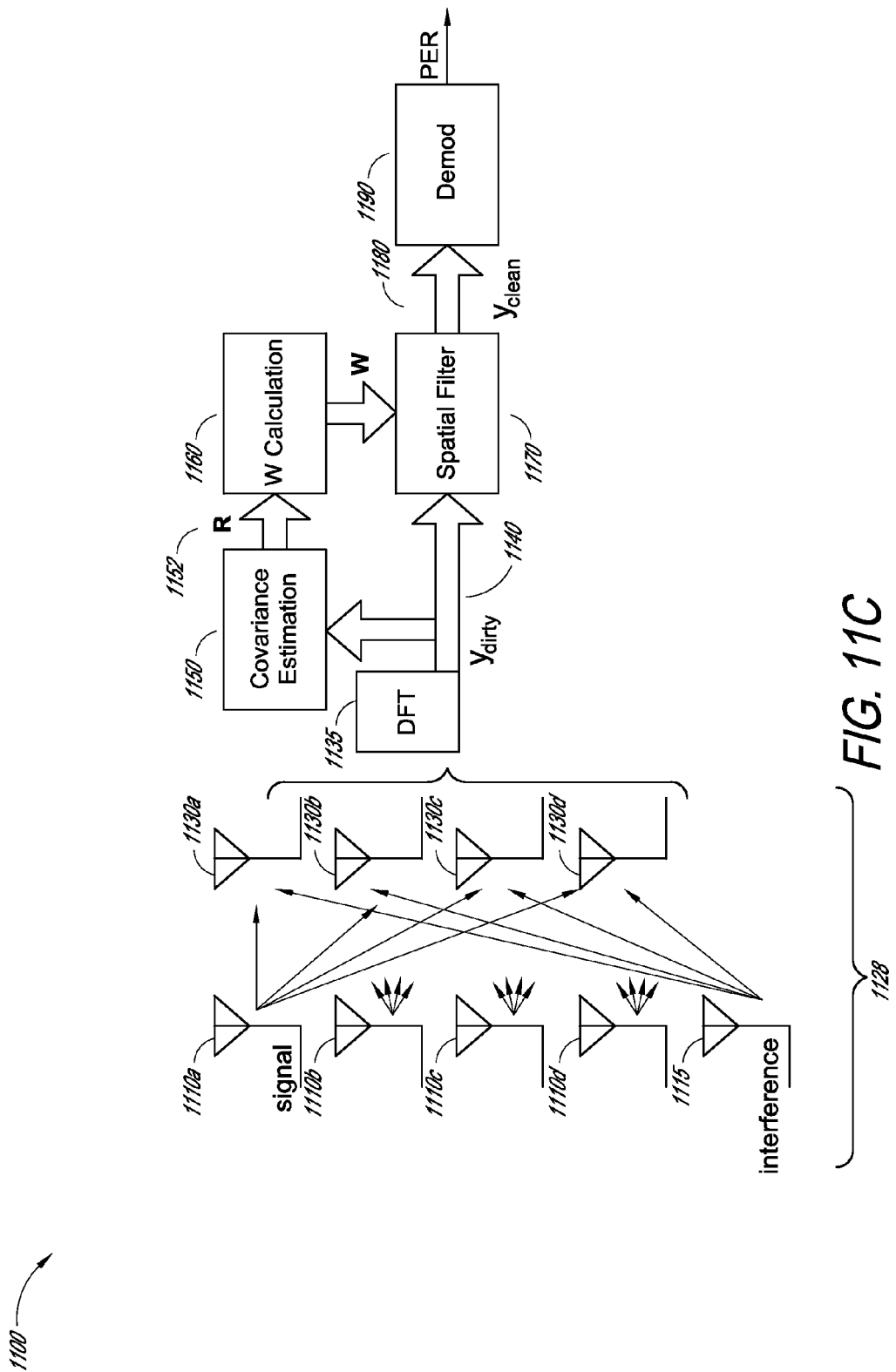

FIG. 11C is a simplified block diagram of an embodiment of a Multiple-Input-Multiple-Output (MIMO) system 1100*c* in which multi-antenna interference mitigation procedures such as those disclosed above may be implemented. The system 1100*c* includes a four transmitter antennas 1110*a*, 1110*b*, 1110*c*, 1110*d* and four receiver antennas 1130*a*, 1130*b*, 1130*c*, 1130*d*. While four transmitter antennas and four receiver antennas are shown, those skilled in the art will appreciate that a MIMO system may include two or more transmitter antennas and two or more receiver antennas.

The system 1100*c* also includes a Discrete Fourier Transform (DFT) module 1135, a covariance matrix estimation module 1150, a spatial filter calculation module 1160, a spatial filter module 1170 and a demodulator 1190. Those skilled in the art will appreciate from the disclosure herein that the DFT module 1135, the covariance matrix estimation module 1150, the spatial filter calculation module 1160, the spatial filter module 1170 and the demodulator 1190 are each more complex than what is illustrated. Those skilled in the art will also appreciate that the system 1100*b* would contain more elements than are shown FIG. 11B, and FIG. 11B only includes those elements beneficial to describing certain aspects of embodiments specific to MIMO systems.

In operation, the four transmitter antennas 1110*a*, 1110*b*, 1110*c*, 1110*d* and four receiver antennas 1130*a*, 1130*b*, 1130*c*, 1130*d* create independent frequency selective channels 1128. Moreover, the methods performed by the DFT module 1135, the covariance matrix estimation module 1150, the spatial filter calculation module 1160, and the spatial filter module 1170 can be used to reduce the impact of interfering signals transmitted from jammer 1115, which may be a wideband or narrowband jammer. Both the jammer 1115 and the four transmitter antennas 1110*a*, 1110*b*, 1110*c*, 111 transmit signals that are received by the receiver antennas 1130*a*, 1130*b*, 1130*c*, 1130*d*. These signals are combined at the receiver antennas 1130*a*, 1130*b*, 1130*c*, 1130*d* and passed through the interference mitigation algorithm, which operates as disclosed elsewhere herein. This filtered signal 1180 was then fed into the receiver.

As discussed above, the inter-frame spacing between the packets was used to estimate the covariance matrix R of the interference+noise signal. Since this interval will have the interfernce but not the packet, it is ideal for covariance matrix estimation. Since the testing environment had a 4-antenna receiver, the estimated covariance matrix was a 4×4 matrix. Once the covariance has been estimated there are several methods that can be used to generate a spatial filtering matrix. For generality, with regard to FIG. 11, this matrix is referred to as W.

Several of these methods were discussed above. In certain embodiments it may be advantageous to implement nulling with some amount of diagonal loading. As discussed above, this method involves adding a constant proportional to the noise power to the main diagonal of the covariance matrix. For convenience and desirability based on performance evaluations, embodiments described herein focus on this method. However, other methods of generating a spatial filtering matrix, including but not limited to those described above, may also be used.

In the present simulation, the received signal 1140 was broken down into its sub-band components by the DFT based filter bank. Each sub-band component was filtered by the appropriate W for that sub-band to generate the filtered version these sub-band components. This filtered signal was fed into the MIMO OFDM receiver. The decoded data was compared with the transmitted data to determine if the packet was received correctly. Packet error rate was calculated based on the output of the receiver.

Since wideband interference may be difficult to suppress in more dispersive channels, all simulations were run in a Rayleigh frequency selective channel with 50 ns rms delay spread. To demonstrate how much interference can be suppressed, the distribution of the eigen-values of the interference in each sub-band was analyzed. The ratio of the dominant eigen-value to the rest of the eigen-values provides an insight into how much interference can be suppressed by removing that eigen-mode from the incoming signal. This is discussed in more detail below. After demonstrating that the filter-bank approach is able to suppress some interference, the suppression ability was measured by evaluating the gain in the Signal to Interference+Noise Power, as well as the packet detection and overall packet error rate performance. These results are presented below. In to demonstrate the tradeoff between DFT size and required null-depth, we investigated the affect the filter structure of choice had on the incoming signal. The effective channel that the receiver sees in the signal is the convolution of the actual channel with the filter. Finally, to demonstrate how much interference power was surviving the filtering operation and to demonstrate how much distortion the filter was creating in the signal, the losses from the filtering operation were analyzed, and are discussed below.

Eigen-value Distribution

As an initial measure of potential interference suppression ability, the eigen-value distribution of the covariance matrices for each sub-band was analyzed. Since the interference is from a single source, the power in the covariance matrix is dominated by a single eigen-mode. This indicates efficient energy compaction and allows creation of a deeper null without sacrificing as many degrees of freedom. The spatial covariance in each sub-band was measured, as was the ratio (in dB) of dominant eigen-value to the $2^{nd}$, $3^{rd}$, and $4^{th}$ eigen-values. Each trial consisted of convolving the interference with a randomly generated channel and measuring the spatial covariance in each sub-band. The statistics were collected over 1000 trials, with DFT sizes ranging from 16 to 512 samples. The cumulative density functions (CDF) for the ratios of the $2^{nd}$ and $3^{rd}$ eigen-values to the dominant are shown in FIG. 14A.

Figure 14A:
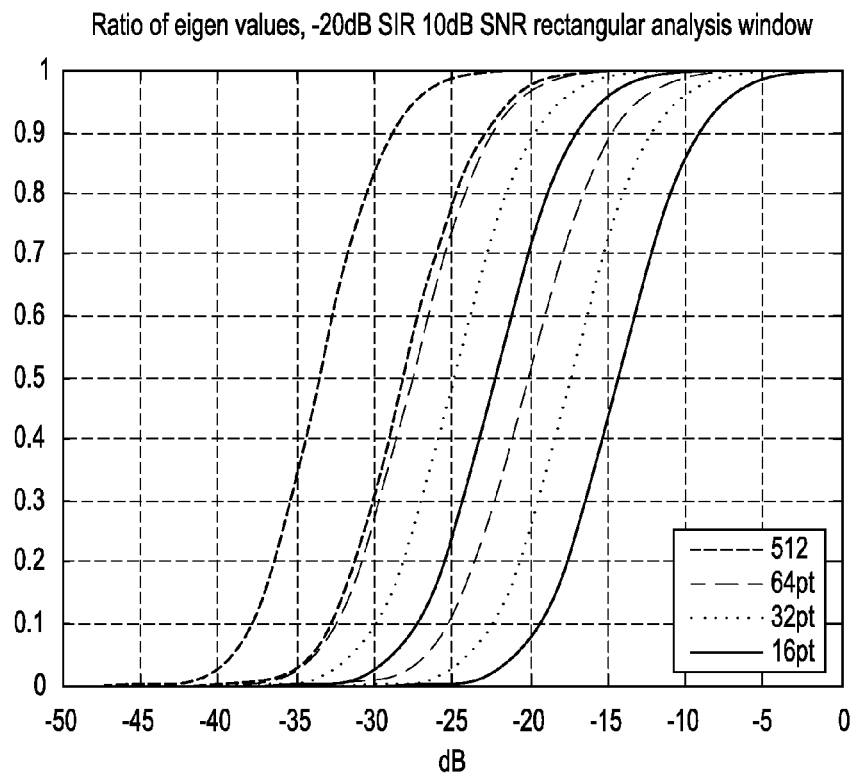
FIGS. 14A-14C are plots of eigen-value ratios with various windows.

FIG. 14A demonstrates that the larger DFTs may provide greater separation between the dominant eigen-mode and the secondary eigen-modes. The 512 pt DFT shows the best energy compaction with the second eigen-value 25-30 dB lower than the primary. While this may be desirable, it is associated with a degree of computational complexity. In certain embodiments, it may be desirable to find a smaller DFT which still achieves reasonable energy compaction. In certain embodiments, windows may be useful for modifying the filter response of the DFT. In certain embodiments, windows may change the properties of the eigen-value distribution, and may provide increased potential for interference suppression.

Figure 13:
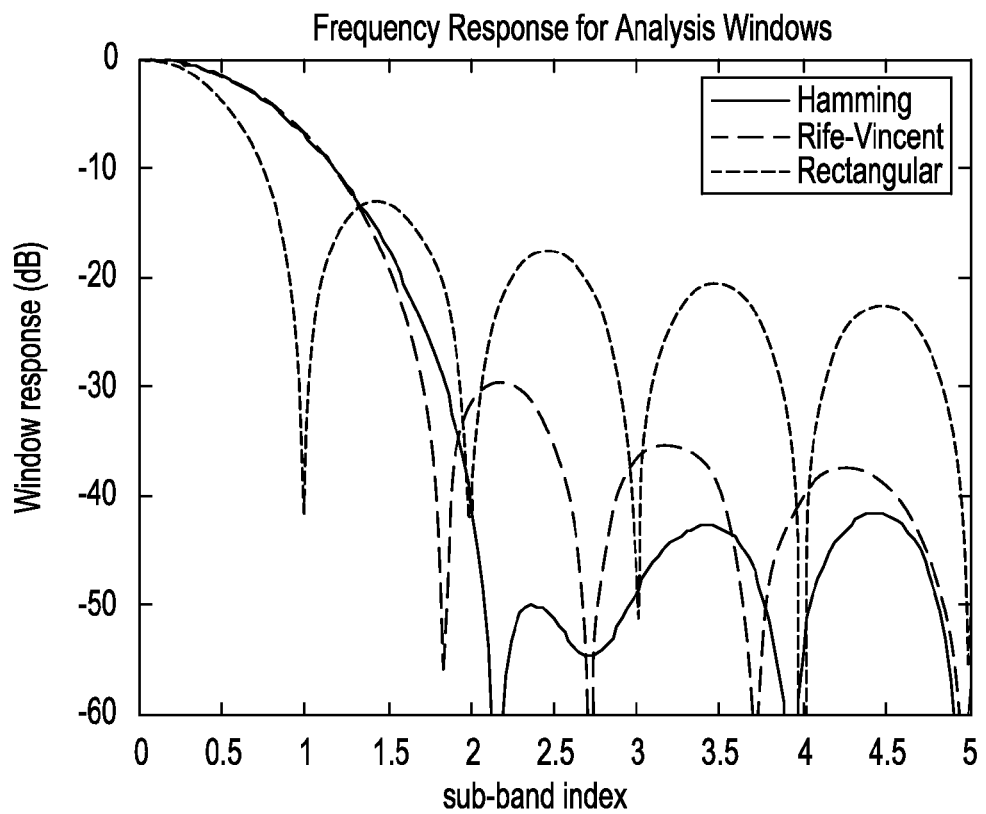
FIG. 13 is a plot of the frequency response of various windows.

The Hamming window and the Rife-Vincent windows were considered for the analysis portion of the filter bank. The Hamming window is a window with low sidelobes but a large main lobe. The Rife-Vincent has a narrower main lobe at the cost of higher side lobes. FIG. 13 shows the frequency response of the Hamming and Rife-Vincent windows. This tradeoff between main-lobe width and side-lobe rejection will be discussed in more detail below.

Figure 14B:
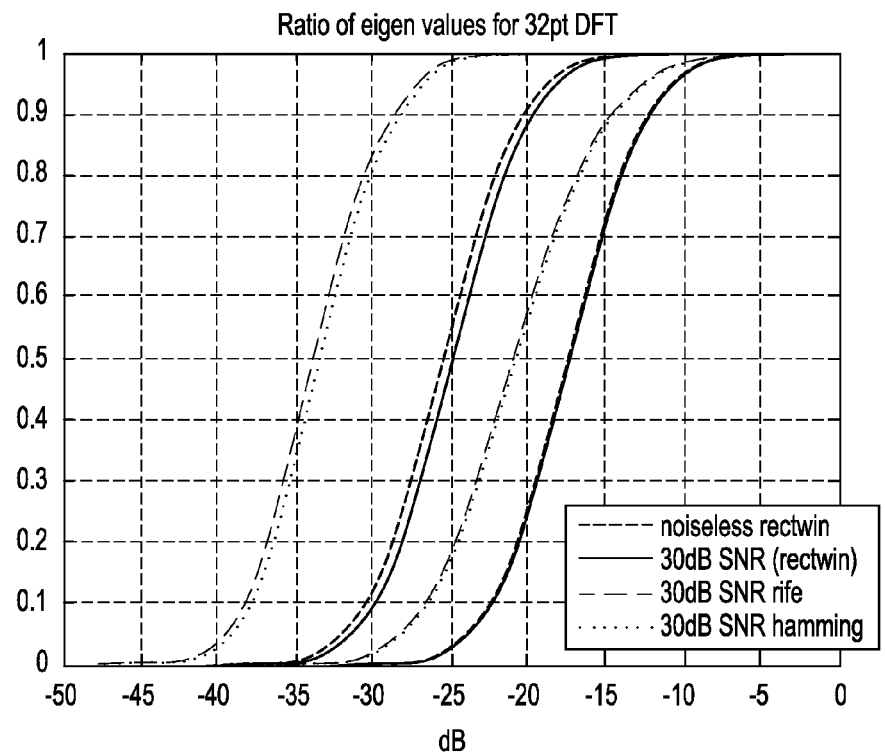

FIG. 14B shows the improvement that can be achieved by using windows to suppress the side-lobes. The noiseless case is also presented to show the maximum performance that can be achieved with a rectangular window. At 30 dB there is no notable loss from the noise. The other lines represent the CDF of the eigen-value ratio for the Rife-Vincent window and the Hamming window. These CDFs are 8 dB lower than that of the rectangular window, and therefore it may be possible to suppress an additional 8 dB of interference power without sacrificing another degree of freedom.

Figure 14C:
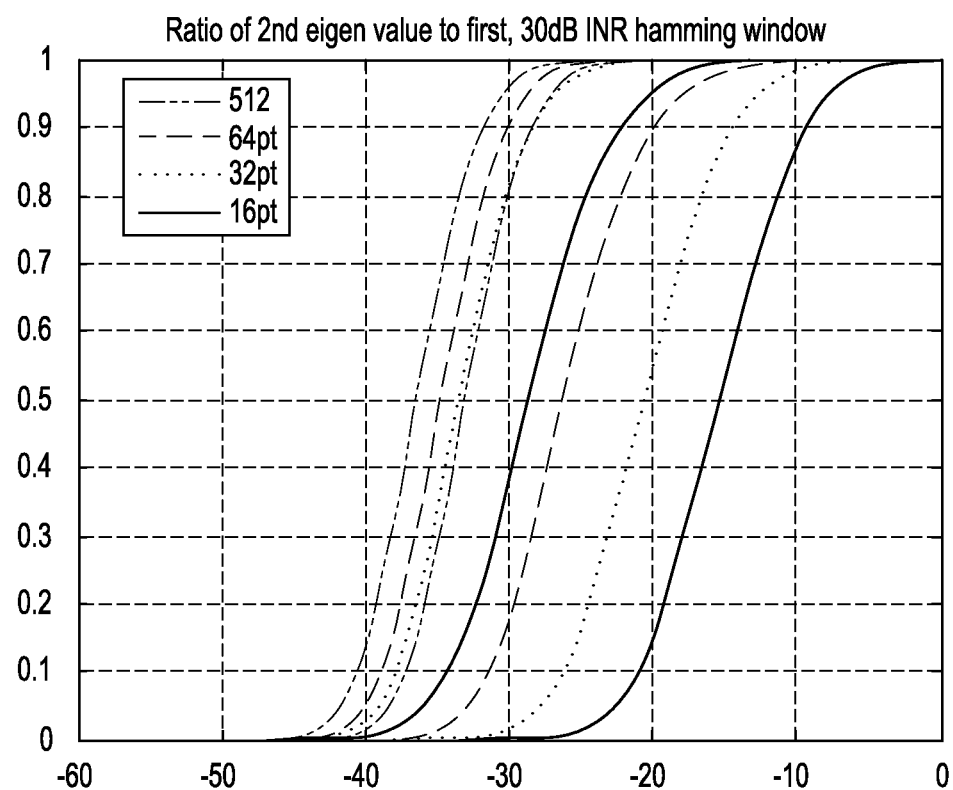

As explained above, the Rife-Vincent window has a narrower main-lobe than the Hamming window at the cost of higher side-lobes. Both windows show similar ability to suppress interference. Since the computational complexity associated with both windows is similar, both are considered throughout the discussion below. FIG. 14C shows the performance of several DFT sizes with the Hamming window. This figure shows that a filter-bank based on 32 pt DFTs or longer may be sufficient to suppress 20 dB interference.

SINR Gain

Before attempting to demodulate any packets it may be valuable to know how much the interference power is being suppressed with respect to the signal power. As an indicator of potential performance, the gain in Signal to Interference+Noise Ratio (SINR) was analyzed. This measurement was performed by using the same method described above. The signal power and interference power were measured before and after the application of the DFT-based filter bank. The ratio of these powers was averaged over 1000 trials. Each trial consisted of a single packet being transmitted in the presence of interference. The SIR was swept from −20 dB to +20 dB. This was done in a Rayleigh frequency selective channel with 50 ns rms relay spread and with SNR ranging from 10 dB to 25 dB.

Figure 15:
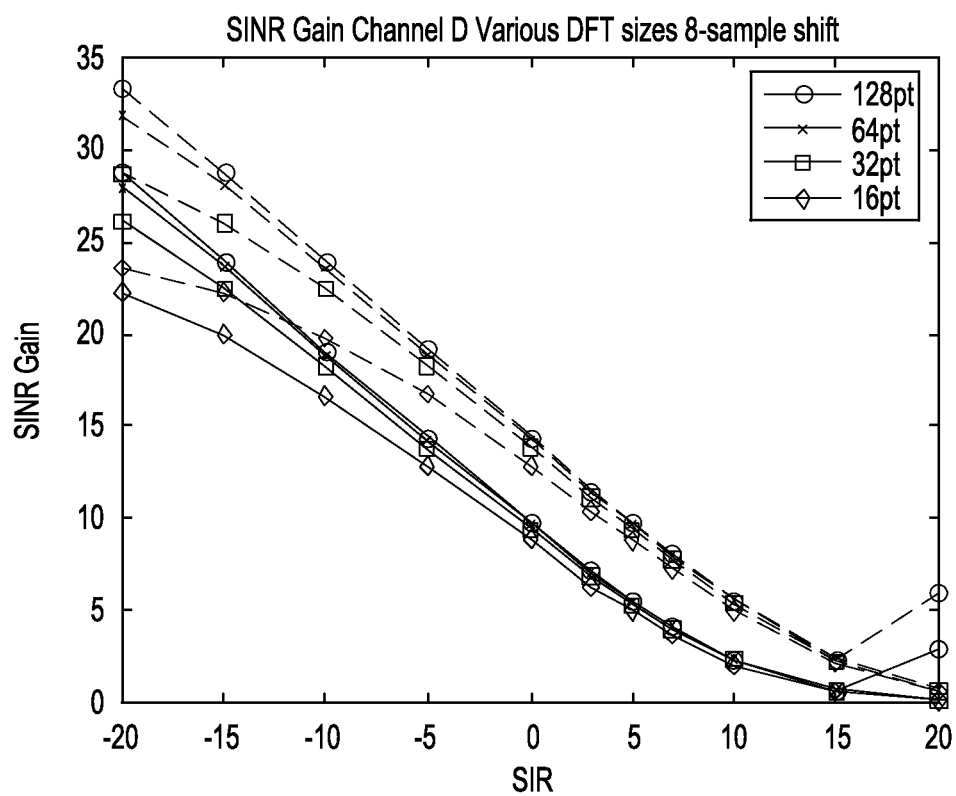
FIG. 15 is a plot of the simulated signal-to-noise-plus-interference ratio (SINR) gain of a channel using various interference mitigation filters.

FIG. 15 shows the gain in SINR for various DFT sizes with standard rectangular analysis and synthesis windows. The gains from the larger DFT are evident when the interference power is significantly stronger than the signal power. For instance when the interference power is 20 dB greater than the signal power, under certain conditions, the 128 pt DFT can provide approximately 9 dB more suppression than the 16 pt DFT. As the interference power gets weaker the smaller DFTs are able to suppress the interference approximately as well as the larger ones. The solid set of curves corresponds to 10 dB SNR, while the dashed curves correspond to 15 dB SNR. These curves are separate in the range of 5 dB for essentially all SIR, which may indicate that the interference can be suppressed to a certain level but not below that. The gains achieved by the larger DFT are also less dramatic when the SNR is lower.

Packet Error Rate

The discussion above demonstrates that the algorithm of certain embodiments suppresses the interference power relative to the signal of interest. Before directly analyzing the packet error rate of the simulation system, the discussion below first demonstrates that the factor driving the packet error rate is the bit error rate of the user data. Synchronization may be a major factor in the performance of a communications system. In order to properly decode an OFDM waveform, it may be required to synchronize the receiver in time with the OFDM symbol boundary. If synchronization fails too easily, its failure rate may dominate the overall performance of the system. This may create an undesirable floor on the overall performance of the system.

Figure 16A:
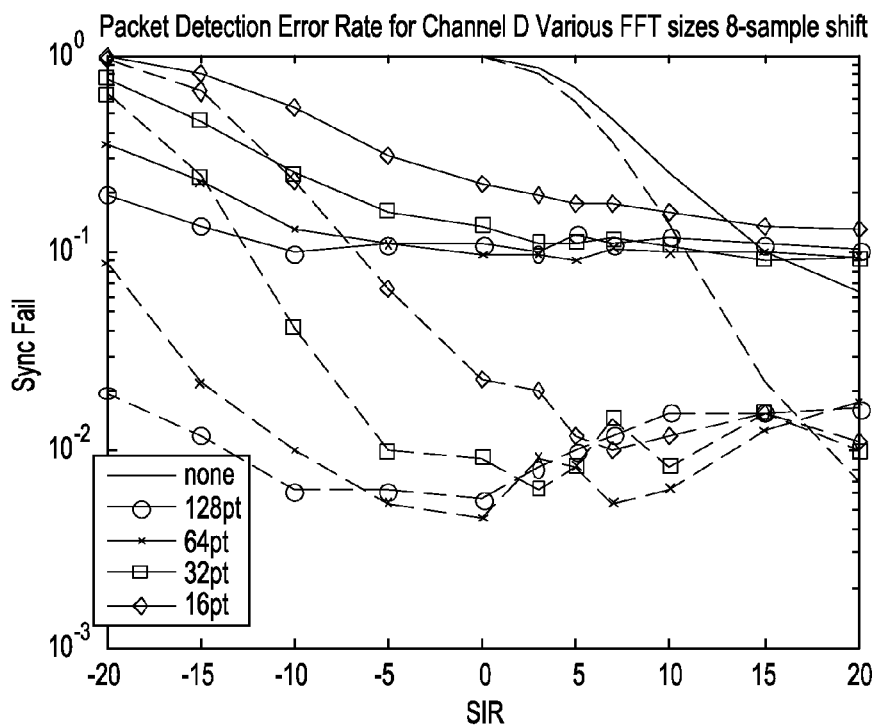
FIGS. 16A-16E are plots of the simulated packet detection performance with various filters, windows, and spatial streams.

To ensure that these estimation tasks are not limiting the system performance, we evaluated the packet detection performance. Packet detection failure may occur if the header containing the modulation parameters is incorrectly decoded. FIG. 16A shows the packet detection performance as a function of SIR for various DFT sizes with rectangular windows. Once again, the solid curves correspond to 10 dB SNR and the dashed curves are with 15 dB SNR. As demonstrated in FIG. 16A, that the error rates are fairly low when the SNR is at least 15 dB. The larger DFTs improve the packet detection performance when the interference power is high. As the interference power decreases the error rates of the various DFT sizes converge to give roughly the same performance.

Figure 16B:
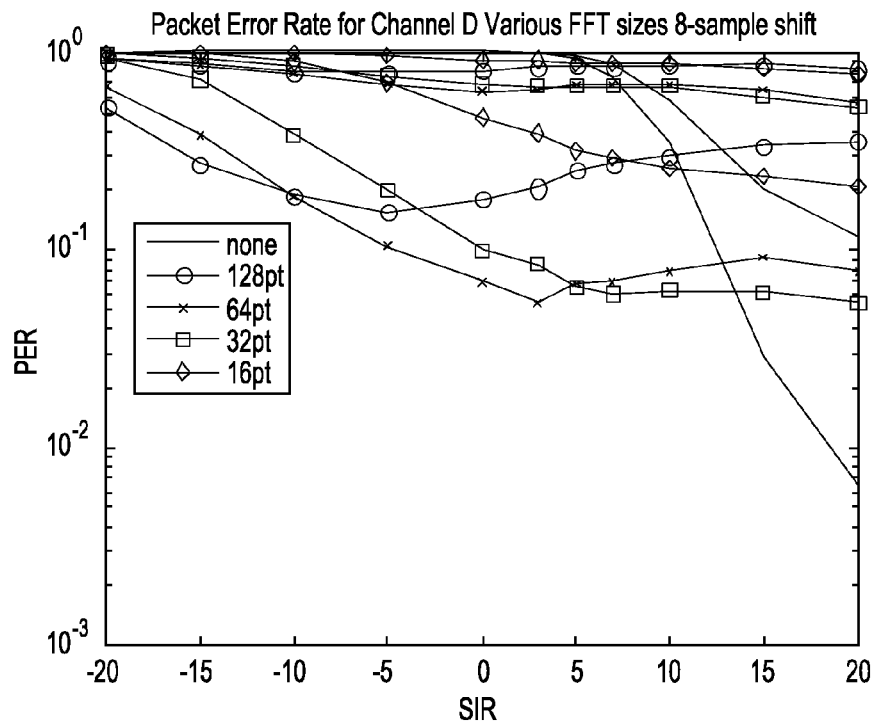

It was determined that the packet error rate of the system will not be limited by the performance of packet detection and synchronization. The relevant DFT sizes provided enough interference suppression for reasonable performance when the SNR was greater than 15 dB. FIG. 16B demonstrates the packet error rate performance of the various DFT sizes for a single spatial stream packet modulated with a 16-QAM constellation and encoded with a rate 1/2 convolutional code. These packets were 100 bytes in length.

FIG. 16B shows a tradeoff between the interference suppression ability of the larger DFT with the inter-symbol interference (ISI) generated by the larger filter length. When the interference is very strong the greater interference suppression ability of the larger DFTs may provide the gain in SINR required for successful demodulation. For example, at −20 dB SIR the 128 pt DFT provided the best performance. As the interference power decreases, the dispersion resulting from the long filter length may begin to dominate the performance and an error floor may develop. At the far right of FIG. 16B, the error rates for the four DFT sizes flatten out and create an error floor. The region from −10 dB to +5 dB SIR shows the trade-space for the DFT size with respect to the interference power. At −10 dB, the 64 pt DFT began to provide better performance than the 128 pt DFT; then at +5 dB, the 32 pt DFT provided better performance than both of the larger DFTs. Since the smaller DFTs have less dispersion they create lower error floors. According to FIG. 16B, when sweeping the SIR from −10 dB to +5 dB, the benefit of the lower error floors begin to take effect.

Figure 16C:
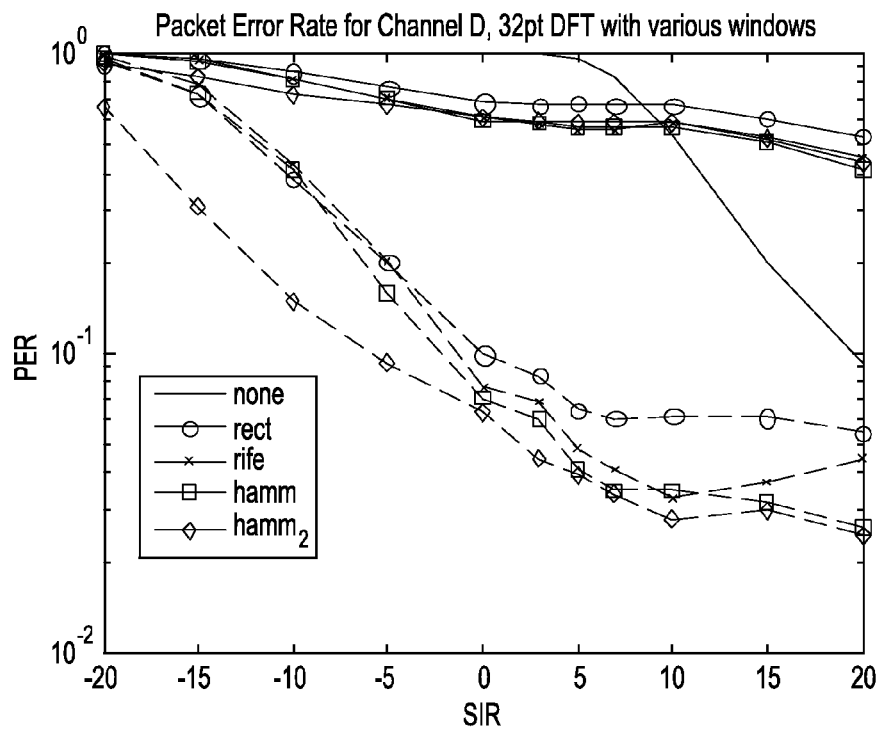

The results from FIG. 16B were generated using rectangular windows on the analysis and synthesis sections of the filter bank. As demonstrated above, windows may improve the ability of the filter-bank to suppress interference by creating a larger separation between the dominant eigen-value and the secondary eigen-values. FIG. 16C shows how windowing effects overall packet error rate performance for a 32 pt DFT based filter bank.

Figure 16D:
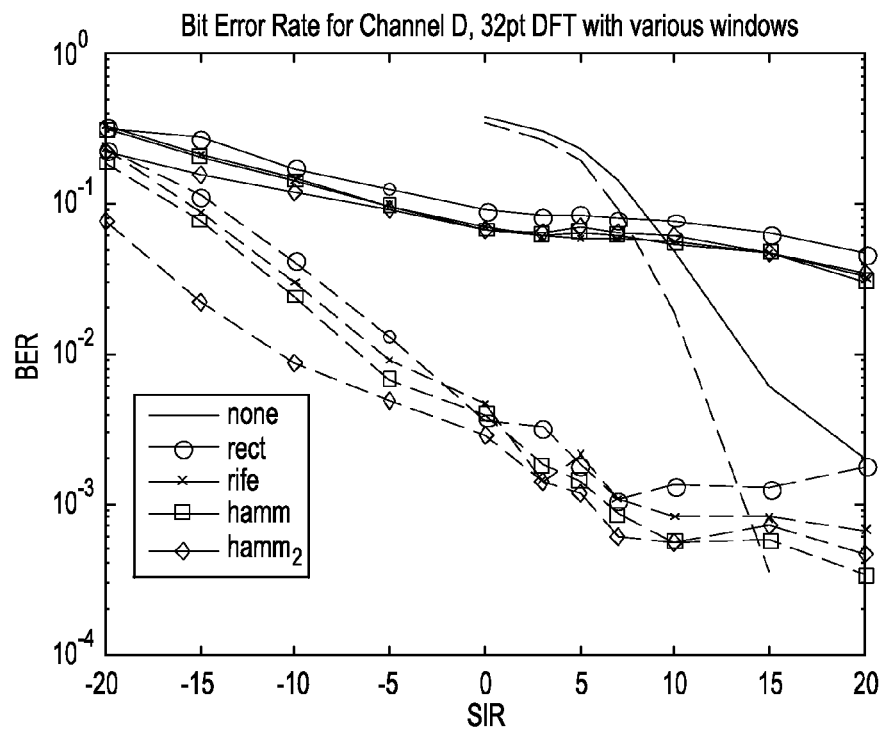

As a baseline we evaluated the performance of the system without any interference mitigation. This is shown in the solid curve. Once again the solid curve represents 10 dB SNR while the dashed curve represents 15 dB SNR. We tested the filter bank with rectangular, Rife-Vincent, and Hamming analysis windows. The performance of these analysis windows is shown in the curves with the circle, Xs and squares, respectively. These trials were run with rectangular synthesis windows. According to FIG. 16C, even though the Rife-Vincent window has a narrower main-lobe, it didn't perform as well as the Hamming window. This may be due to the higher side-lobes. Since the Hamming analysis window gave the best performance gain, we applied it to the synthesis portion of the filter bank where we saw an additional improvement in performance (hamm$_2$). The bit error rate for the same set of simulations is shown in FIG. 16D.

Figure 16E:
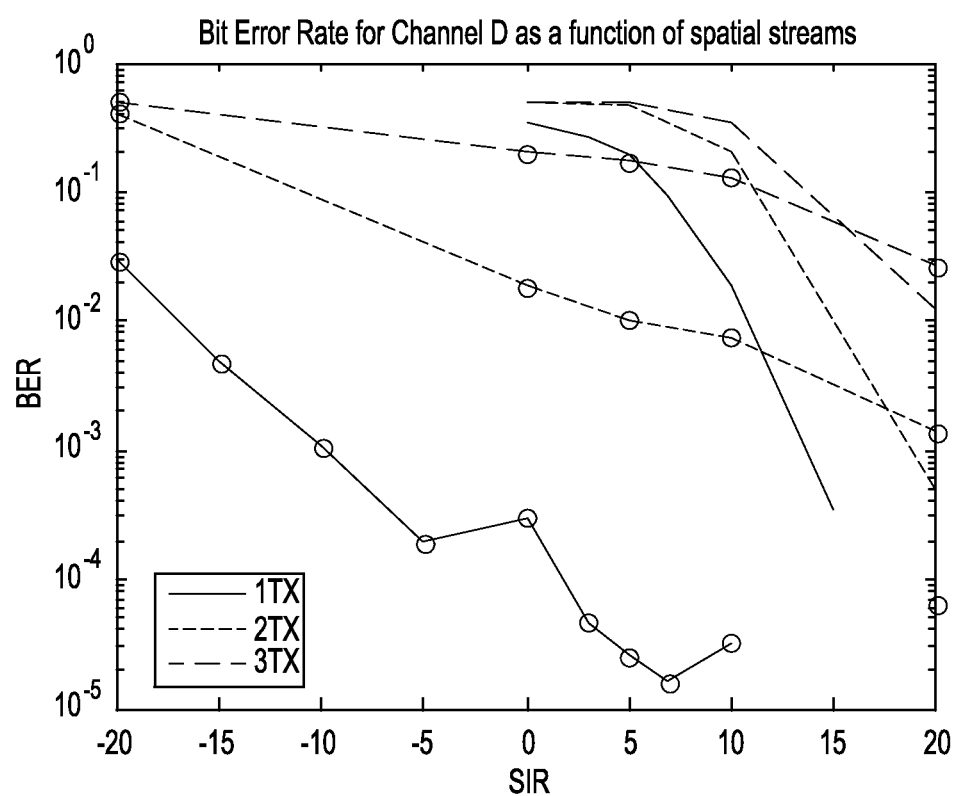

FIG. 16E shows the performance with multiple spatial streams with the wideband mitigation filter at 15 dB SNR. The higher rate modes didn't perform as well as the single spatial stream transmission. This is to be expected since the effective receiver diversity is reduced by the spatial filtering performed by the filter-bank. The solid lines refer to the performance of the unmitigated system, while those with the circles refer to system with interference mitigation. The loss of diversity is demonstrated by the shallowness of the slope of the mitigated curves. If the diversity order was higher the fall off would have been steeper.

Filter Loss

Figure 17:
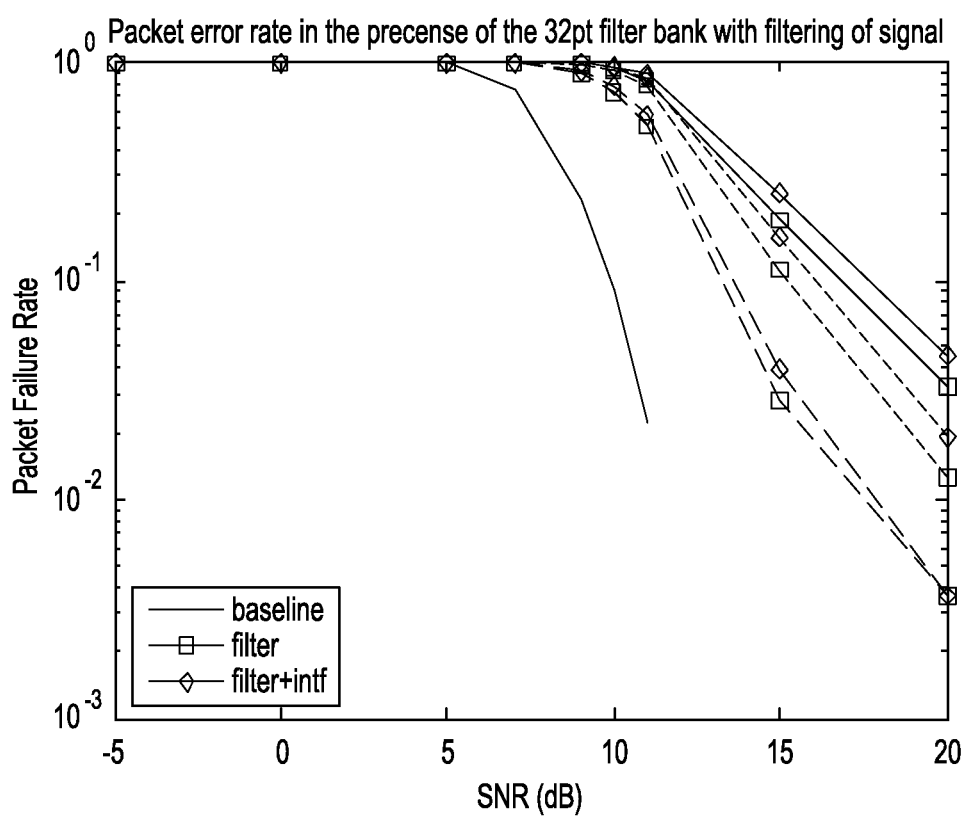
FIG. 17 is a plot of simulated packet detection performance with and without filtering.

In FIG. 16B, there is a visible cross-over region where the system with interference mitigation performed worse than the un-mitigated system. This was due to distortion and dispersion in the signal created by the interference mitigation filter. FIG. 17 shows how the filter affects the performance of our system. The performance of the filter bank with rectangular windows and identity matrices for each sub-band were tested. Since the DFT is a lossless transform, these parameters should configure the filter to return the exact same signal as we passed into the filter. The simulations showed that this was in fact the case, and that the performance was the same as the unmodified system. The interference was then used to train the filter. This meant estimating the covariance for each sub-band using the method described and applying the inverse in the appropriate sub-band. These were used to filter a clean signal in the absence of interference. The purpose of this was to see how the signal of interest is affected by the filter.

FIG. 17 shows a 3-4 dB loss due to the filter distortion. The solid curve represents the unmodified system operating in the absence of interference. The curves with squares and diamonds represent the system with the filter enabled. The set of solid curves corresponds to 0 dB SIR, the broken ones had 5 dB SIR, and the dashed curves represent 20 dB SIR. The curves with diamonds correspond to the performance when interference was introduced to the received signal and passed through the filter. The additional loss from the interference was 0.4-0.6 dB. It appears that most of the distortion comes from the filter-bank itself, and that the interference itself is being suppressed. Distortion from the filter-bank may be due to the loss in degrees of freedom and ISI created by the long filter length. The stronger the interference power, the more the filter will have to distort the incoming signal to suppress the interference. FIG. 17 shows that the filter distortion loss was greater when the interference power was stronger. The filter was still suppressing the interference, which is demonstrated by the fact that the additional loss from the interference was only 0.5 dB.

The discussion above demonstrates that a single tap spatial filter may not be enough to mitigate wideband interference sources. In certain embodiments, a filter-bank approach separates the signal into sub-band components and filters each sub-band individually. In certain embodiments, filter-banks may be built from polyphase filters or using standard transforms such as the Discrete Fourier Transform. The discussion above demonstrates how a DFT based approach can be used to mitigate wideband interference. In certain embodiments, the length of the DFT used for the filter-bank impacts the amount of interference that the filter bank can suppress. A longer DFT may be capable of suppressing stronger interference, but may result in increased dispersion. As the interference power becomes weaker the cost of this dispersion may outweigh the enhanced suppression provided by the longer DFT. The discussion above demonstrates that the smaller DFTs may have lower error floors and shows the trade-space where this may become the driving factor for performance. Finally, the discussion above analyzes the filter dispersion, providing insight into what characteristics of the impulse response are indicative of good performance.

Figure 12:
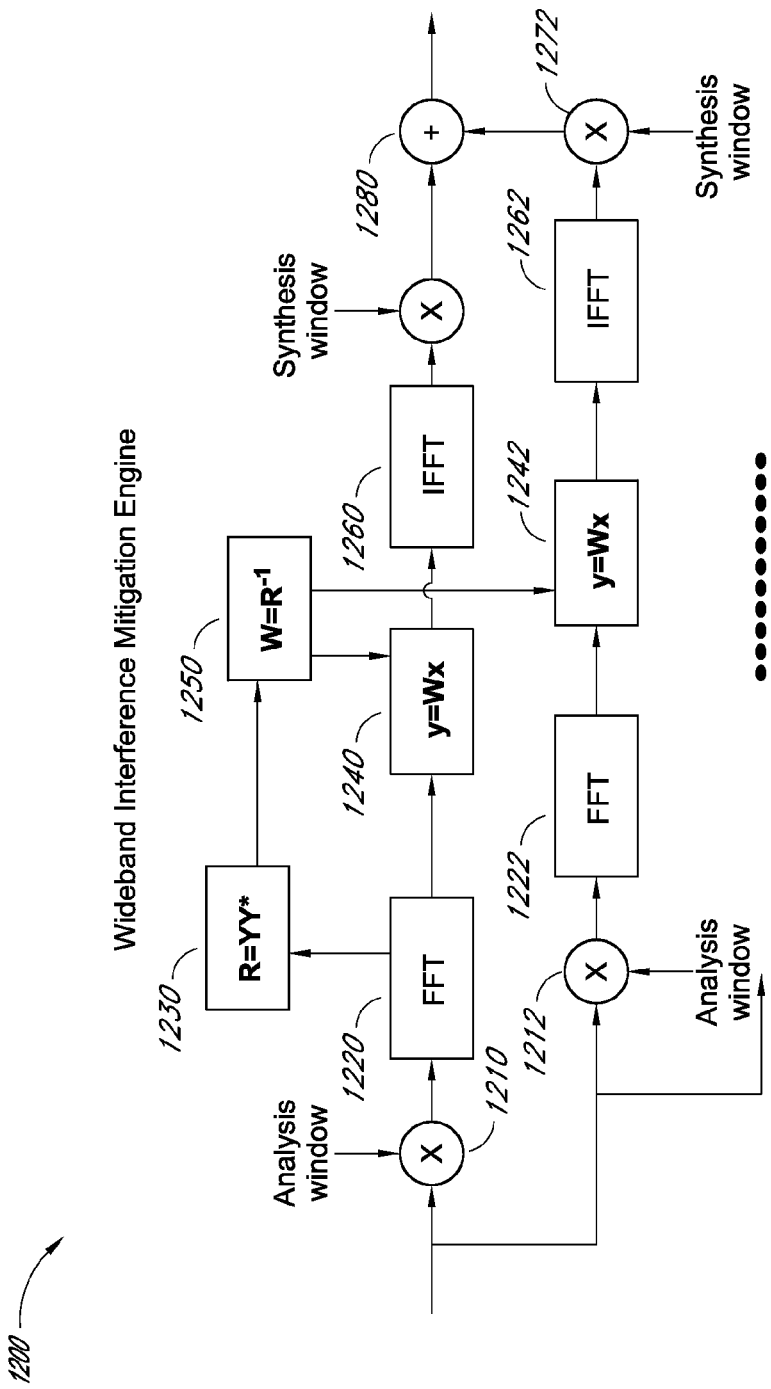
FIG. 12 is a block diagram of an embodiment of a filter-bank system.

FIG. 12 is a block diagram of an embodiment of a filter-bank system that may be used to implement the algorithms discussed abover. A bank of FFTs (e.g., 1220, 1222) operate in parallel to compute the short-time Fourier transforms. In certain embodiments, a 32-point DFT with an 8-sample overlap may be used for this implementation. Such an embodiment would mean building 4 FFTs in parallel for the analysis portion of the filter bank. Each FFT is paired with a module that applies the analysis window 1210 to the incoming signal. In certain embodiments, parallel inverse FFTs (IFFTs) are used to transform the frequency domain signal back to the time-domain before applying the synthesis windows (e.g., 1270) and combining the signals for the receiver. In certain embodiments, the spatial filtering matrix (e.g., 1240, 1242) is applied to each sub-band between the FFT and IFFT. In certain embodiments, these matrices are computed by a host power-pc processor and transferred to the interference mitigation engine.

In certain embodiments, a controller similar to the one described above with reference to narrowband mitigation may be used. In certain embodiments, the covariance is estimated by taking the output of the first analysis FFT 1220 and averaging the outer-product for each sub-band. In some embodiments, a special unit manages the estimation of this matrix and transfers to the host processor.

Figure 18:
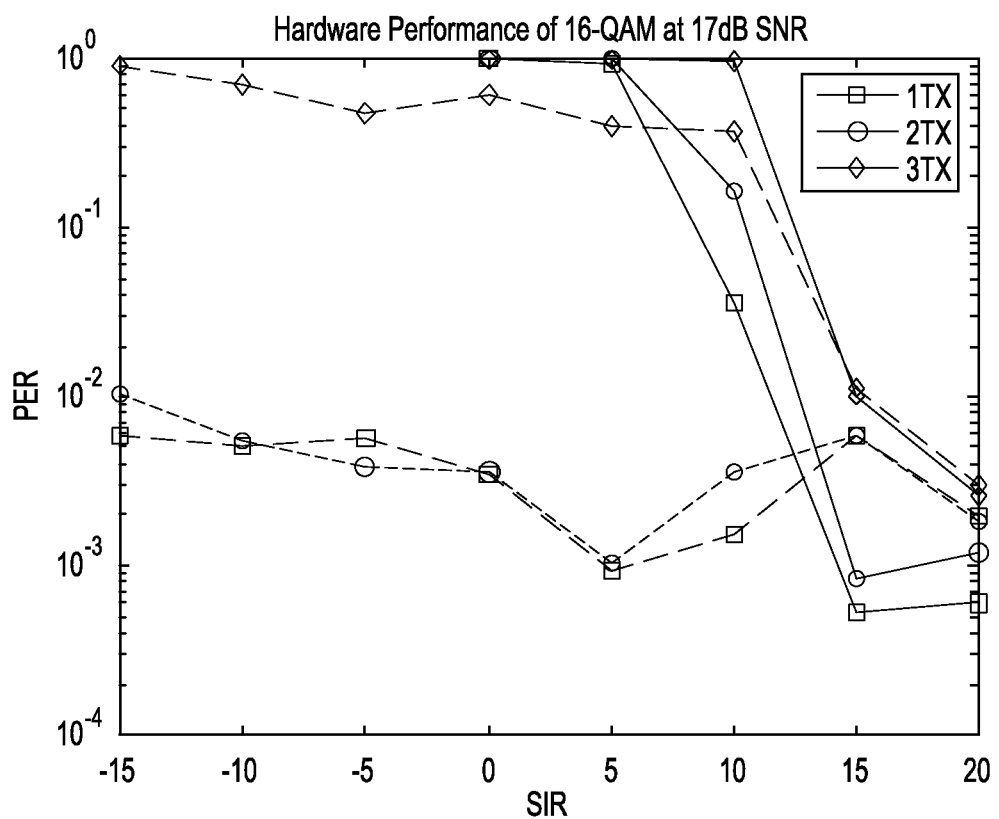
FIG. 18 is a plot of hardware performance of an embodiment of an interference mitigation system.

A realtime system incorporating the features of the embodiments just described was used to implement the algorithms described above. The system was used to characterize the performance of 16-QAM OFDM packets as a function of SIR. The signal power was calibrated to be 17 dB above the noise seen at the receiver. The interference power was then swept with respect to the signal power. One hundred byte packets were transmitted using 1, 2, and 3 spatial streams. The source data was protected by a rate 1/2 convolutional code before being mapped onto 16-QAM constellation points for each subcarrier. The packet error rate was measured for each mode for each SIR. This was initially done without the multi-antenna interference mitigation filter, and then again with the filter enabled. The results are shown in. FIG. 18. The hardware testbed was able to suppress the interference to roughly the level of the noise. FIG. 18 shows that at 17 dB SNR, the performance of the one and two spatial stream modes are roughly the same from −15 dB SIR to 20 dB SIR. The interference was suppressed to the level of the noise floor throughout this entire region. The loss of degrees of freedom can be seen by noting that the three spatial stream mode could not be demodulated until the interference power dropped below the noise. The eigen-analysis above showed that we two degrees of freedom would have to be sacrificed to suppress the interference by 20 dB. This is confirmed by the relatively poor performance of the 3-spatial stream mode and good performance of the 1 and 2-spatial stream modes.

Frequency Domain Interference Cancellation in Wideband Multi-Antenna Systems

In certain embodiments, rather than using spatial processing on a sub-carrier basis in the OFDM demodulator, a plug-and-play approach may be used, wherein an interference cancelling module is simply inserted in the receiver chain. In certain embodiments, such an approach may advantageously improve the packet acquisition performance in the presence of interference, as it may mitigate interference during the acquisition process. In addition, the plug-and-play property may provide easy integration with different technologies, and may reduce inter-carrier leakage.

Again, in certain embodiments, the OLA technique is integrated in a MIMO receiver to provide spatial interference mitigation for wideband channels.

Figure 19:
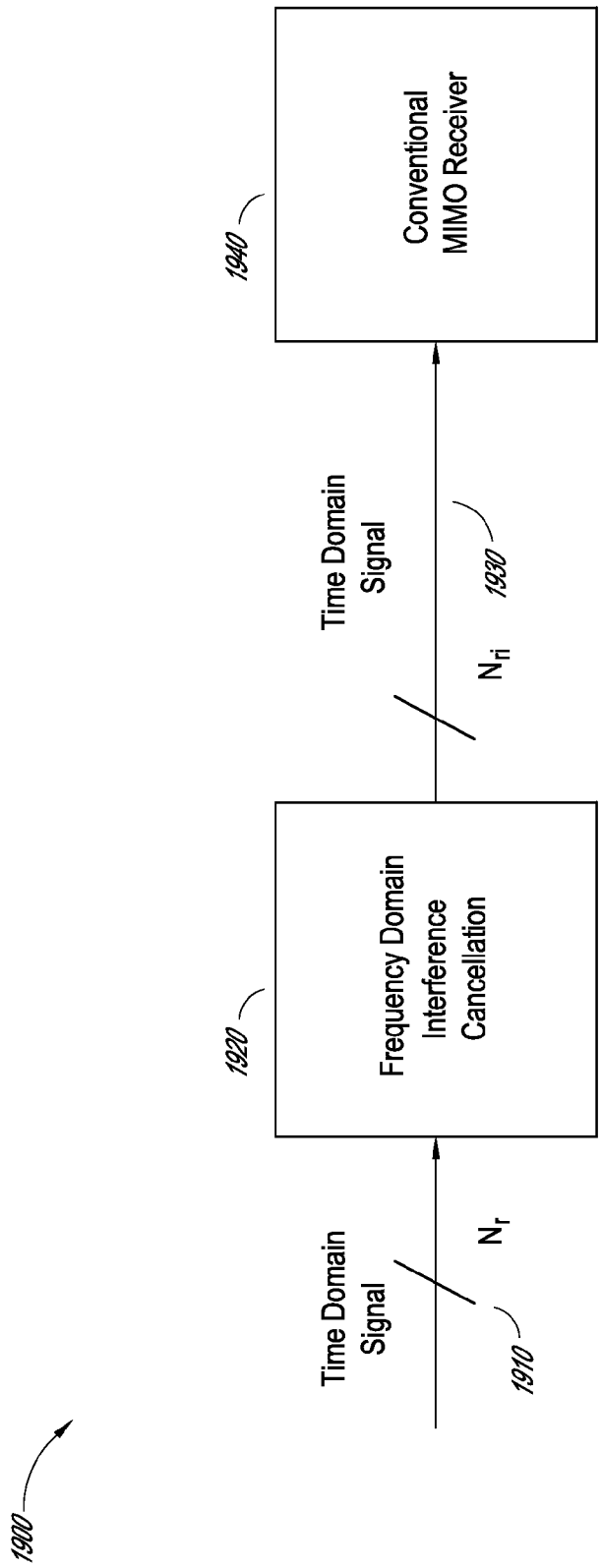
FIG. 19 is a block diagram of an embodiment of a system configured to mitigate interference in a wideband multi-antenna system.

FIG. 19 is a flowchart of an embodiment of a frequency-domain wideband interference mitigation system. In the embodiment of FIG. 19, a module 1920 is inserted in front of a conventional MIMO receiver 1940 which performs wideband interference mitigation through a transformation to the frequency domain and back to the time domain. In certain embodiments, apart from the operating bandwidth, there is no direct relationship between the MIMO receiver and the MIMO frequency domain interference cancellation module, and any type appropriate MIMO receiver can be used (e.g., packet acquisition, MIMO OFDM for WiFi, MIMO OFDM for WiMAX, MIMO CDMA, or any other appropriate receiver.) In certain embodiments, the interference cancellation module is transparent to the conventional MIMO receiver. That is, the receiver 1940 will not see a difference between the received signals 1930 from the $N_{ri}$ outputs of the interference cancellation module versus the signals received from $N_{ri}$ antennas as in any MIMO system, except that the inserted module has mitigated the interference, which may greatly improve the conventional receiver performance without any specific action on the part of the receiver.

In certain embodiments, the steps of the frequency domain interference cancellation described are as follows: (1) Get the time domain signals from Nr receive antennas; (2) perform, through an OLA operation, spatial filtering in the frequency domain on the received signals to mitigate the wideband interference sources; and (3) generate an interference free time domain signal with Nri branches (this signal is seen by the conventional MIMO OFDM receiver as a time domain signal coming from Nri receive antennas.)

Figure 20:
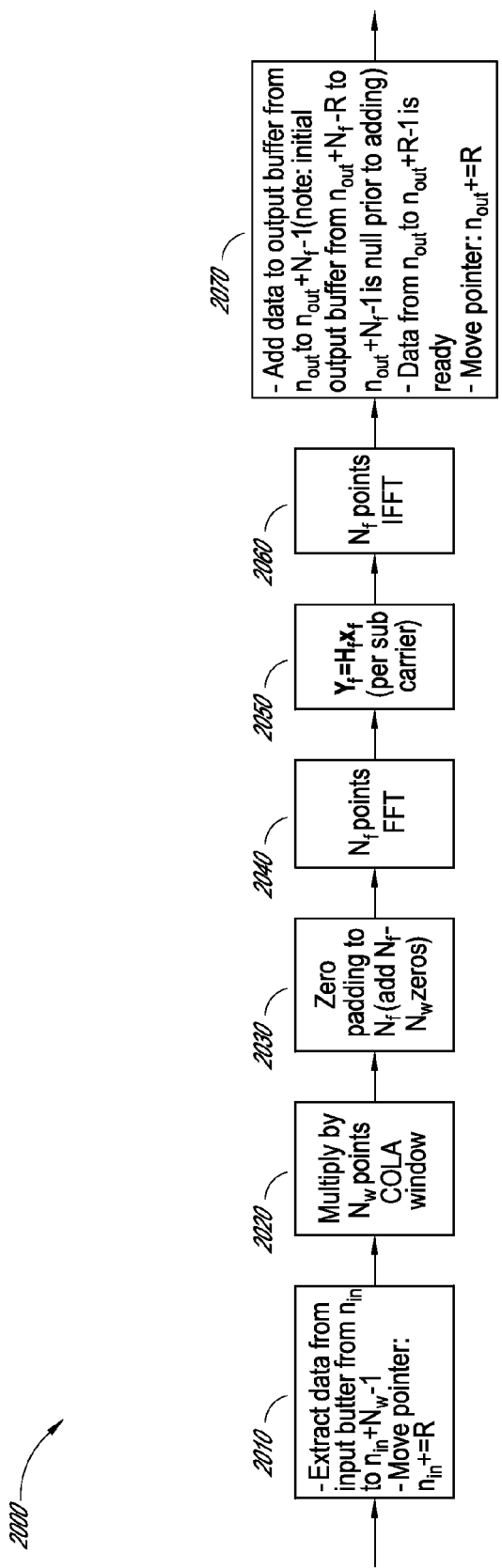
FIG. 20 is a flowchart illustrating a method of implementing an overlap and add algorithm for frequency domain interference cancellation.

FIG. 20 provides additional detail of the major blocks of the OLA based frequency domain interference cancellation module as illustrated in FIG. 19. The OLA engine operates every R input samples. That is, if the input symbol rate is $R_{in}$, then the OLA engine implements all its functions (extraction, windowing, FFT, multiplication, IFFT and output buffer addition) within $R/R_{in}$ seconds. The parameters of the OLA engine are as follows: R—input and output sliding window step size; $N_w$—Constant Ovelap and Add (COLA) window length (any window with the COLA property can be chosen; note that the step size and window length are chosen jointly as a function of the window function to preserve the COLA property;) $N_f$—FFT length; $N_r$—number of receive antennas; $N_{ri}$—number of parallel data stream after interference cancellation.

At initialization, $n_{in}$ is set equal to 0, $n_{out}$ is set equal to zero and the output buffer is initialized with zeros. The first $N_w$-R $N_r$x1 incoming data vectors are put in the input buffer. Note that for added efficiency, the input and output buffers can be implemented circularly. The different operations in the OLA engine are the following: (1) The next R $N_r$x1 incoming data vectors are put in the input buffer, after which, at block 2010, $N_W$ data vectors are extracted from the input buffer from position $n_{in}$ to $n_{in}+N_w-1$ and $n_{in}$ is incremented by R; (2) the $N_W$ extracted data vectors are multiplied vector wise by the $N_W$ point COLA window at block 2020 and are zero padded with $N_f-N_W N_r$x1 zero vectors at block 2030, after which the $N_f$ points vector FFT is taken on the windowed and zero-padded data sequence at block 2040; (3) for each of the $N_f$ sub-carrier, the $N_r$x1 received data vector $Y_f$ is right multiplied by a $N_{ri}$x$N_r$ matrix $H_f$ at block 2050, to obtain the interference mitigated $N_{ri}$x1 vector $X_f$—the $N_f$ matrices $H_f$ are chosen according to the interference spatial filtering algorithm (spatial whitening, interference null space projection, correlation matrix inversion with diagonal loading, etc.) selected by the designer; (4) the IFFT of the $N_f N_{ri}$x1 $X_f$ vectors is then taken at block 2060 and the $N_f N_{ri}$x1 vectors are vector wise accumulated at block 2070 to the data in the output buffer from position $n_{out}$ to $n_{out}+N_f-1$ (it is also possible to multiply the data by an output window prior to the accumulation to the buffer). The vectors from position $n_{out}$ to $n_{out}+R-1$ are outputted from the OLA engine and transferred to the next receiver module. The output buffer point $n_{out}$ is finally incremented by R.

Figure 21:
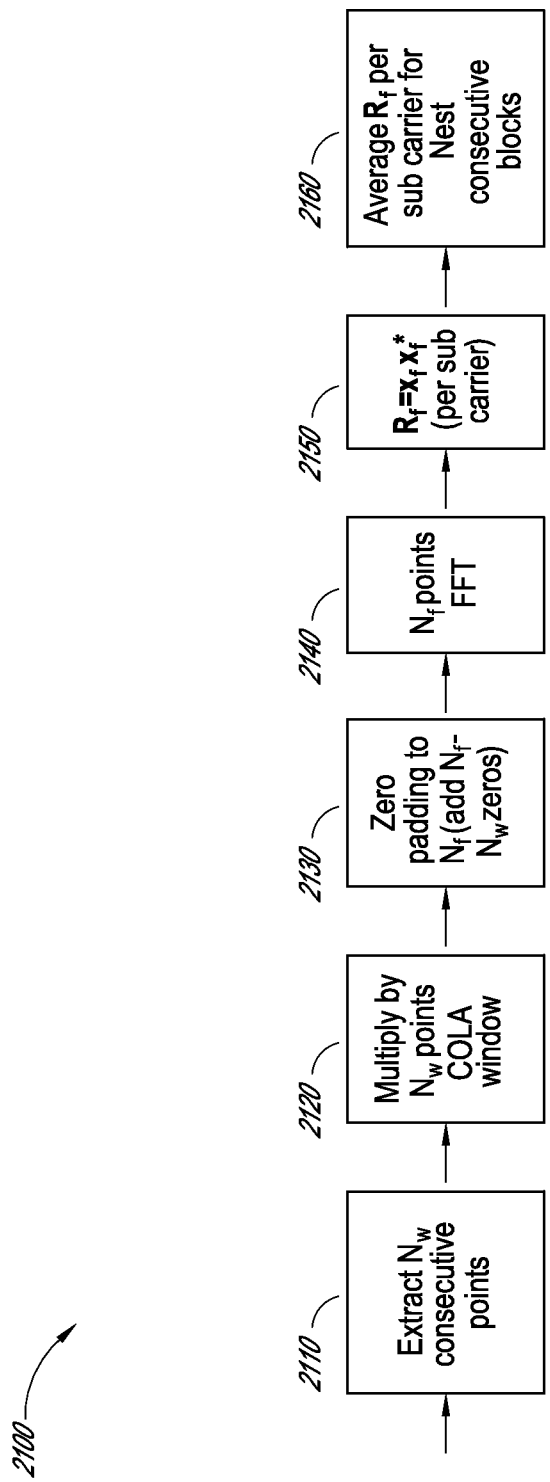
FIG. 21 is a flowchart illustrating a method of estimating frequency domain interference autocorrelation matrices.

In certain embodiments, an algorithm will use an estimate of Rf the interference autocorrelation on each subcarrier in the frequency domain in order to compute the $N_f H_f$ matrices. FIG. 21 provides a block diagram of a method for estimating frequency domain interference autocorrelation matrices. As illustrated in Error! Reference source not found.21, the $N_f$ Rf matrices are computed following windowing, zero-padding and the FFT to correctly estimate the interference spatial statistics following the FFT (i.e., the location where interference mitigation takes place inside the OLA engine.)

Figure 22:
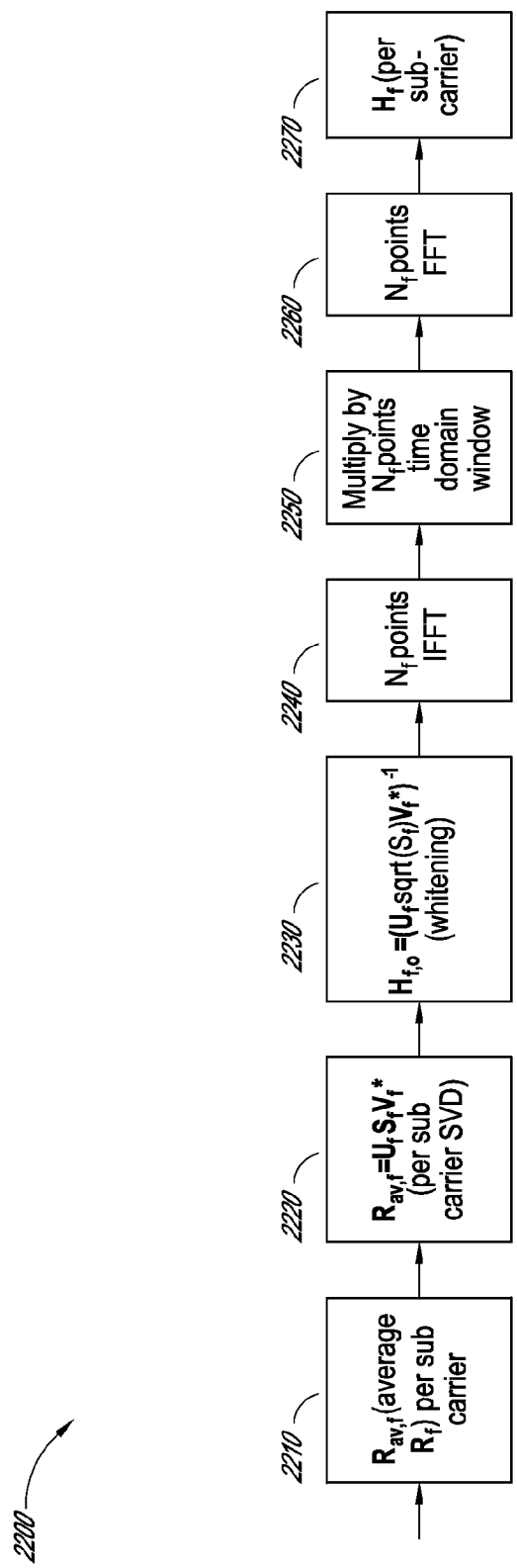
FIG. 22 is a flowchart illustrating a method of computing frequency domain interference mitigation matrices based on a noise whitening approach.

In certain embodiments, the $N_f$ matrices $H_f$ can be computed using a whitening interference mitigation approach. FIG. 22 provides a block diagram of such an approach. Note that the last three steps, 2250, 2260 and 2270 (transformation to the time domain using the IFFT, time domain windowing and FFT to the frequency domain) are accomplished to limit the equivalent impulse response length of interference mitigation filter and decrease the signal distortion that might be introduced by the circular convolution artifacts of the OLA engine.

The previous algorithm can be built on hardware using a 32-point FFT with a 24 sample overlap. Hamming windows can be applied to both sides, as explained above, which may improve performance. A hardware architecture embodiment for this algorithm was provided in FIG. 12, and detailed explanation of the architecture is provided above with reference thereto.

Figure 23A:
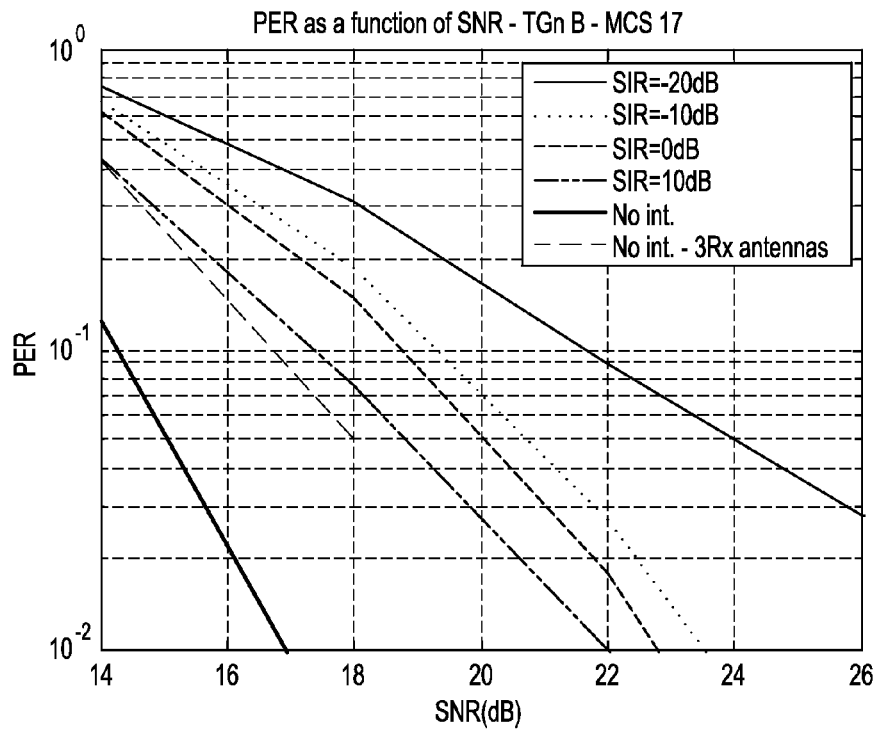
FIGS. 23A-23D are plots of the simulated packet detection performance of a frequency domain interference mitigation system in comparison to time domain interference mitigation.
Figure 23B:
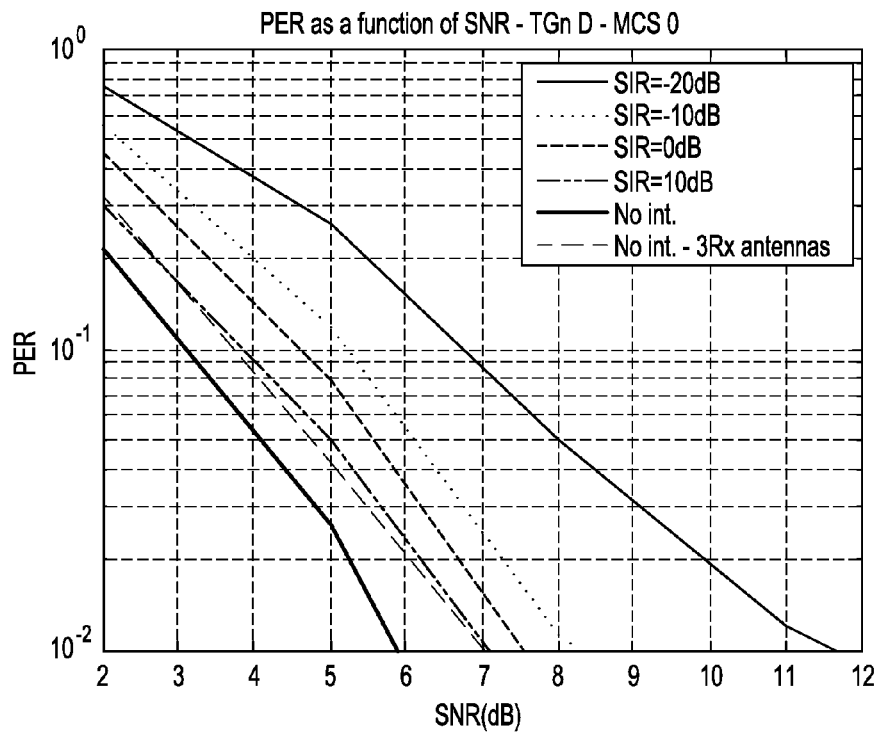

Testing of the algorithm was conducted using a hardware embodiment as provided in FIG. 12. Our first design goal was to provide interference mitigation in wideband multi-antenna systems. FIGS. 23A and 23B illustrate the packet error rate (PER) performance of an entire 802.11n system integrated with the frequency domain interference cancellation system described above. The OLA engine parameters were Hanning COLA window of length Nw=91 points, a sliding window step size of R=46 and a FFT size of Nf=128 points. The spatial filtering matrices were computed using the whitening approach and the impulse response of the interference mitigation filter was windowed using a 31 points Hamming window. The full featured 802.11n modem included modules such as packet synchronization, channel estimation, MMSE MIMO detection, etc. FIGS. 23A and 23B demonstrate that the impact of wideband interference was mitigated even with a signal to interference ration (SIR) as severe as −20 dB.

Figure 23C:
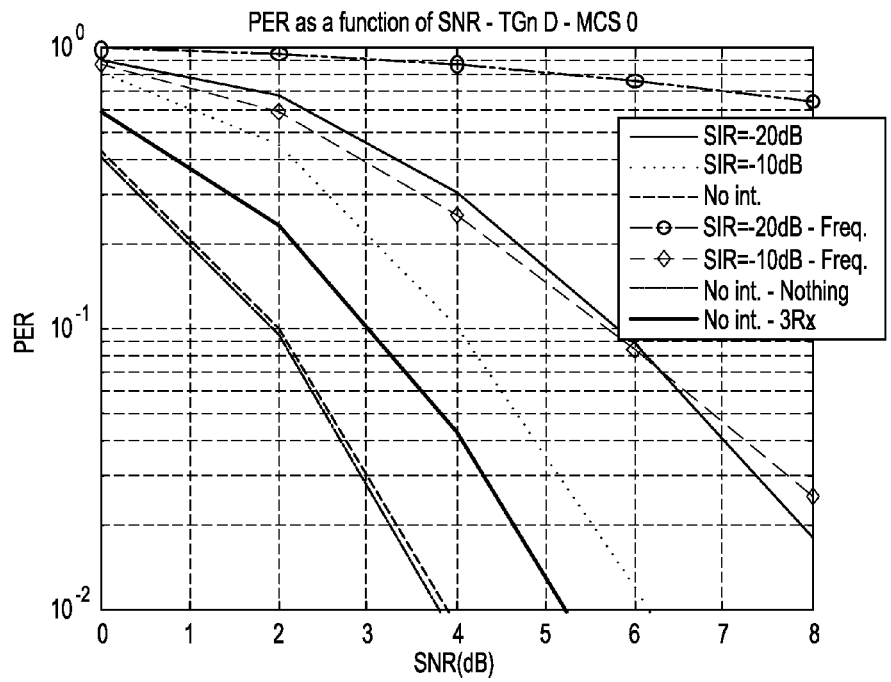
Figure 23D:
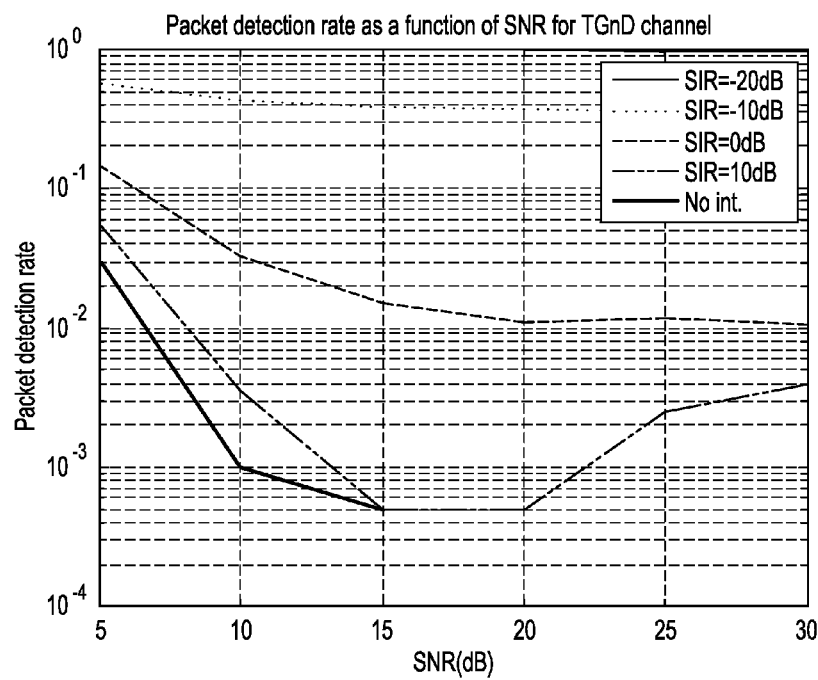

FIG. 23C compares the performance of the OLA engine with frequency mitigation performed after the FFT within the OFDM demodulator (curves denoted with Freq.). Note that in this case we assumed perfect packet synchronization. The advantages of the algorithm are demonstrated in the figure. The impact of packet synchronization is on a single tap time domain filter is illustrated in FIG. 23D. Therefore, the difference between an OFDM interference mitigation approach and an OLA engine approach may be even more dramatic, since, as illustrated in FIG. 23D, the packet detection rate may be unacceptable at low SIR with a single tap time domain filter.

Finally, from a complexity point of view, with the current set of parameters we performed approximately 2.75 matrix multiplication per input symbol. Other simulations have shown that we can reduce this ratio down to 2 without significantly affecting the performance. Compared to the OFDM based interference mitigation, we also performed an additional vector FFT and a vector IFFT. Thus the complexity was slightly increased; however the performance was greatly improved.

In certain embodiments implementing a frequency domain interference cancellation approach, therefore, the following advantages, among others, may be achievable: (1) desirable interference mitigation in wideband channels; (2) improved packet synchronization; (3) plug-and-play property; and (4) low complexity to enable hardware realization.

Conclusion

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Embodiments of the disclosed systems and methods can be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, building, city, country, and so forth.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A method of suppressing wideband interference in a wireless communication system, the method comprising:
   i.) receiving a first signal on a frequency band, wherein the first signal comprises components from a plurality of sub-channels;
   ii.) converting the first signal into a respective plurality of first sub-band frequency components, wherein each sub-band is defined in the frequency domain;
   iii.) determining a respective single-tap spatial filter for each frequency sub-band using one or more corresponding first sub-band components for each respective spatial filter;
   iv.) receiving a second signal on said frequency band, wherein the second signal comprises components from the plurality of sub-channels;
   v.) converting the second signal into a respective plurality of second sub-band frequency components; and
   vi.) generating a corresponding plurality of filtered sub-band components by applying the respective single-tap spatial filters to the corresponding second sub-band components of the second signal,
      wherein step iii) is performed before any of the steps iv)-vi); and
      wherein step iii) is performed without determining that the first signal includes a substantial signal of interest.

2. The method of claim 1, wherein step ii) is performed before any of the steps iii)-vi) and wherein step ii) is performed without determining that the first signal includes a substantial signal of interest.

3. The method of claim 1, further comprising determining whether one of the first or second received signals includes the signal of interest.

4. The method of claim 3, wherein determining whether one of the first or second received signals includes the signal of interest comprises detecting a packet.

5. The method of claim 1, further comprising receiving an estimation stimulus, wherein step iii) is triggered at least partially based on the estimation stimulus.

6. The method of claim 5, wherein the estimation stimulus is included in one of the first or second signals.

7. The method of claim 5, wherein the estimation stimulus comprises a control signal.

8. The method of claim 5, wherein the estimation stimulus comprises a determination that a packet was detected.

9. The method of claim 5, wherein the estimation stimulus comprises a determination that packets are no longer being detected.

10. The method of claim 1, wherein the bandwidth of the sub-band frequency components is less than the coherence bandwidth of the sub-channel.

11. The method of claim 1, wherein step i) is performed without determining that the first signal includes a substantial signal of interest.

12. Non-transitory physical computer storage comprising computer-executable instructions that, when executed by a computing system, are configured to:
   i.) receive a first signal on a frequency band, wherein the first signal comprises components from a plurality of sub-channels;
   ii.) convert the first signal into a respective plurality of first sub-band frequency components, wherein each sub-band is defined in the frequency domain;
   iii.) determine a respective single-tap spatial filter for each frequency sub-band using one or more corresponding first sub-band components for each respective spatial filter;
   iv.) receive a second signal on said frequency band, wherein the second signal comprises components from the plurality of sub-channels;
   v.) convert the second signal into a respective plurality of second sub-band frequency components; and
   vi.) generate a corresponding plurality of filtered sub-band components by applying the respective single-tap spatial filters to the corresponding second sub-band components of the second signal,
      wherein step iii) is performed before any of the steps iv)-vi); and
      wherein step iii) is performed without determining that the first signal includes a substantial signal of interest.

13. Non-transitory physical computer storage of claim 12, wherein step ii) is performed before any of the steps iii)-vi) and wherein step ii) is performed without determining that the first signal includes a substantial signal of interest.

14. Non-transitory physical computer storage of claim 12, wherein the computer-executable instructions are further configured to determine whether one of the first or second received signals includes the signal of interest.

15. Non-transitory physical computer storage of claim 12, further comprising machine executable instructions stored thereon to receive an estimation stimulus, wherein step iii) is triggered at least partially based on the estimation stimulus.

16. Non-transitory physical computer storage of claim 15, wherein the estimation stimulus is included in one of the first or second signals.

17. Non-transitory physical computer storage of claim 15, wherein the estimation stimulus comprises a determination that a packet was detected.

18. Non-transitory physical computer storage of claim 15, wherein the estimation stimulus comprises a determination that packets are no longer being detected.

19. Non-transitory physical computer storage of claim 15, wherein the bandwidth of the sub-band frequency components is less than the coherence bandwidth of the sub-channel.

20. Non-transitory physical computer storage of claim 12, wherein step i) is performed without determining that the first signal includes a substantial signal of interest.

21. A system for suppressing wideband interference, the system comprising:
   an antenna configured to receive wireless signals; and
   a processing unit configured to:
   i.) process a first signal on a frequency band received at the antenna, wherein the first signal comprises components from a plurality of sub-channels;
   ii.) convert the first signal into a respective plurality of first sub-band frequency components, wherein each sub-band is defined in the frequency domain;
   iii.) determine, with the assumption that the first signal does not include a substantial signal of interest, a respective single-tap spatial filter for each frequency sub-band using one or more corresponding first sub-band components for each respective spatial filter;
   iv.) process a second signal on said frequency band received at the antenna, wherein the second signal comprises components from the plurality of sub-channels;
   v.) convert the second signal into a respective plurality of second sub-band frequency components; and
   vi.) generate a corresponding plurality of filtered sub-band components by applying the respective single-tap spatial filters to the corresponding second sub-band components of the second signal, wherein step iii) is performed before any of the steps iv)-vi).

22. The system of claim 21, wherein the processing unit is further configured to determine whether one of the first or second received signals includes the signal of interest.

23. The system of claim 21, wherein step i) is performed without determining that the first signal includes a substantial signal of interest.

* * * * *